United States Patent [19]

Buckley, Jr. et al.

[11] 4,455,820

[45] Jun. 26, 1984

[54] CONTROL SYSTEM AND METHOD FOR CONTROLLING A GAS TURBINE IN ACCORDANCE WITH THE TEMPERATURE CONDITIONS THEREOF

[75] Inventors: Leo P. Buckley, Jr., Salem; Burnette P. Chausse, Roanoke, both of Va.; Arthur C. Chen, Schenectady; John N. Russell, Burnt Hill, both of N.Y.; Thomas Y. Wong, San Jose, Calif.

[73] Assignee: General Electric Company, Salem, Va.

[21] Appl. No.: 721,998

[22] Filed: Sep. 9, 1976

[51] Int. Cl.³ ................................................ F02C 9/28
[52] U.S. Cl. .............................. 60/39.03; 60/39.28 T
[58] Field of Search .................. 60/39.28 T, 39.28 R, 60/39.03; 73/116, 341

[56] References Cited

U.S. PATENT DOCUMENTS

| | | | |
|---|---|---|---|
| 3,469,395 | 9/1969 | Spitsbergen | 60/39.28 R |
| 3,719,071 | 3/1973 | Hohenberg | 73/341 |
| 3,834,361 | 9/1974 | Keely | 60/39.28 R |
| 3,955,359 | 5/1976 | Yannone | 60/39.28 T |
| 3,987,620 | 10/1976 | Giordano et al. | 60/39.28 R |
| 4,058,975 | 11/1977 | Gilbert et al. | 60/39.28 R |

Primary Examiner—Louis J. Casaregola
Attorney, Agent, or Firm—Arnold E. Renner

[57] ABSTRACT

A control system including a controller for reading temperature values from sensors in a gas turbine, determining the reliability of the sensors, and issuing a fuel control signal for use in controlling the turbine is disclosed. The fuel control signal has a calculated value which is a function of the turbine operating temperature derived from the values of temperature signals generated by the sensors.

10 Claims, 23 Drawing Figures

| |
|---|
| INPUT DATA<br>(TEMPERATURE CONDITIONS) |
| OUTPUT DATA<br>(TRIM OR FUEL CONTROL) |
| CONSTANTS & MASKS |
| MASTER STATUS PROGRAM<br>(READ TEMPERATURE INPUTS & SEND TRIM) |
| SCRATCH<br>(WORKING STORAGE) |
| TEMPERATURE CONTROL PROGRAM<br>TCC, TCA, PPR SUBROUTINES<br>(CALCULATE TEMPERATURE & TRIM) |
| OTHER CONTROL PROGRAMS<br>(EG. SPEED/LOAD) |
| SEQUENCING PROGRAM<br>(SIMULATED RELAY COILS,<br>CONTACTS, TIMERS, ETC.) |

FIG. 3

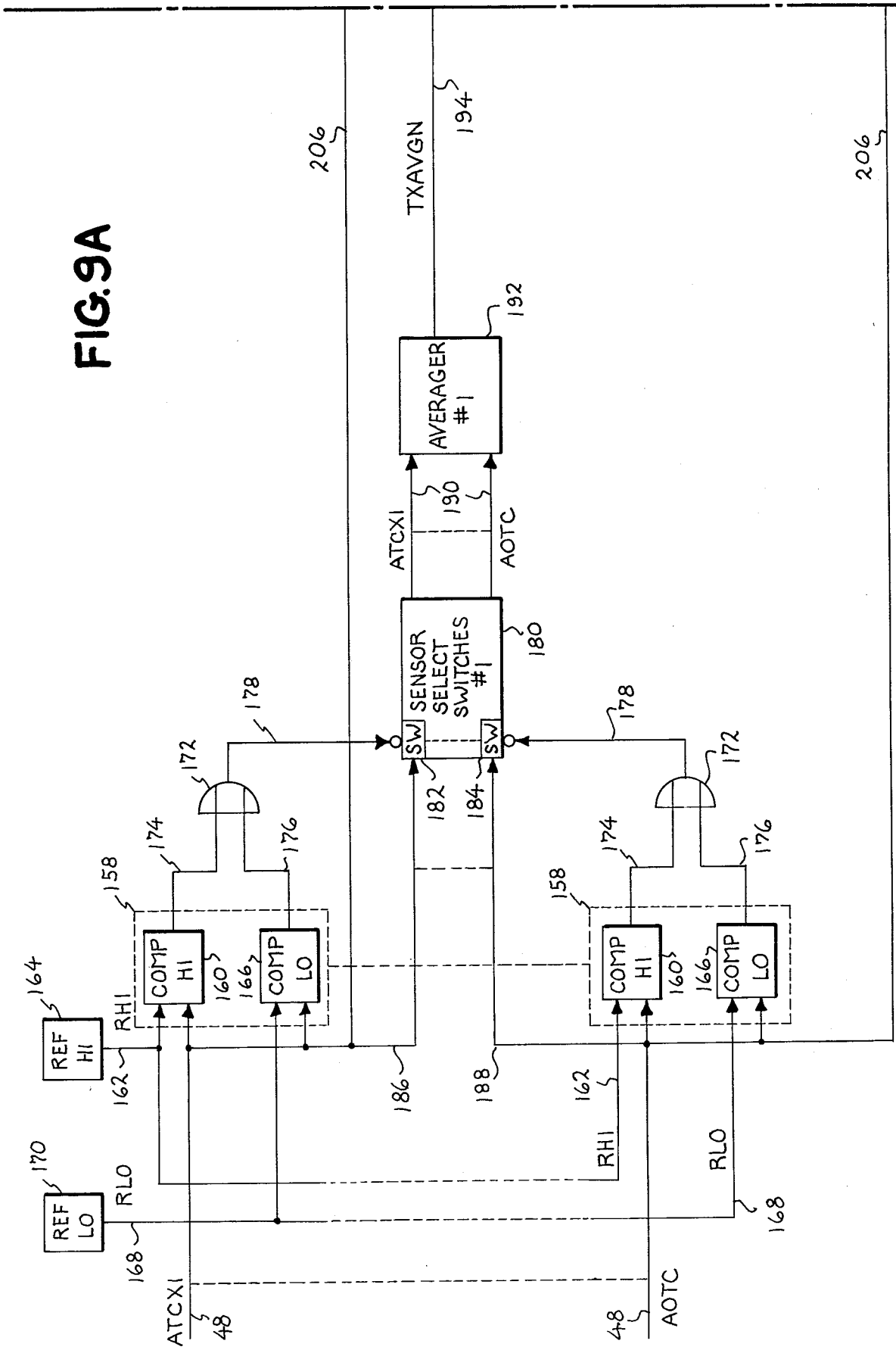

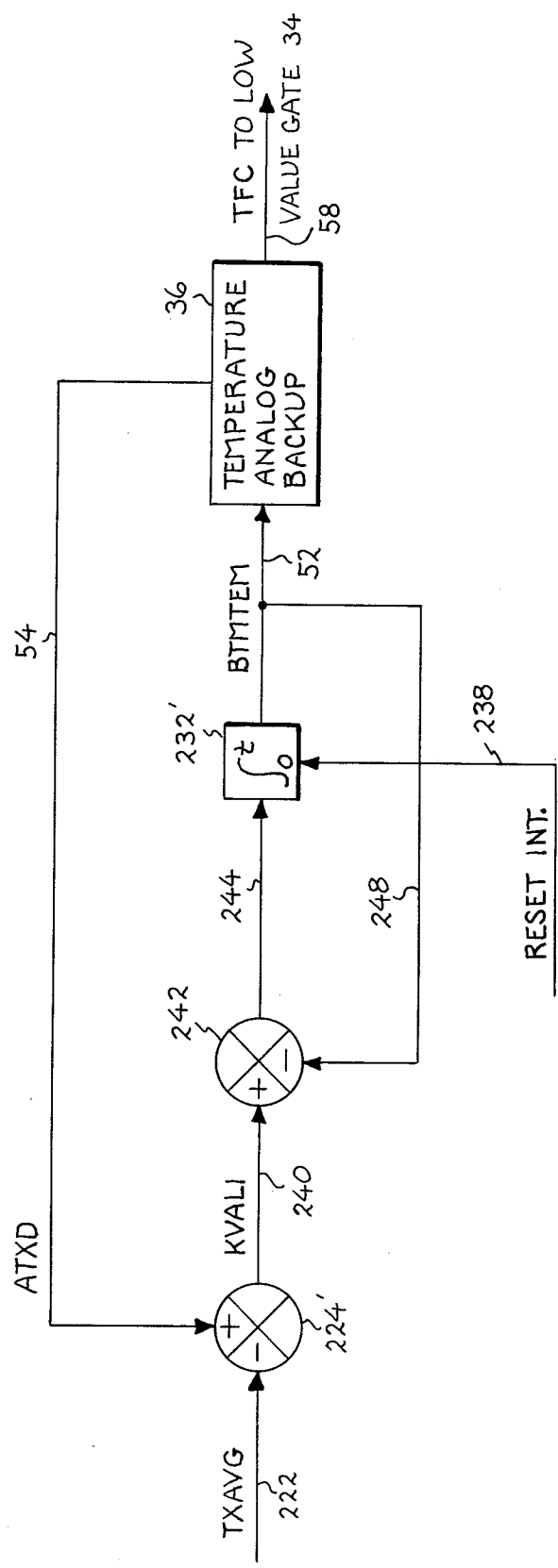

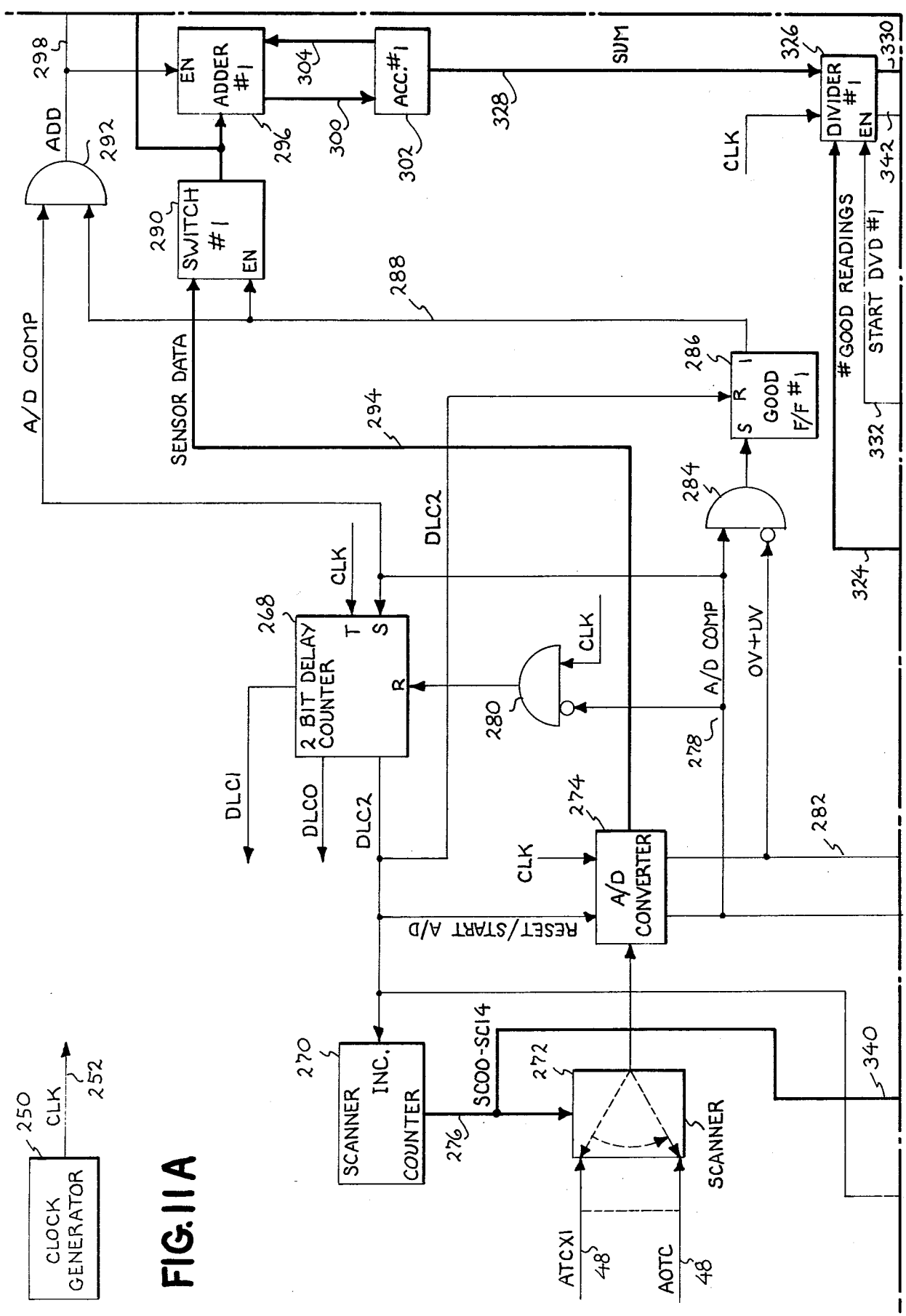

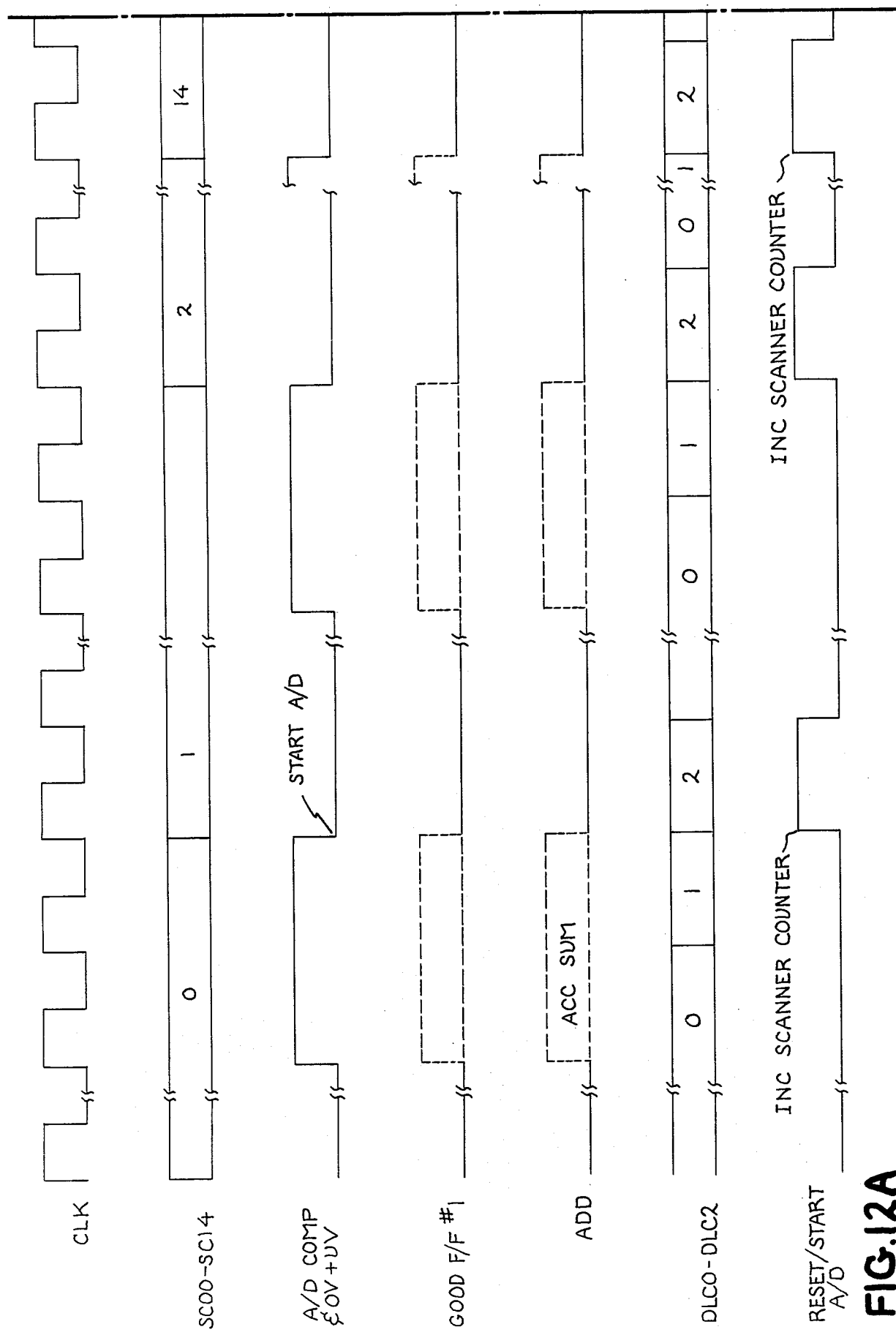

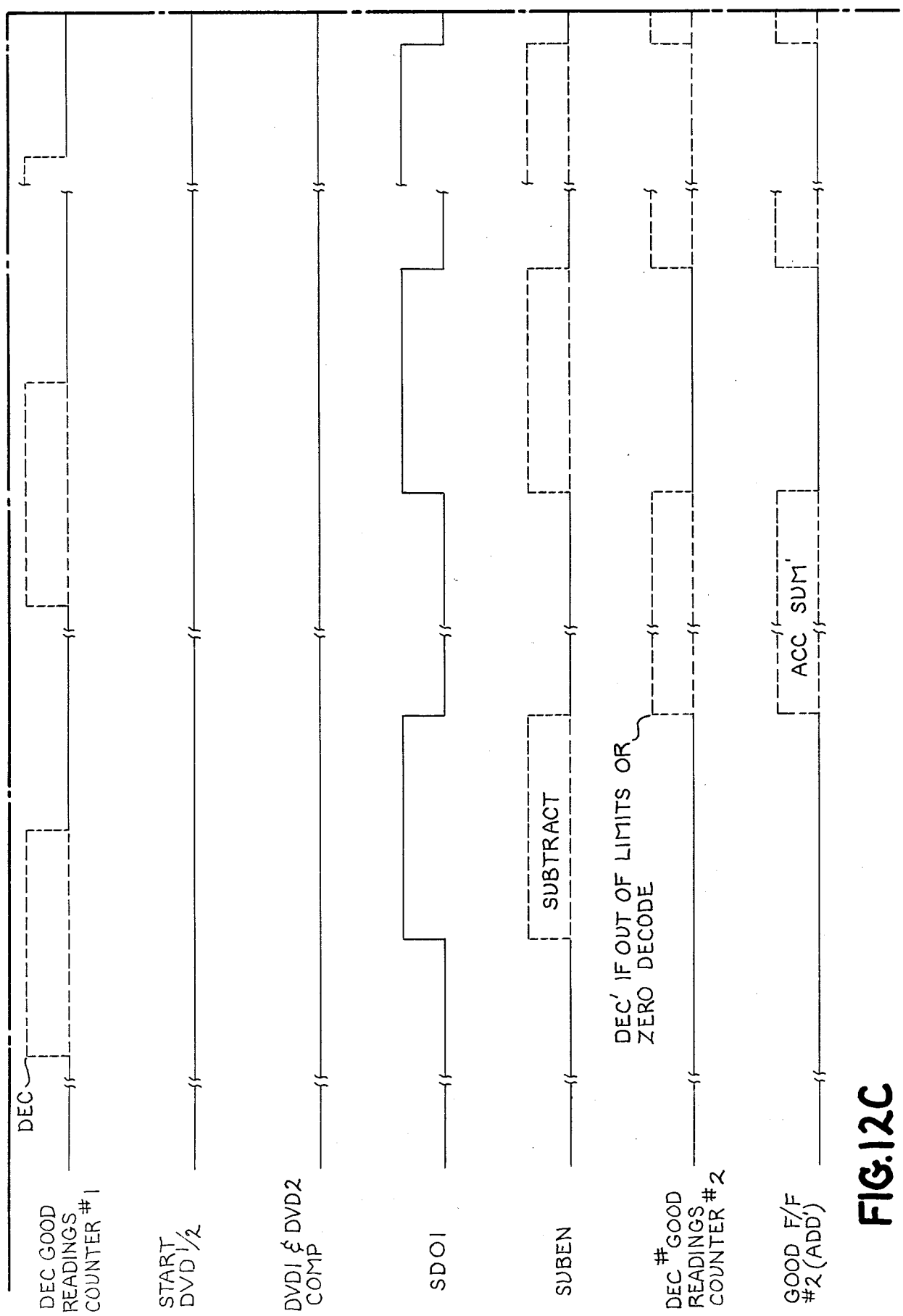

CONTROL SYSTEM AND METHOD FOR CONTROLLING A GAS TURBINE IN ACCORDANCE WITH THE TEMPERATURE CONDITIONS THEREOF

BACKGROUND OF THE INVENTION

1. Field of the Invention

This invention relates generally to gas turbine control systems and more particularly to a control system and method of controlling fuel flow to a gas turbine to control the temperature thereof.

2. Description of the Prior Art

The present day high acceptance of large capacity gas turbine power plants for large peak load applications has made the reliability and availability of these power plants an important concern to the user. This is due in large part to the fact that these power plants are often located in remote areas and operate unattended. Remote control is sometimes provided by a telemetry communication link.

To assure higher turbine reliability, turbine temperature regulation must be accurate. More importantly, however, is that the system regulating the temperature must be more available to the turbine. That is, the system should continue to operate the turbine even if some turbine control function or condition of a noncatastrophic nature fails. A system which continues to run, even with some failures, is said to have fail-soft design, whereas a system which is shutdown with any failure is said to have fail-safe design.

Traditionally, the operating temperature of a gas turbine has been controlled by regulating either the firing or exhaust temperature of the turbine. Regardless of which is to be regulated, multiple thermocouples or other temperature sensing devices are employed for sensing the turbine temperature. For example, to measure the exhaust temperature, a plurality of thermocouples are placed at various points in the turbine exhaust plenum and their conductor leads are connected together in order to obtain an average exhaust temperature.

In the prior art, this averaging has been done by electronic analog elements interconnected as a temperature regulating system to control the average exhaust temperature at some predetermined level.

Analog temperature regulators present several problems:

1. A temperature reference point, usually an analog reference voltage, is employed in analog controllers for comparison with the average exhaust temperature to control the turbine temperature at a predetermined level. It is well known in the art that these analog reference voltages are susceptible to drift with time and/or temperature, thus leading to inaccuracies in temperature control.
2. Wiring the thermocouples wires together to obtain an averaged temperature signal is an undesirable situation. For example, if a thermocouple fails with a lower than specified output (i.e., shorted wiring, falsely indicating a cold spot in the exhaust plenum) the averaged exhaust temperature will falsely indicate a lower exhaust temperature. As a result, the regulating action of the analog control will cause the exhaust temperature to increase to a value higher than the predetermined level. Such an increase in temperature could seriously degrade the life of the turbine.
3. By hardwiring the thermocouples together, it is difficult to electronically evaluate the operational validity or reliability of each thermocouple. As such, no information is available to detect for potentially abnormal turbine combustion problems, failed thermocouples, or bad wiring.
4. Finally, it is difficult to design a fail-soft turbine temperature regulator or control system without incurring excessive costs by the essential implementation of redundant analog temperature regulators and components for the isolation of potential combustion problems.

It is, therefore, desirable to provide a control system and method for controlling the operating temperature of a gas turbine which enhances turbine life by either shutting the turbine off in the event of a catastrophic failure or allowing the turbine to continue running even though failures of a noncatastrophic nature occur in the system.

SUMMARY OF THE INVENTION

The foregoing disadvantages are overcome by the present invention by the provision of a turbine temperature regulating system having an economical fail-safe and fail design.

Control of gas turbine temperature in one embodiment of the present invention is afforded by a stored program digital computer or programmable controller which effects the reading and storing of temperature readings or values provided by signals from temperature sensors in the turbine. The computer program is comprised of instructions which, when executed by the computer through a series of steps, methodically determine the validity or reliability of each sensor condition, such as shorted or open, and calculates the value of a trim signal or fuel control signal for use in controlling fuel flow to the turbine and, hence, the turbine operating temperature.

In one instance, the trim signal takes on a value derived from the difference in the magnitude of a specified temperature reference proportional to a desired turbine operating temperature and a calculated value which is a function of turbine operating temperature derived from an averaging of the values of those temperature readings corresponding to those sensors exhibiting valid operating conditions. The temperature reference may be stored in the computer or provided thereto from an external voltage source.

In a second instance, the trim signal is caused to achieve a prescribed value representative of an unreliable system when an excessive number of the sensor conditions are determined invalid. In this instance, the trim signal will be ramped to an ineffective value for feel control.

An analog backup means may be optionally implemented into the system to control the turbine in the event of computer failure, to operate the turbine at reduced temperature in the event of potential turbine combustion problems, or to trip the turbine, shutting it down, if a serious turbine combustion or instrumentation problem is detected. The fuel control signal comes from the analog means when it is implemented into the system. If the analog means is not used, the trim signal functions as the fuel control signal.

Temperature signals from specified ones of the turbine sensors are provided to the analog backup means.

The analog means generates a mid-value signal having a magnitude intermediate the values of the specified temperature signals which is approximately equal to the average turbine exhaust temperature. This mid-value signal is used by the computer in calculating the trim signal. Further, it is summed with the temperature reference and the trim signal to develop the fuel control signal from the analog backup means.

The analog backup means also provides means for shutting the turbine down in the event a prescribed number of the sensors connected to the analog means fail or show an invalid condition or if turbine temperature becomes excessive. This feature of the present invention insures fail-safe operation to protect the turbine in the event sensor instrumentation becomes unreliable or if the turbine overheats.

In a second embodiment of the invention, an analog controller continuously monitors the signals or temperature readings generated by the turbine sensors. A first means in the controller compares these readings with prescribed reference limits or bounds and rejects those readings, as invalid sensors, which are not within the prescribed limits. The unrejected readings are averaged to determine the average turbine temperature.

Second means in the controller continuously monitors the sensor readings and compares each of those readings with a variable reference having a value proportional to the algebraic sum of the average turbine temperature and a predetermined reference specifying a maximum temperature deviation of each of the temperature readings. Each temperature reading which is in excess of the variable reference is rejected as coming from a sensor detecting a potential turbine combustion problem. If a prescribed number of signals are rejected, the temperature fuel control signal is ramped to zero turning off fuel to the turbine.

The total unrejected temperature readings are averaged to derive a value proportional to the actual turbine temperature. The actual turbine temperature in one variation of this embodiment is algebraically combined with a reference proportional to a desired turbine temperature to derive the aforementioned fuel control signal for use in controlling fuel flow to the turbine. In a second variation of this embodiment, the analog backup means is implemented in the system. In this latter variation, the aforementioned mid-value signal is algebraically combined with the actual turbine temperature value to derive the trim signal for application to the analog backup means. The analog backup means provides the temperature fuel control signal to the turbine as previously described.

In a third embodiment of the invention, a static digital controller continuously scans the temperature sensors, performs an analog to digital conversion on each sensor temperature reading and calculates the value of the temperature fuel control signal for use in controlling the turbine based on the number of unrejected sensor readings.

In this latter embodiment, means in the controller enables the calculation of the average turbine temperature based only on the values of those unrejected temperature readings. A storage means receives a value proportional to each temperature reading. If a temperature reading is rejected, a value of zero is stored for that reading. Each valid or unrejected temperature reading is subtracted from a specified limit proportional to the algebraic sum of the average turbine temperature and a predetermined reference specifying a maximum deviation of the average temperature.

If a subtraction yields an out of limits condition, that temperature reading is rejected as a potential turbine combustion problem as detected by the sensor generating that temperature reading. The values of all unrejected readings are again summed and the value of the actual average turbine temperature is calculated based on the number of unrejected or good temperature readings and the sum of those readings.

In one variation of this latter embodiment, the value of the temperature fuel control signal is calculated by subtracting the actual average temperature from a base reference proportional to a desired turbine operating temperature.

The aforementioned analog backup means can also be implemented in this embodiment. In this case the actual average temperature is subtracted from the mid-value signal to derive the temperature trim signal to the analog backup means. The temperature fuel control signal to the turbine is generated by the analog backup means as previously described. If a predetermined number of the temperature readings are rejected, the temperature trim signal is ramped to an ineffective value and the analog backup means continues to control the turbine at reduced temperature.

In view of the foregoing, it is therefore an object of the present invention to provide a turbine temperature control system and method having enhanced operating capabilities.

It is another object to provide a stored program computer or controller for calculating the temperature of a gas turbine to develop a signal for controlling fuel flow thereto.

A further object is to provide a gas turbine temperature control system including a programmable controller for calculating turbine temperature and including an analog backup means for providing a fuel control signal to the turbine in accordance with the calculated temperature and a temperature reference representative of a safe turbine temperature.

Yet another object is to provide a method of calculating the temperature in a gas turbine whereby the calculated temperature has a value which is a function of the values of turbine sensor conditions which are determined to be valid.

A still further object is to provide a control system and method of providing a fuel control signal to a gas turbine for controlling the temperature thereof whereby the fuel control signal has a value which is a function of the average turbine temperature and a specified reference proportional to a desired turbine operating temperature.

It is another object to provide a control system including an analog controller for providing a fuel control signal to a gas turbine for controlling the temperature thereof whereby the fuel control signal has a value which is a function of the average turbine temperature and a specified reference proportional to a desired turbine operating temperature.

A further object is to provide a gas turbine temperature control system including a controller for determining turbine temperature and including backup means for providing a fuel control signal to the turbine in accordance with the determined turbine temperature and a temperature reference representative of a safe turbine temperature.

Yet another object is to provide a gas turbine temperature control system including a controller having fail safe and fail-safe design.

The foregoing and other objects will become apparent as the description proceeds and the features of novelty which characterize the invention will be pointed out in particularity in the claims annexed to and forming a part of this specification.

BRIEF DESCRIPTION OF THE DRAWING

The present invention may be more readily understood by reference to the accompanying drawing in which:

FIG. 3 is a memory map showing in exemplary form the organization of programs and data in the memory of the programmable controller of FIG. 1.

FIGS. 9a and 9b collectively comprise a block diagram schematic of an analog controller as another embodiment of the invention.

FIG. 10 is a block diagram schematic illustrating the implementation of the analog backup means into the analog controller of FIGS. 9a and 9b.

FIGS. 11a through 11d collectively comprise a block diagram schematic of a digital controller as a further embodiment of the invention.

FIGS. 12a through 12d collectively comprise a timing diagram useful in understanding the operation of the controller of FIGS. 12a through 12d.

DESCRIPTION OF THE PREFERRED EMBODIMENT

Figure 1:
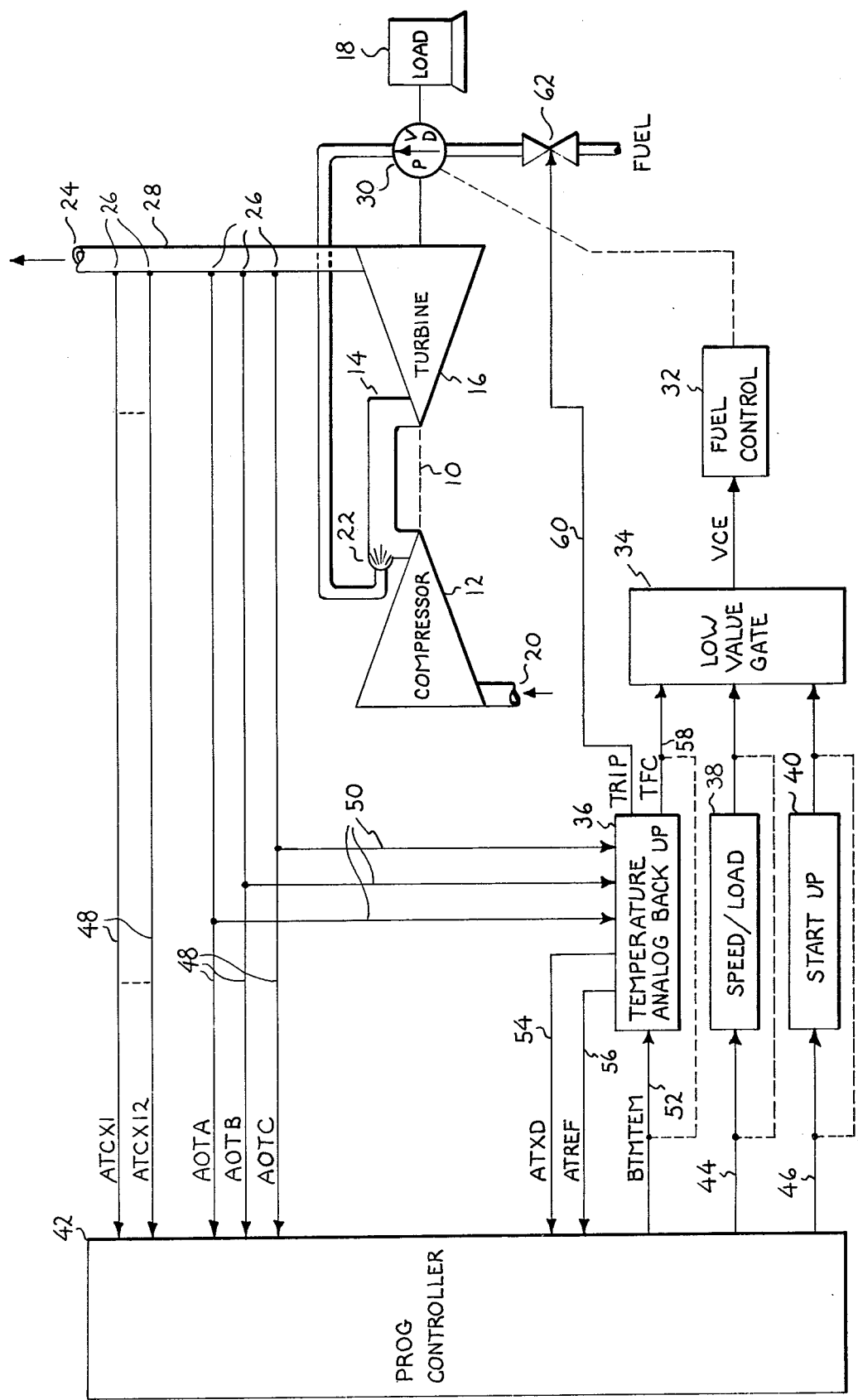
FIG. 1 is a major block diagram of a gas turbine temperature control system in accordance with the present invention.

Referring to FIG. 1 of the drawing, a simplified representation of a single shaft gas turbine shown generally as 10 includes a compressor 12, a combustion chamber 14 and turbine 16 connected to drive a load 18. Air entering a compressor inlet at 20 supports the combustion of fuel injected by a nozzle 22. The heated exhaust gasses exit from a turbine outlet 24 past distributed temperature sensors or thermocouples 26, the latter serving to generate signals for measuring exhaust temperature in an exhaust plenun 28. A shaft driven variable delivery fuel pump 30 delivers fuel to nozzle 22 at a rate which depends both upon the rotational shaft speed of the gas turbine 10 and the pump stroke setting specified by a fuel control servo 32 mechanically linked to the pump 30. The details of the fuel control servo 32 are not material to the present invention since it may include any servo mechanism which positions the stroke setting control on the pump at a position corresponding to an electrical positioning or fuel control signal (VCE), there being many devices on the market suitable for such use. Also, since the gas turbine may utilize liquid or gas fuels, a gas valve positioner could be employed to control fuel flow to the combustion chamber. The term fuel control signal is used generically herein to control fuel flow to the turbine regardless of the type of fuel used.

The fuel control signal VCE is a single valued electrical signal applied to the fuel control servo 32 by a low value gate 34. The VCE signal always has a value obtained from one of a number of input signals applied to gate 34, whereby each is intended to have a preference over a certain phase of gas turbine operation. The structure and principles of operation of the low value gate 34 are documented in detail in U.S. Pat. No. 3,520,133, entitled "Gas Turbine Control System" to A. Loft et al, and assigned to the assignee of the present invention.

There are shown in FIG. 1, three input signals provided to the low value gate 34. One of these signals is a temperature fuel control signal TFC provided from a temperature analog backup means 36 forming a part of the invention. Two other signals are applied from a speed/load control 38 and a start-up control 40. In the basic operation of the low value gate 34, its output signal VCE will always represent the value of the lowest input signal applied to that gate. That is, the fuel control signal (VCE) can be no higher than the lowest control signal supplied to gate 34. In the present embodiment the speed/load control 38 and the start-up control 40 form no part of the invention. They are merely included in FIG. 1 to more appropriately put the temperature analog backup means 36 into an overall turbine control environment for clarity and completeness of disclosure. The speed/load control 38 and the start-up 40 may be free standing units receiving input signals from various sensors in the turbine or they may receive calculated signals from a programmable controller or computer 42 via conductors 44 and 46 if the system is under computer control.

The controller 42 may be any one of several well-known types of process computers such as the General Electric 4010 or 4020 process computers, or a programmable controller such as that manufactured by General Electric Company as "Directo-Matic" logic controller. This latter controller is ideally suited for implementation into the preferred embodiment of the present invention and the details of operation of that controller are disclosed in referenced U.S. Pat. No. 3,969,722, issued July 13, 1976 entitled "Method and Apparatus For Operator Interrogation Of Simulated Control Circuits", to William J. Danco et al and assigned to the assignee of the present invention.

The controller 42 is preferably of the industrial type and includes analog to digital conversion means for converting applied analog input signals to digital values for storage in the controller memory and digital to analog conversion means for converting digital values to analog signals for output from the controller memory. Since the techniques of converting analog and digital data are well known in the art, the circuitry for performing these functions is not shown. Analog input signals ATCX1–ATCX12 and AOTA–AOTC are provided as temperature readings to the controller 42 via a plurality of conductors 48 from the turbine sensors 26. These signals possess values representative of the temperature of the exhaust plenum 28. Further, should a temperature sensor 26 fail, such as by an open or short, the value of the signal on the line corresponding to the failed sensor will provide an invalid condition to the controller indicating that the sensor has failed.

It will be noted that a plurality of specified sensor signals, as shown by the three signals AOTA, AOTB and AOTC, are provided as inputs to the temperature analog backup means 36 via conductors 60. Although these three temperature signals figure into the overall averaging of the turbine temperature, each signal's sensor is also utilized as a backup sensor for increasing the reliability of the temperature control system of the present invention. The purpose of these latter temperature signals will become more apparent as the description proceeds in connection with the temperature analog backup means 36.

The analog backup means 36 also receives a temperature trim signal or control signal BTMTEM from the programmable digital controller 42 on a conductor 52. As indicated by the dashed line continuation of conductor 52, the BTMTEM signal may be optionally provided as the temperature fuel control signal TFC to the input of the low value gate 34 when the analog backup means 36 is not implemented into the system. The previously mentioned mid-value signal generated by the analog backup means is shown applied to controller 42 as a signal ATXD on conductor 54. When the analog backup means is implemented in the system, the value of the ATXD signal is intermediate the values of the three backup sensor inputs AOTA-AOTC. However, if the analog backup means is not implemented into the system, the ATXD signal is not needed by the controller. This will become apparent in the ensuing description.

An additional input to the controller 42 from the analog backup means 36 is an analog temperature reference signal ATREF on a conductor 56. The ATREF signal is an analog voltage proportional to a desired turbine operating temperature, the value being set at a safe level for all possible operating conditions. In the embodiment of FIG. 1, the ATREF signal is shown as being generated by the analog backup means 36. However, the ATREF signal may come from any suitable analog voltage source for application to the controller. A value corresponding to the ATREF signal may optionally be stored in the controller instead of providing it by an external source. In any event the ATREF signal may be utilized in calculating the BTMTEM signal when the analog means is incorporated in the system. The ATREF signal is also used by the analog backup means 36 as will subsequently be described.

The temperature control analog backup means 36 generates two additional output signals, the temperature fuel control signal TFC on a conductor 58 and a TRIP signal on a conductor 60. The TRIP signal is applied as a control signal to a fuel control valve 62 via a conductor 60. It is utilized to shutoff fuel going to the turbine in the event of certain system failures to be subsequently described.

Figure 2:
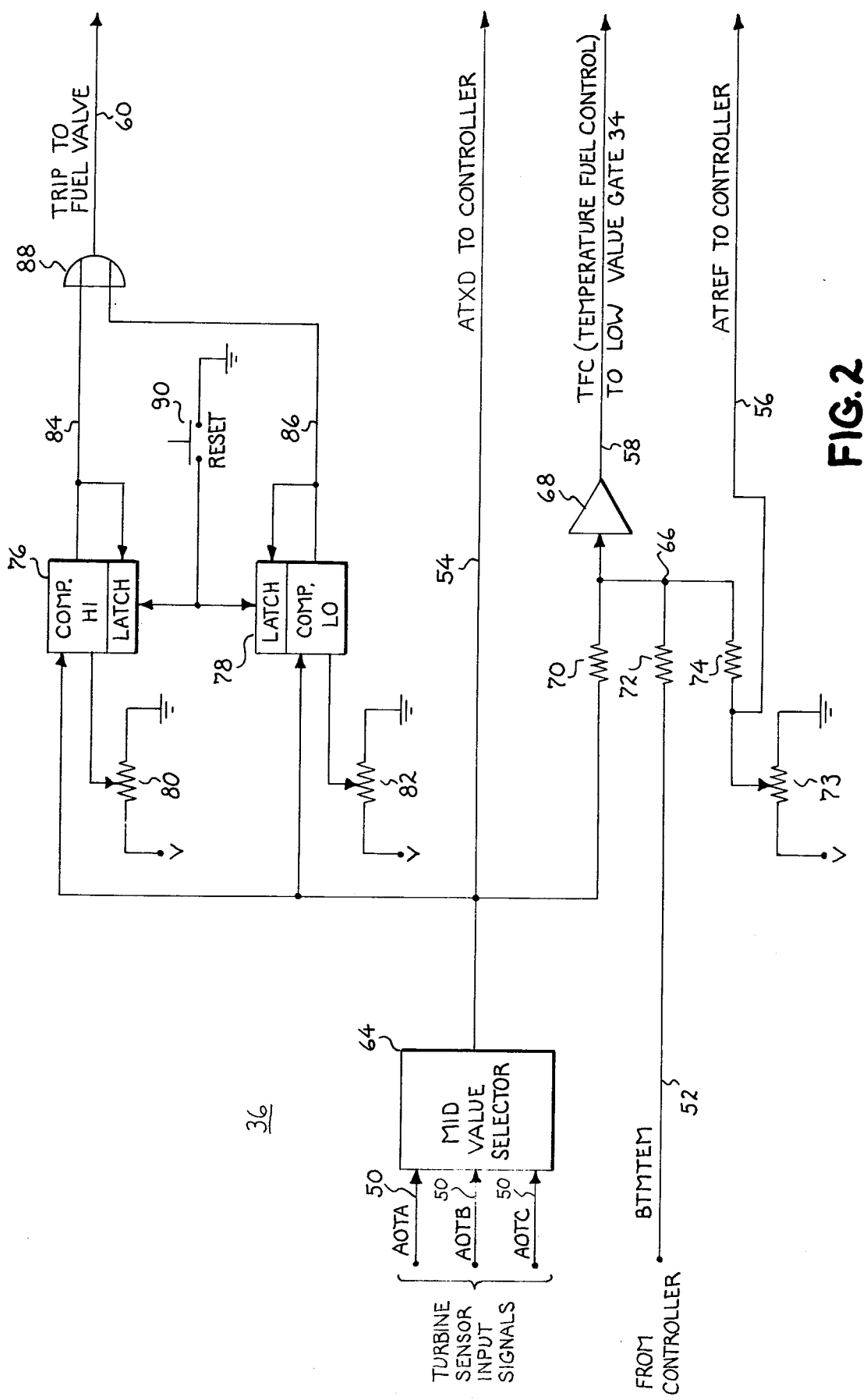
FIG. 2 is a schematic block diagram of the analog backup means of FIG. 1.

Reference is now made to FIG. 2 which shows in schematic block diagram form one embodiment of the analog backup means 36. This circuit is comprised of a mid-value selector 64 of known type for receiving the backup analog sensor inputs AOTA, AOTB and AOTC on conductors 50. The details of the mid-value selector 64 are described in U.S. Pat. No. 3,492,588, entitled "Median Selector For Redundant Signals", to M. P. Woodard, Jr. and assigned to the assignee of the present invention. The mid-value selector 64 provides the ATXD signal on conductor 54 to the controller 42. As previously mentioned, the ATXD signal, under normal sensor operating conditions, takes on a value mid the values of the signals applied to the mid-value selector. Further, the ATXD signal normally has a value approximately proportional to the average turbine exhaust temperature. The ATXD, BTMTEM and ATREF signals are all provided to a summer shown as a junction 66 where these signals are algebraically combined for input to an amplifier 68, the output of which provides the TFC signal to the low value gate 34.

The ATXD signal is applied to the summing junction 66 through a resistor 70 and the BTMTEM signal is applied to the junction 66 via a resistor 72. The ATREF signal, the temperature reference, is provided to the junction 66 through a resistor 74 and to the controller on conductor 56. The ATREF signal is derived from a voltage source V and ground potential via a slider resistor 73.

Still referring to FIG. 2, the ATXD signal is also supplied to the two conventional comparator amplifier latch circuits 76 and 78. Each of the comparator latch circuits has a voltage reference input from corresponding slider resistors 80 and 82, each connected between voltage source V and ground for providing a voltage reference for comparison with their respective inputs. The comparator and latch circuit 76 has its input voltage from slider 80 adjusted to a specified voltage level whereby the comparator circuit is activated when the output signal ATXD from the selector 64 achieves a high value in excess of the specified voltage from slider 80. In a similar fashion, the slider 82 is adjusted to cause the comparator latch 78 to be activated when the ATXD signal achieves a low value in excess of the specified voltage setting of slider 82. Typically, in the operation of the trip circuit of the analog backup means, when two or more of the sensors providing the AOTA through AOTC signals to the mid-value selector 64 are shorted, the signal ATXD will go to a low or negative value, activating the comparator latch 78. In a similar fashion, if two or more of the sensor input signals show an open condition, the output signal ATXD will go to a high voltage activating the comparator latch circuit 76. Each of the comparator outputs are tied back through their corresponding output conductors 84 and 86 to their latch circuits to cause each of the comparators to set to a latched state when activated. Whenever either one of the comparator latch circuits is activated, that circuit's output signal is passed through an OR gate 88 generating the TRIP signal on conductor 60 to activate the fuel control valve 62 (FIG. 1) shutting off fuel to the turbine. Further, the mid-value signal ATXD can exceed the threshold setting established by slider 80 should the turbine temperature become excessive. This will also cause a generation of the TRIP signal.

Whenever the turbine is shut down it will remain down until restarted through operator intervention. In order to reactivate the supply of fuel to the turbine, an operator must depress a reset switch 90 (FIG. 2) applying a suitable potential, such as a ground signal, to each of the latch circuits 76 and 78. This ground signal resets the activated comparator, thus deactivating the TRIP signal which opens the fuel control valve to allow fuel to flow to the turbine. Obviously, the supplying of fuel to the turbine is integrated with overall turbine start-up not a part of this invention.

Prior to proceeding with an overall operational description of the invention, it is considered advantageous to first reference FIG. 3 which illustrates an exemplary memory map for the storage of programs and data as stored in the memory of the programmable controller 42. The exemplary memory map is segmented into eight portions; (1) input data, (2) output data, (3) constants and masks, (4) master status program, (5) scratch, (6) temperature control program, (7) other control programs and (8) sequencing program. The master status program may be considered as the executive program in the present embodiment in that it controls the reading of all information into the controller and the transfer of control information from the controller to the turbine. The master status program is similar to a program described in the aforementioned U.S. Pat. No. 3,969,722 and identified therein as "Initialization and Standard Status Program" (ISSP).

Under control of the master status program, the temperature sensor input signals ATCX1-ATCX12 and AOTA-AOTC in FIG. 1 are read into the input data portion of the memory of FIG. 3 as temperature sensor conditions and temperature values. Also, the ATXD and ATREF signals are read into memory by the master status program. All of these input signals are stored in digital form in the input data portion of the memory subsequent to the performance of an analog to digital conversion thereon.

The output data portion of the memory of FIG. 3 contains calculated data in the form of a trim or fuel control signal for controlling the turbine which results from the execution of the temperature control program comprised of three subroutines TCC, TCA and PPR. As shown in FIG. 3, the temperature control program is utilized to calculate the temperature of the turbine and the value of the trim or fuel control signal. The values calculated by the temperature control program are then stored in the output data portion of the memory for output through a digital to analog converter to the turbine.

The constants and masks portion of the memory has been included merely for completeness to show that conventionally the memory stores this type of data for use by the programs. For a similar reason, the scratch portion or working storage is shown to illustrate that the programs utilize a portion of memory into which data is written and read from during execution of the programs.

The other control programs portion of the memory in FIG. 3 is shown merely to indicate that other programs may reside in the memory; for example, programs to control the speed/load and the start-up circuits 38 and 40. The final portion of the memory, the sequencing program, is included for completeness to illustrate a program for simulating relay logic, etc. in electrical ladder diagram form. A program of this type is described in the aforementioned U.S. Pat. No. 3,969,722 and identified therein as an Application Program.

A detailed description of the master status and sequencing programs is not included in the present embodiment. A detailed description of programs of these types may be found in the aforementioned U.S. Pat. No. 3,969,722. A description of an analog to digital conversion program for converting the sensor inputs to digital values is not included since analog to digital conversion programs and hardware are well known in the art and such inclusion would add nothing to an overall understanding of the invention.

Figure 4:
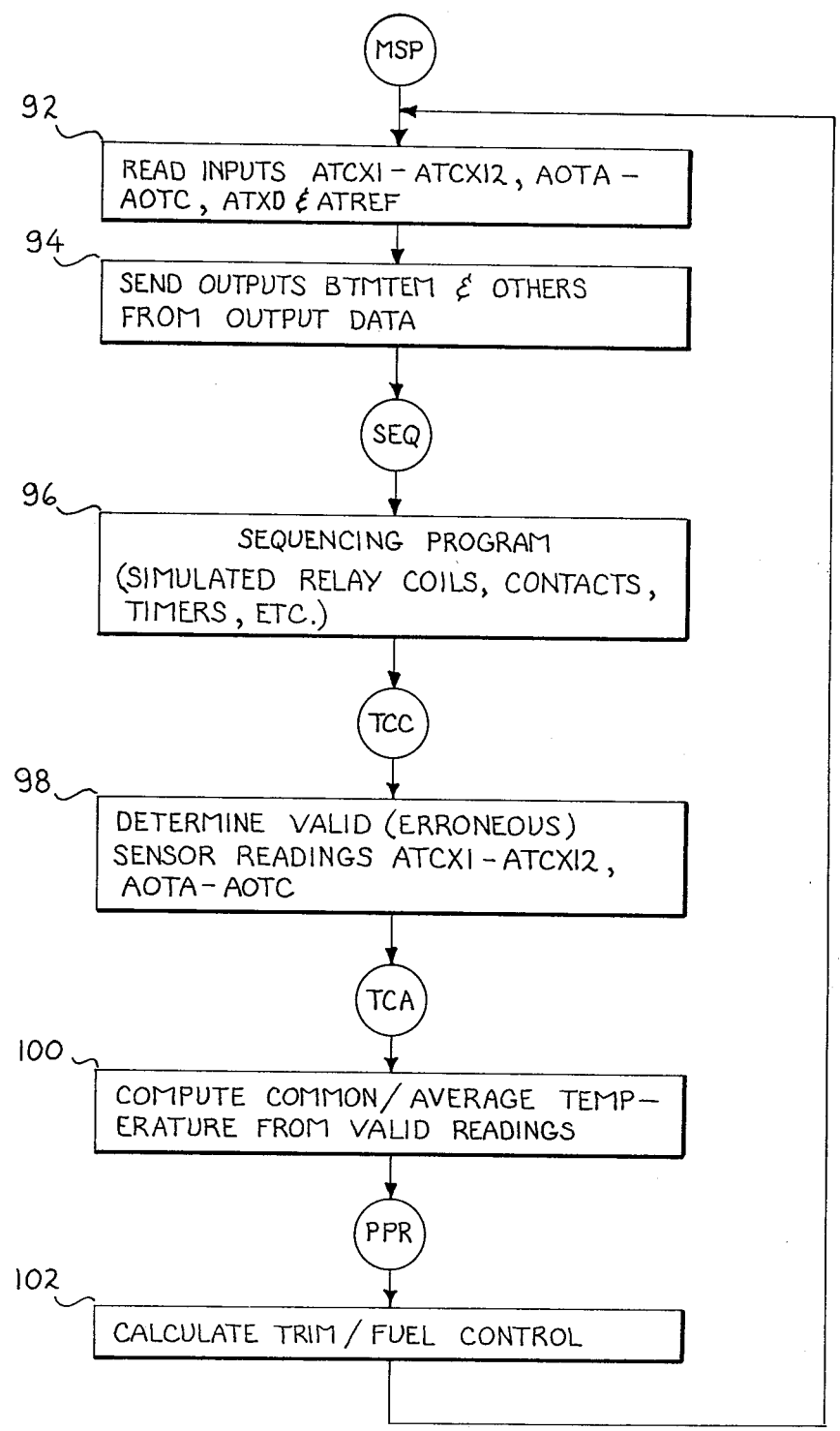
FIGS. 4 through 8 are functional flow charts of an exemplary program for carrying out one embodiment of the present invention.

Reference is now made to FIG. 4 which is a high level flow chart showing the overall program of the present invention for controlling the gas turbine 10. The program is comprised of a master status program (MSP), a sequencing program (SEQ) and a temperature control program which includes a thermocouple calculation (TCC) subroutine, a temperature calculation (TCA) subroutine and a temperature trim (PPR) subroutine. The programs are shown as being sequentially executed in a loop such that, for each sweep cycle through the loop, the program returns to the MSP from the PPR.

Still referring to FIG. 4, when the control system o the present invention is first started up, the controller 42 effects an entry into the master status program (MSP) into an action block 92 whereby that program reads the input signals ATCX1-ATCX12, AOTA-AOTC, ATXD and ATREF into the input data portion of the memory. These input signals, as previously described, are analog in nature and are converted to digital form for storage in the controller memory. After the input data is stored, the MSP enters block 94 and sends output signals BTMTEM and others not shown to the turbine from the output data portion of the memory. Obviously, on the first sweep cycle through the program there will be no data in the output data portion of memory. However, after the first or subsequent sweep(s) through the program, data will exist in the output data portion of the memory.

The program now proceeds to the sequencing program (SEQ), if implemented into the system, whereby the SEQ is executed to simulate a relay or logic controller by simulating relay coils, contacts, timers, etc. to develop output control signals for the turbine to actuate various indicator lights, solenoids, solenoid drivers, etc. not shown. The results of information derived from the execution of the SEQ program are stored in the output data portion of the memory for subsequent transfer to the turbine during block 94 of the MSP.

After execution of the SEQ program the temperature control program is entered at TCC, the thermocouple calculations subroutine of block 98. The TCC subroutine has one primary function, and that is to determine the validity or reliability of the turbine temperature sensors by examining sensor words corresponding to the sensor temperature readings ATCX1-ATCX12 and AOTA-AOTC in the input data portion of the memory (FIG. 3). In the preferred embodiment, this determination is made by the TCC program examining a specified bit in each of the words corresponding to the sensor readings. This bit in each of the sensor words is referred to as a validity flag which is either set or reset during the analog to digital conversion of each of the sensor signals ATCX1-ATCX12 and AOTA-AOTC. It is well known in the art that overflow and underflow detection techniques are commonly used in analog to digital computation to determine whether the value of an analog signal is either above or below specified values. Another obvious way to determine the validity of sensor conditions would be to merely set arbitrary maximum and minimum values for the sensor words and to compare the actual value of each word with the predetermined values and set a flag if those predetermined values are exceeded.

The TCA subroutine is entered from TCC at an action block 100. The primary purpose of the TCA subroutine is to compute a common or average temperature from the number of valid readings previously calculated in the TCC subroutine. The TCA subroutine, upon its completion, effects an entry into the PPR subroutine shown by action block 102. The PPR subroutine, based on the results of the computed common or average temperature as established by the TCA subroutine, calculates the output trim or fuel control signal BTMTEM.

Upon completion of the PPR subroutine, the program returns to the MSP and the above described sequences are repeated. As previously described, the BTMTEM signal is transferred to the turbine during the execution of block 94 of the MSP.

The overall operation of the TCC, TCA and PPR subroutines will now be described in connection with FIGS. 5 through 8 which illustrate in functional flow chart form the operational details of those subroutines.

Figure 5:
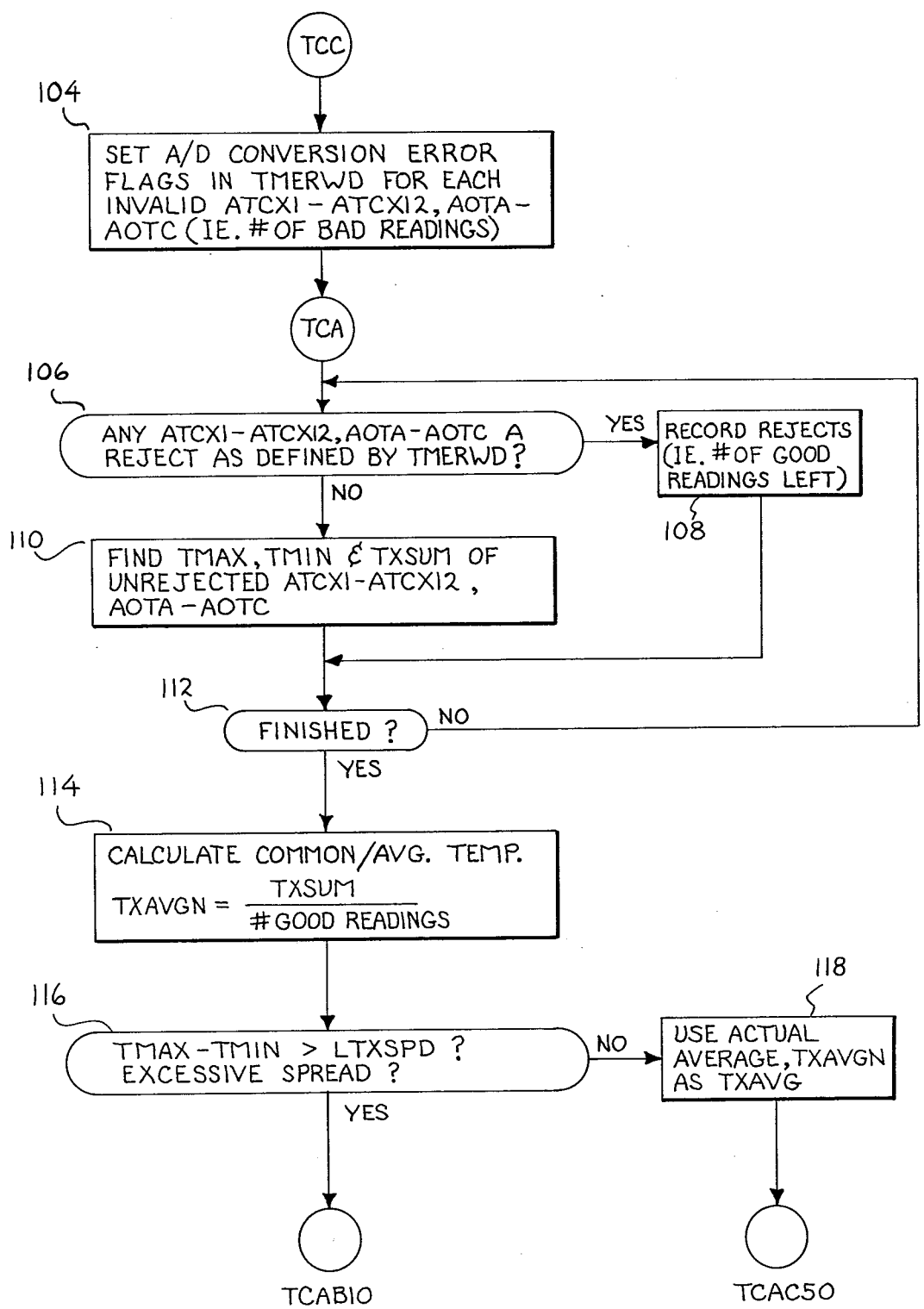

Referring now to FIG. 5, the TCC subroutine is entered directly from block 96 of the sequencing program of FIG. 4. The TCC subroutine is a relatively simple subroutine, as shown by action block 104, wherein the program effects the setting of analog to digital (A/D) conversion error flags in a word in scratch or working storage designated TMERWD for each invalid or erroneous sensor reading. As indicated in block 104, one flag corresponds to each of the ATCX1-ATCX12 and AOTA-AOTC signals or conditions. This is accomplished by the TCC subroutine examining the previously mentioned flag bit in each of the sensor words to set or reset a corresponding error flag bit in location TMERWD in scratch storage in accordance with the status of each sensor flag bit. An error flag is set if its corresponding sensor word flag bit was determined to be invalid, otherwise the error flag bit is reset or cleared. An error flag bit which is set indicates that that flag bit's corresponding sensor (derived from a corresponding sensor word) is either open or shorted indicating an invalid reading.

The TCA subroutine is now entered into a program loop comprises of blocks 106, 108, 110 and 112. In this loop, a test is performed to see how many of the sensor input readings, if any, are invalid as defined by the set error flags in the thermocouple error word TMERWD. Upon each entry into this loop, a test is performed in block 106 on one bit of the TMERWD corresponding to one of the sensor input readings or words ATCX-1-ATCX12, AOTA-AOTC to determine if the error flag bit in TMERWD is set or reset. Each time a flag bit in TMERWD is tested, if that bit is set, indicating that its corresponding sensor word is to be rejected, the program will exit block 106 through a YES branch entering into an action block 108. In block 108 a running record is kept of the number of rejects or invalid sensor readings. This recording of the rejected readings could be accomplished in a number of ways. In the present embodiment a program counter is employed. Prior to entry into block 108, this counter is loaded with a number representative of the number of sensor inputs (15 in the present embodiment). For each entry into block 108 the counter is decremented by one. Thus, the number in the counter always indicates the number of good readings remaining (i.e., the number of valid sensors existing in the system).

Upon each entry into block 106, if the flag bit being tested in the TMERWD is reset, indicating a valid reading, entry is made through the NO branch into block 110. Block 110 is an action block wherein the TCA subroutine finds the maximum (TMAX) temperature or value of the sensor readings, the minimum (TMIN) temperature or value of the sensor readings and the sum (TXSUM) temperature or value of the sensor readings. If will be noted that, since entry into block 110 is always via the NO branch of block 106, the values of TMAX, TMIN and TSXUM are always related to the unrejected or valid sensor readings. After each flag bit in location TMERWD has been tested, the program exits through a finished decision block 112 through a YES branch into a block 114.

In block 114 a common or average turbine temperature is calculated by storing a value representative of that temperature in a location TXAVGN, whereby the value of TXAVGN is representative of the value of TXSUM divided by the number (#) of good readings previously recorded in block 108. Upon entry into block 114, if all of the temperature sensor readings were found to be valid, the value placed in TXAVGN is the actual average turbine exhaust temperature. However, if one or more sensor readings were rejected, that is found to be invalid, the value stored in TXAVGN is an average temperature of the valid temperature sensor readings.

Entry is now made into a decision block 116 and a test is performed to see if the difference between TMAX and TMIN is greater than a constant LTXSPD stored in the constants portion of the memory. This test checks to see if the spread between TMAX and TMIN is excessive. If the spread is not excessive, indicating that the temperature sensors are providing within limits readings, the program exits through a NO branch to point TCAC50 through a block 118. Block 118 is not an action block but has been included as a descriptor to indicate that the program is to use the actual average calculated temperature TXAVGN as the average temperature TXAVG. TXAVG is a location in scratch memory.

Figure 6:
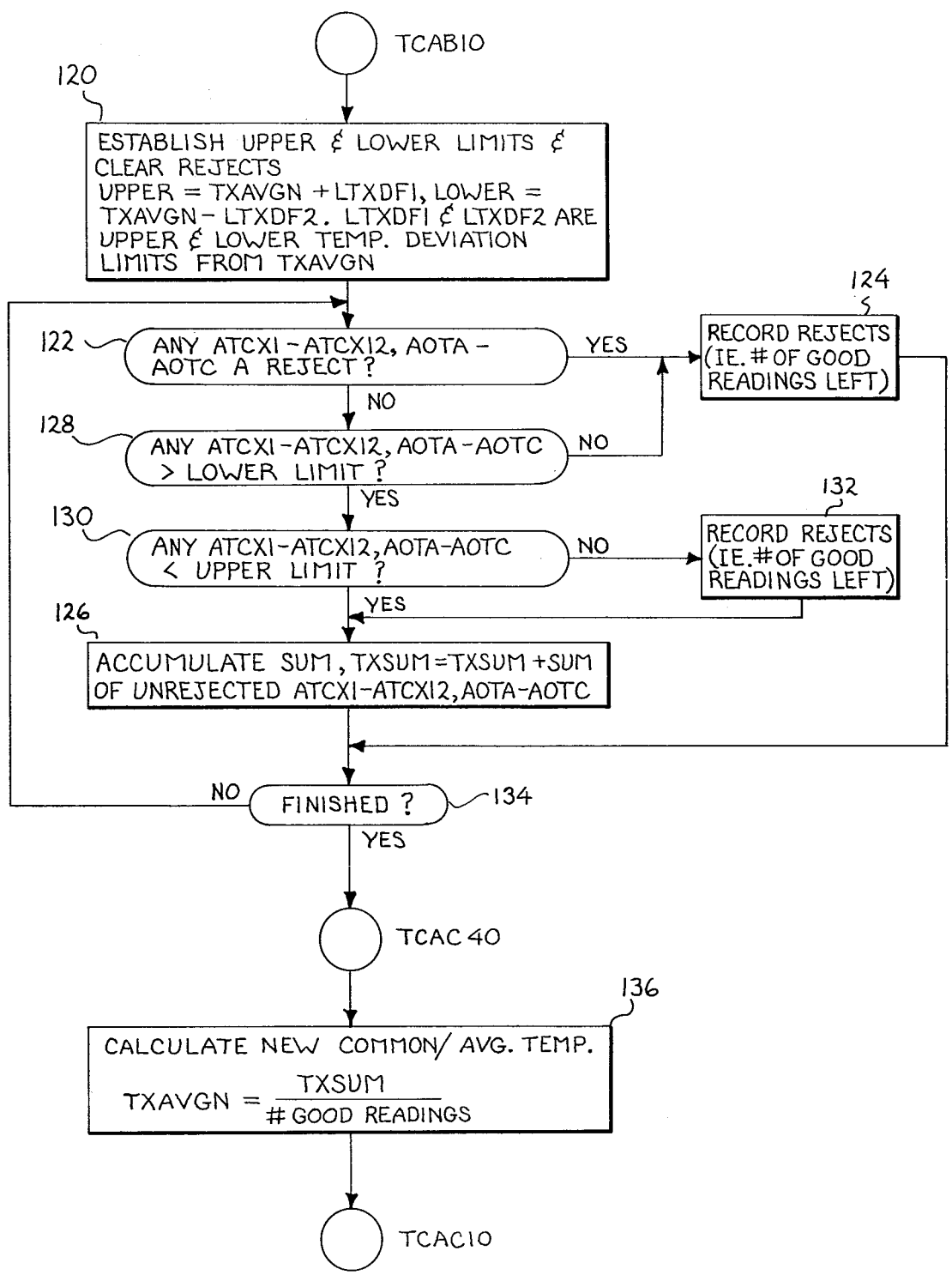

Still referring to FIG. 5, if the temperature spread is excessive, it indicates that a potential turbine combustion problem exists or possibly a temperature sensor is providing an erroneous reading and the program exits through the YES branch of block 116 to a point TCAB10 of FIG. 6. One potential problem which could exist is that something could possibly go wrong with a temperature sensor causing that sensor to generate either an artifically low or high reading not indicative of an invalid sensor condition. If this artifically low or high reading is factored into the overall common or average turbine exhaust temperature, it could cause the turbine to be artifically fired to generate more temperature than is required or to cut down fuel flow thus generating less temperature than is desired. (An overfiring of the turbine can cause serious damage to or degradation of its component parts whereas underfiring will cause a decrease in the performance of the turbine.) A second possible problem is that a clogged fuel nozzle in one of the combustion chambers could result in an indication of a cold spot or low temperature spot in the turbine exhaust. Should this condition occur, an out of limits reading will again cause the turbine to be overfired. The reverse analogy could also be applied for hot spots in the turbine whereby a malfunctioning nozzle could be providing more fuel to the turbine than is required or specified. In view of the above problems, as detected by the temperature spread test in block 116, it is desirable to isolate definite or potential problems.

The flow chart of FIG. 6 shows the actions taken by the temperature control program to first of all identify the potential combustion problem areas in the turbine and to then recalculate the common or average temperature for use in controlling the turbine. Upon entry at point TCAB10 at block 120 the program initializes system parameters in preparation of testing for and isolating the combustion or sensor problems. This is accomplished by first establishing upper and lower temperature limits whereby a memory location UPPER (Upper Limit) is set equal to the value of TXAVGN, the calculated common or average temperature, plus the value specified by an upper temperature limit LTXDF1 in the constants portion of the memory. In a similar fashion, a lower temperature limit is established by setting a memory location LOWER equal to TXAVGN minus the value of a lower limit temperature constant LTXDF2. In block 120, LTXDF1 and LTXDF2 specify the maximum upper and lower temperature deviation limits of TXAVGN. Additionally, in preparation for recalculating the turbine temperature, the reject counter as previously established in block 108 of FIG. 5, is cleared.

Entry is now made into a decision block 122 wherein a test is again performed similar to that previously described for block 106 of FIG. 5 to see if any one of the sensor input readings is an invalid or reject reading. For each sensor reading determined invalid, a record rejects block 124 is entered, via the YES branch from block 122, wherein the rejected sensor readings are recorded as previously described in connection with block 108 of FIG. 5. Exit from block 124 is to a finished decision block 134. The program will continue to loop through the NO branch of block 134 back to block 122 until all of the sensor readings have been tested.

Reference is now made back to the NO branch of block 122 entering into a decision block 128. Block 128 is entered upon each pass into block 122 whenever the sensor reading being tested is not to be rejected. In block 128 a test is performed to see if the temperature specified by each of the temperature readings ATCX-1-ATCX12 and AOTA-AOTC is greater than the lower limit previously established in block 120. Each reading that is not greater is recorded as a rejected reading in block 124. The rejection of a reading in block 128 is indicative of a combustion or temperature sensor problem. For each reading which is greater than the lower limit, a YES branch is taken into another decision block 130.

In a block 130 a similar test to block 128 is performed to see if any of the sensor readings are less than the upper limit as previously established in block 120. Any one of these readings which is out of limits will cause the program to take the NO branch and record that reading as a rejected sensor in block 132. Block 132 returns back to block 126. For each reading which is within limits, the program will take the YES branch entering into block 126. It will be noted that the record reject block entered from block 130 is shown as block 132; however, it represents the same counter as blocks 124 or 108. They are shown separately for simplicity and because they have different entry points to the subroutine.

In block 126 a new temperature sum is accumulated or calculated by setting location TXSUM equal to its present value plus the sum of the unrejected sensor readings (i.e., the number of good readings left). Exit from block 126 is into the finished decision block 134 whereby a branch is taken through the NO exit back to block 122 until each of the sensor readings for inputs ATCX1-ATCX12 and AOTA-AOTC has been tested. The operation of this loop is somewhat similar to that previously described in connection with FIG. 5 for blocks 106, 108, 110 and 112. After all of the sensor readings in FIG. 6 have been tested, exit is made through the YES branch of block 134 to a point TCAC40 entering into a block 136.

In block 136, a new common or average temperature is calculated wherein location TXAVGN is now updated to the contents of the new or accumulated TXSUM divided by the number of new good readings established in blocks 124 and 132. The program proceeds to a point TCA10 of FIG. 7 into a block 140. In block 140 the controller now tests for hot and cold spots in the turbine combustion chambers to identify potential combustion problems. This is accomplished by the program testing groups of temperature sensor readings corresponding to groups of adjacent sensors circumferentially disposed around the exhaust plenum. For example, the 15 sensors generating signals ATCX1-ATCX12 and AOTA-AOTC can be segmented into five groups of three sensors each. The program then checks each group of three sensors to see if the sensors in each group are providing valid within temperature limits readings. If any group shows a cold spot within the exhaust plenum, a cold spot flag TCACS is set in the output data portion of memory. If any group designates a hot spot reading, a hot spot flag TCAHS is set in the output data portion of memory. Though not shown in the flow charts of the present invention, the TCACS and TCAHS flags could be used by the program to generate an output signal during the running of the master status program to sound an alarm to notify an operator that either a cold or hot spot resides in the turbine. On completion of block 140, a block 142 is entered through a point TCAC50. It will be recalled that point TCAC50 is also entered from block 118 of FIG. 5 as previously described. Upon entry into block 142 the common or average temperature TXAVGN will be the actual average temperature as previously calculated in FIG. 5, or it will be the newly calculated common or average temperature as just described in connection with FIG. 6. In block 142 it is now desirable to test or check for the minimum number of temperature readings (i.e., ATCX-1-ATCX12 and AOTA-AOTC) which are within limits. This is accomplished by the program subtracting the contents of a constant in memory from the contents of the counter specifying the number of good readings. As previously described, the counter was set in blocks 124, 132 or 108. An excessive number of temperature readings out of limits flag, TCATN, will be either set or cleared (reset) in accordance with the results of this subtraction. TCATCN is set if an overflow condition occurs indicating that too many temperature readings are invalid (for example, the number of good readings is less than 8). The TCATCN is an abort flag which is tested in the PPR subroutine to cause the program to abort from computer control to analog backup control. As shown in block 142, the contents of location TCATCN are transferred to a location DTMABT in the output data portion of the memory during the SEQ routine. Upon completion of block 142, action block 144 is entered.

In block 144 a test or check is made to see if there has been an excessive change in the common or average temperature since the last temperature calculation. This is accomplished by testing to see if the contents of a memory constant LTXAVG is equal to the newly calculated temperature, TXAVGN, minus the old calculated temperature, TXAVG. For example, if the contents of LTXAVG are equal to 25 degrees F. and if that is the maximum allowable temperature change between any two entries into the temperature control program, an excessive temperature flag TCAAVG is set. If the contents of LTXAVG is less than 25 degrees F., then the TCAAVG flag is reset or cleared.

Entry is now made into block 146 wherein the common or average temperature is updated by setting location TXAVG (old temperature average) to the newly calculated average TXAVGN. If the analog backup means is incorporated into the system, block 147 is entered. If the system is under pure computer control (no backup) an operational temperature trimming program PPR' is entered. Let it first be assumed that the analog backup means resides in the system. Thus, block 147 is entered wherein a scratch memory location KVAL1 is set equal to the difference between ATXD (the mid-value signal) and TXAVG (the present average temperature). Entry is now made to a decision block 148 of the PPR subroutine of FIG. 8 where a test is made to determine if the system should abort from computer control to the temperature analog backup means 36. This test is performed by testing to see if the abort bit DTMABT is set equal to a binary 1 (see block 142 of FIG. 7). If it is a binary 1, the program takes a YES branch into a block 150 wherein the trim or fuel control signal BTMTEM is decremented a predetermined amount whereby the BTMTEM signal will ramp down toward zero in a step fashion for each pass through the temperature control program. As previously described, the BTMTEM signal is transferred to the analog backup means during execution of the MSP. The PPR then returns control to the MSP for entry thereto from block 150. It will be recalled, as previously described in connection with FIG. 2, whenever the trim signal BTMTEM is at zero, that signal is no longer a controlling factor and thus the output of the amplifier 68 is representative of the algebraic sum of the mid-value signal ATXD and the analog reference ATREF. It is in this manner, when the computer output is aborted by the BTMTEM signal being ramped to zero, that the analog backup means takes over control of the turbine to provide the temperature fuel control signal TFC on conductor 58 to the low value gate 34 to control fuel flow to the turbine. It is also significant to point out that most industrial control computers of the type contemplated by the present invention usually encompass test routines to check for the validity of computer operation (e.g., memory parity, analog input/output accuracy, etc.). Additionally, some type of "watch dog" timer is sometimes included. This timer is periodically interrogated by the program to insure that the computer is operating properly. The detection of any computer failure may also be used to cause the BTMTEM signal to be ramped to zero in a manner similar to that described in block 150.

Again referring to block 148, if the abort flag DTMABT is not set, the program will exit through the NO branch entering into an action block 152. In this block a delta temperature reference DELR1 is setup in memory to a value equal to the temperature base (TBASE) minus the value of the analog temperature reference (ATREF). TBASE is a value representative of a desired base turbine operating temperature (normally operator specified). When the analog backup means is incorporated into the system, the calculation of DELR1 may be used as one factor in developing the correct value for the BTMTEM signal. It has application because of the expected differences between the values of TBASE (e.g., 850° F.) and ATREF (e.g., 800° F.)

It will be recalled that ATREF always has a value which is safe for all turbine temperature operating conditions. Additionally, in block 152, a memory location KVALR1 is set equal to the value of KVAL1 previously established in block 147 of FIG. 7 whereby KVAL1 is a ramped value which causes the BTMTEM signal to change as an integrated signal to thereby precisely control the operation of the turbine so that radical changes in fuel flow do not occur. The program now proceeds to the last step in the operation of the PPR subroutine into a block 154. In this latter block the output trim or fuel control signal BTMTEM is calculated by setting location BTMTEM in the output data portion of memory equal to the contents of DELR1 (TBASE-ATREF) plus the contents KVALR1. (KVAL1 ramped=ATXD-TXAVG). The program will now proceed back to the master status program MSP wherein BTMTEM is transferred to the analog backup means.

Figure 7:
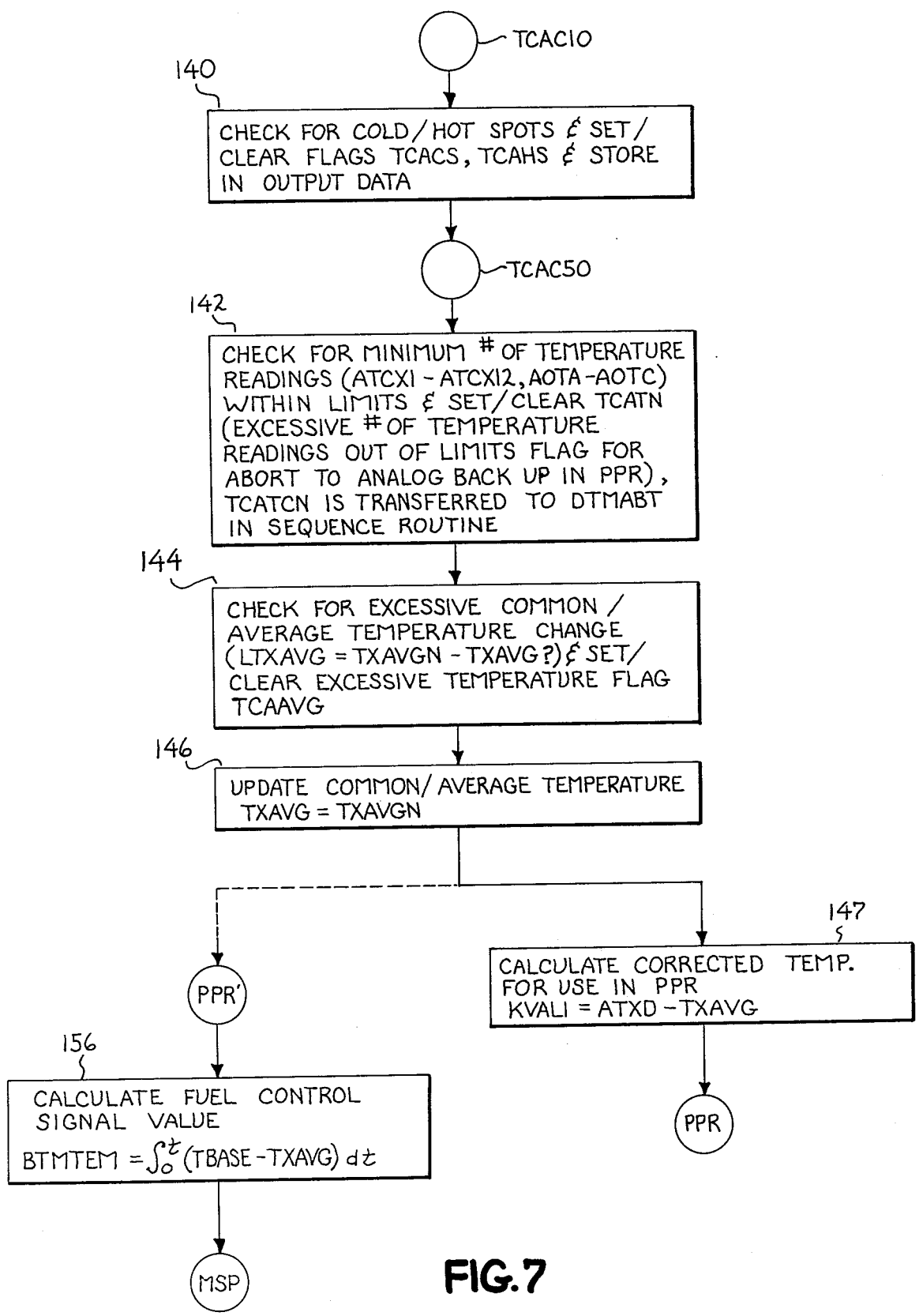

Reference is now made back to the output of block 146 of FIG. 7. In FIG. 7 there is shown by dashed lines a variation on this embodiment of the invention whereby the program can circumvent the PPR subroutine and enter into a PPR' subroutine at a block 156. The PPR' subroutine is implemented into the controller of the present invention whenever the analog backup system is not included in the overall system. That is, when all control for the gas turbine is by complete digital implementation of controller 42. When the PPR' subroutine replaces the PPR subroutine, the BTMTEM signal on conductor 52 (FIG. 1) is applied directly to the low value gate 34 as the TFC signal. This is an integrated signal having the value:

$$BTMTEM = \int_0^t (TBASE - TXAVG) dt.$$

The BTMTEM signal developed in block 156 is transferred to the output data portion of the memory in the same manner as previously described in connection with block 154 and control is returned back to the MSP.

As previously mentioned, the BTMTEM signal is an analog signal. When the system is implemented as a pure digital control system using the PPR' subroutine of FIG. 7, the digital to analog converter of the digital controller can contain an integrator at its output for performing the integration function as shown in block 156. It is significant to point out, however, if desirable, the value of BTMTEM can also be calculated by programming the integration function. This could be accomplished by establishing a value V equal to TBASE minus TXAVG and then comparing the value V against positive and negative values X and −X representative of a specified turbine temperature spread and then setting the value of BTMTEM equal to BTMTEM plus or minus a corresponding integration constant K or −K to integrate the BTMTEM signal positively or negatively in accordance with whether V is greater than X or if V is less than −X.

Figure 8:
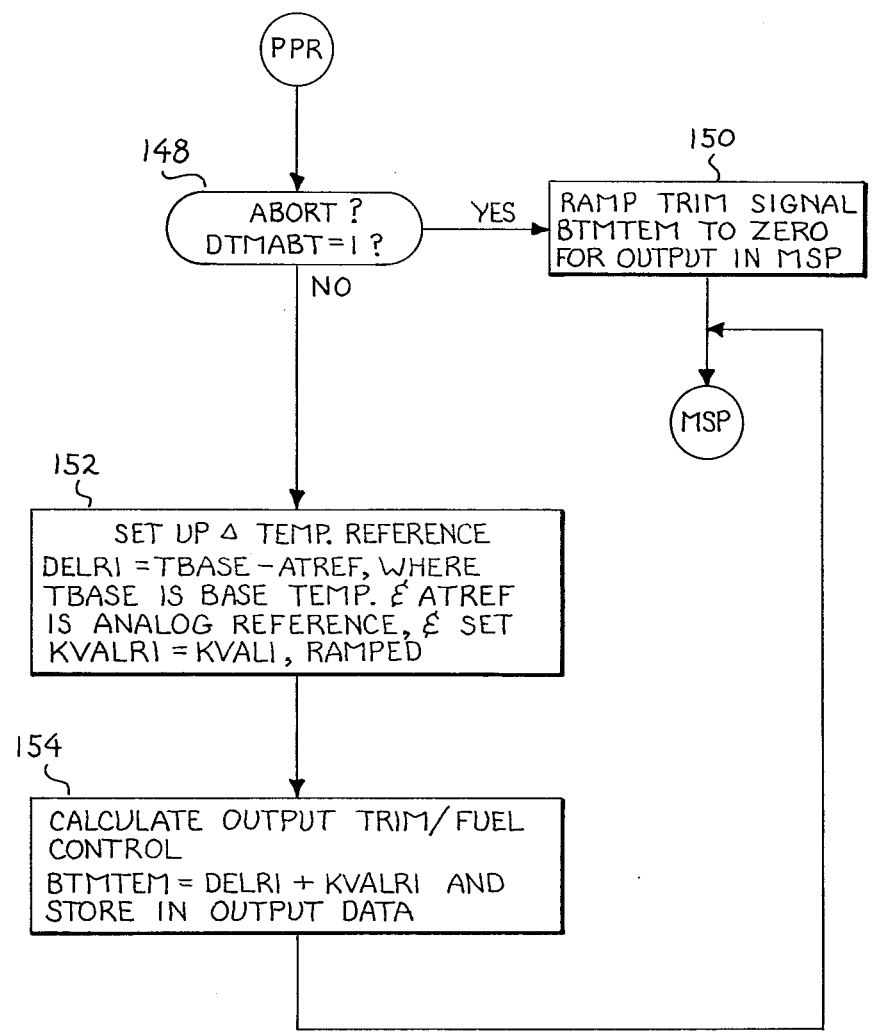

Reference is now made back to FIG. 8 to block 154. In that block, wherein BTMTEM is calculated, DELR1 can be left out of that equation and the system will still operate properly. The value of DELR1 is relatively small in that the difference in the values of TBASE and ATREF is small. As a result, the omission of DELR1 from the calculated value of BTMTEM will introduce only a very small error in the fuel control signal. However, the accuracy of turbine temperature control is enhanced with the inclusion of the DELR1 signal.

For completeness of disclosure a copy of an assembly program listing of the temperature control program for operation in the aforementioned "Directo-Matic" logic controller is annexed hereto as "Appendix A" forming a part of this specification. It is recognized that system software (i.e., programs) are sometimes characterized with minor faults known as bugs which sometimes take long periods of time to detect and/or diagnose. Ordinarily the correction of such faults is within the skill and control of system programmers. Accordingly, the appended listing may be expected to contain some faults of this kind but all such faults which have been detected required only a programmer's skill for correction.

Figure 9:
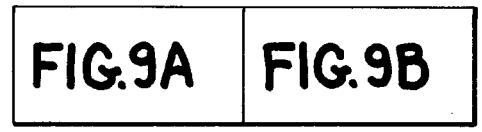
FIG. 9 is a legendary drawing showing the interrelationships of FIGS. 9a and 9b.
Figure 9B:
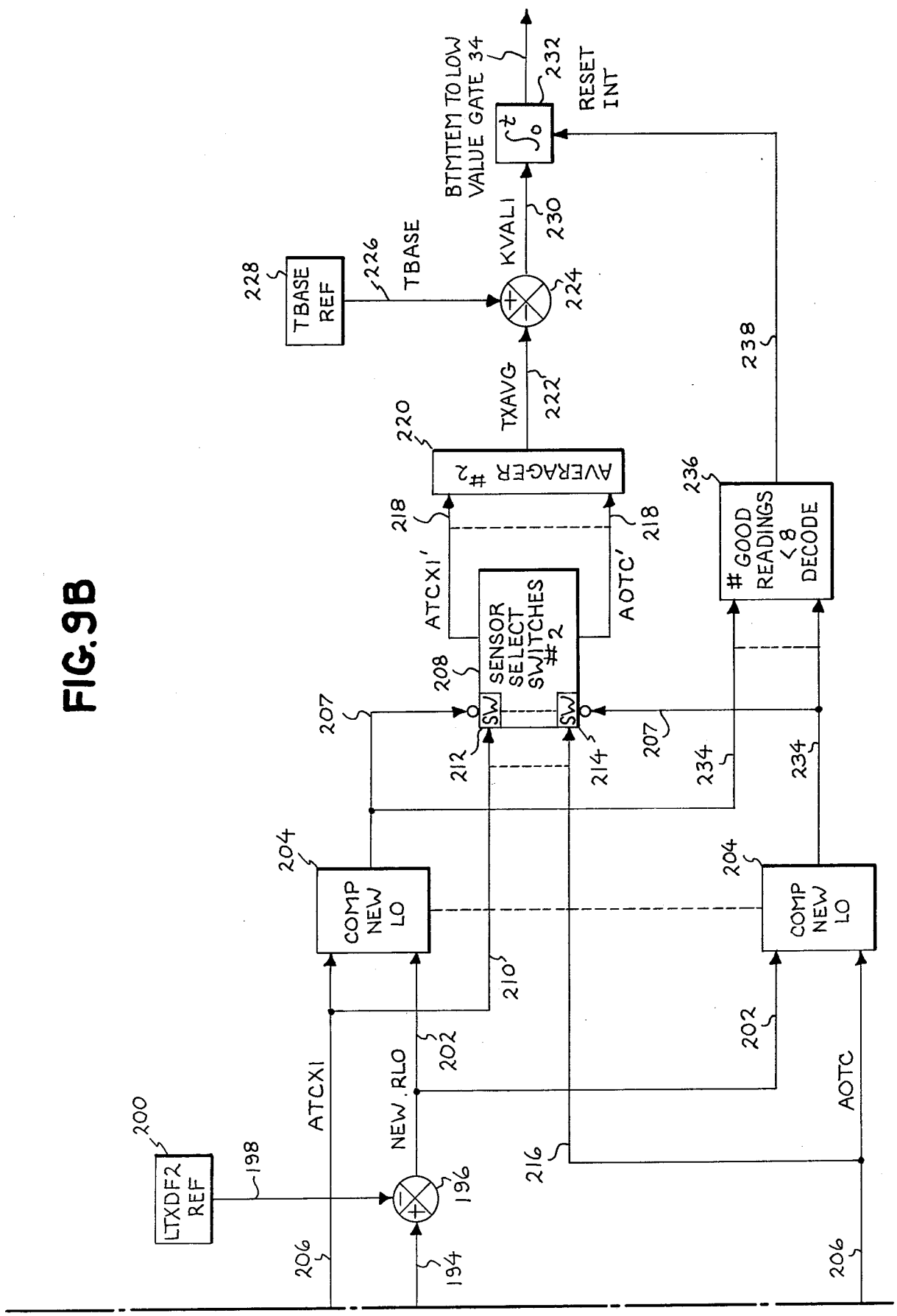

Reference is now made to FIGS. 9, 9a and 9b. FIG. 9 is a legendary drawing showing the interrelationship between FIGS. 9a and 9b. FIGS. 9a and 9b illustrate, as a second embodiment of the invention, an analog controller for monitoring the sensor signals ATCX1 through AOTC on conductors 48 from the turbine sensors 26. In this embodiment the analog controller of FIGS. 9a and 9b replace the programmable controller 42 of FIG. 1. Further, in this embodiment the temperature analog backup means 36 of FIG. 1 is not utilized in controlling the operation of fuel flow to the turbine. This is illustrated in FIG. 9b where the BTMTEM signal from an integrator amplifier 232 is applied directly to the low value gate 34 as previously described in connection with FIG. 1.

Reference is now made to FIG. 9a. As shown there, each of the ATCX1 through AOTC sensor signals on conductors, 48 is applied to a corresponding comparator 158 shown within dashed lines. While only two pairs or groups of comparators 158 are shown, it is to be understood that there is one comparator for each of the sensor signals. Each of two comparator circuits in the comparators 158 receives a reference signal from a corresponding reference source. For example, a comparator circuit 160, designated COMP HI, in each of the comparators 158 receives a high reference signal RHI on a conductor 162 from a high reference source 164 REF HI. In a similar fashion, a low comparator circuit 166, COMP LO, in each of the comparators 158 receives a low reference value signal RLO on a conductor 168 from a low reference signal source 170 designated REF LO.

In the embodiment of FIGS. 9a and 9b, the validity of the sensors 26 (FIG. 1) is determined by the comparators 158 comparing the values of the ATCX1 through AOTC signals with the RLO and RHI signals. In normal operation, the values of the ATCX1 through AOTC signals are within the limits prescribed by the RLO and RHI signals, and the output of each of the comparator circuits 160 and 166 is a binary 0. The outputs from each pair of comparators is applied to a corresponding OR gate 172 via respective conductors 174 and 176. So long as the signals on conductors 174 and 176 to an OR gate 172 are both binary 0's, the output of that OR gate is a binary 0 on a corresponding conductor 178. The output of each of the OR gates 172 is connected to a corresponding one of a plurality of switches in a sensor select switches #1 circuit 180. Two of these switches 182 and 184 are shown. Additionally, each of the switches receives the sensor signal corresponding to each switch's comparator. For example, switch 182 receives the ATCX1 sensor signal feeding that switch's corresponding comparator and switch 184 receives the AOTC signal, etc. Each of the plurality of switches (e.g., 182 and 184) has an inverter input terminal and each is enabled to pass its sensor input signal to an averager #1 circuit 192 via a plurality of corresponding conductors when that switch's input on conductor 178 is a binary 0. When the signal on conductor 178 is a binary 1, the switch receiving that signal is disabled to inhibit passage of its input sensor signal.

As an example of how the comparators 158 and select switches 180 operate, let it be assumed that the ATCX1 signal exceeds either the low or high limit as specified by the RLO and RHI signals. In this situation, the appropriate one of the comparators 160 or 166 will selectively determine the validity of the sensor generating the ATCX1 signal by generating a binary 1 signal on one of the conductors 174 or 176 as determined by the activated comparator. When this occurs, the binary 1 signal enables OR gate 172 to apply a binary 1 disable signal to switch 182, thus preventing the ATCX1 signal from being passed through the select switches 180 to the averager 192.

The averager 192 generates an output signal TXAVGN on a conductor 194. The value of the TXAVGN signal is always proportional to the average of the values of the ATCX1 through AOTC signals passed by the select switches 180. The TXAVGN signal is applied to the positive (+) terminal of an algebraic summer 196. The summer 196 also receives an input signal on a conductor 192 from an LTXDF2 reference source 200. It will be recalled, from the description of the first embodiment, that the LTXDF2 reference source specifies a lower limit temperature deviation of the average of the turbine temperature as specified by the TXAVGN signal.

The output of the summer 196 provides a low turbine temperature reference (NEW RLO) having the value TXAVGN-LTXDF2 on a conductor 202. The NEW RLO signal is applied to each one of a plurality of comparators 204 designated COMP NEW LO. It will be noted that there is a corresponding comparator 204 associated with each of the ATCX1 to AOTC sensor signals with only two being shown. The purpose of each of the comparators 204 is to compare the NEW RLO value with each comparator's corresponding sensor input signal to determine if a potential combustion problem or abnormal sensor reading exists in the turbine in the area of the sensor generating the corresponding sensor signal. In normal operation when each of the ATCX1 through AOTC signals are within the temperature deviation limits as specified by NEW RLO signal, the output of each of the comparators 204 will be a binary 0. The output of each of the comparators 204 is applied via a corresponding one of a plurality of conductors 207 to a sensor select switch #2 circuit 208. The select switches 208 are similar to the select switches 180 and operate in the same manner as previously described for the latter switches. It will be noted that a switch exists in the select switches 208 for each of the sensor signals ATCX1 through AOTC. For example, the ATCX1 signal is applied via a conductor 210 to the top switch 212 of select switches 208 and the AOTC signal is applied to a switch 214, the bottom switch, via a conductor 216. So long as the outputs of each of the comparators 204 are binary 0's, their corresponding switches 212 through 214 will be enabled to pass the ATCX1 through AOTC signals on a plurality of conductors 218 as signals ATCX1' through AOTC' to a second averager #2 circuit 220.

The averager 220 is the same type as the previously described averager 192. The averager 220 generates an output signal TXAVG on a conductor 222. The TXAVG signal has a value proportional to the average calculated turbine temperature.

Reference is now made back to the comparator circuits 204 of FIG. 9b. If any one of the ATCX1 through AOTC signals is greater than the low reference limit signal NEW RLO, the output of the comparator(s) receiving the out of limits sensor signal will go to a binary 1. This binary 1 signal, via conductors 207, will disable the switch receiving the signal to prevent the passage of its sensor input signal to the select switches 208. Thus, it can be seen that the output of the averager 220 always generates a TXAVG signal having a value representative of the average of the signals passed by the select switches 208.

The TXAVG signal on conductor 222 is applied to a negative (−) input terminal of a second algebraic summer 224. Summer 224 also receives a temperature base reference signal TBASE on a conductor 226 from a TBASE REF source 228. As previously described, when the TBASE reference is utilized to calculate the corrected temperature signal for fuel control of the turbine, the analog backup system of FIG. 1 is not utilized. In the present embodiment of FIGS. 9a and 9b, the corrected temperature signal is KVAL1' generated by the summer 224 on a conductor 230. The KVAL1' signal has a value of TBASE minus TXAVG. The KVAL1 signal on conductor 230 is applied to a conventional integrator amplifier circuit 232 which integrates the KVAL1' signal with time to generate the BTMTEM or TFC signal to the low value gate circuit 34 of FIG. 1 for use in controlling fuel flow to the turbine.

Reference is now made back to the outputs of each of the comparators 204 of FIG. 9b. It will be noted that each of those comparators is connected via a corresponding conductor 234 to the input of a # good readings <8 decode circuit 236. The circuit 236 is a conventional decode network which monitors the binary signals on conductors 234 (15 in the preferred embodiments) to determine if the number of good readings as determined by the outputs of the comparators 204 is less than 8. So long as 8 or more of the signals on conductors 234 are binary 0's, the output of the decode network 236 is a binary 0 on a conductor 238. The output signal on conductor 238 from decode 236 is designated as a RESET INT signal to reset the integrator 232 when that signal goes to a binary 1. If less than 8 of the sensors 26 are generating out of limits or invalid readings, the decode 236 generates a binary 1 output signal to reset the integrator 232. This resetting causes the output signal BTMTEM of the integrator 232 to be ramped to zero, thus turning off fuel to the turbine. In the embodiment of FIGS. 9a and 9b, turbine fail-safe operation is provided by the continuous monitoring of the temperature conditions of each of the sensors 26 to control the turbine and to thus shut the turbine down in the event of a catastrophic combustion problem or the failure of an excessive number of temperature sensors.

Reference is now made to FIG. 10 which illustrates a variation of the embodiment of FIGS. 9a and 9b. In FIG. 10 like components from FIG. 9b have been duplicated using like numeric designations with a prime notation (e.g., summer 224' and integrator 232'). FIG. 10 incorporates the temperature analog backup means 36 as previously described in connection with FIGS. 1 and 2. The TXAVG signal on conductor 222 from averager 220 (FIG. 9b) is applied to the algebraic summer 224'. In this embodiment the summer 224' receives at its positive input terminal the mid-value signal ATXD as a reference on conductor 54 from the analog backup means 36. The output of summer 224' is the calculated corrected turbine temperature shown as a signal KVAL1 on a conductor 240. The KVAL1 signal is applied to a positive (+) input terminal of a second algebraic summer 242. The output of summer 242 provides an input signal to a conventional integrator amplifier 232' via a conductor 244.

The output of the amplifier 232' is the BTMTEM fuel control signal provided to the analog backup means 36 on conductor 52. It is to be noted that the BTMTEM signal from the output of amplifier 232' is fed back to a negative (−) input terminal of the summer 242 via a conductor 248. The purpose of feeding the BTMTEM signal back to the input of the summer 242 is to algebraically combine the BTMTEM signal with the KVAL1 signal to dampen the input to amplifier 232' to prevent the BTMTEM signal from changing radically with rapid changes in the KVAL1 signal. In this manner the BTMTEM signal is caused to change in a smooth fashion which in turn causes the TFC signal on conductor 58 to effect a smooth control of fuel to the turbine.

In the embodiment of FIG. 10, if the RESET INT signal on conductor 238 achieves a binary 1, as previously described in connection with FIGS. 9a and 9b, the output of the integrator 232' will ramp the BTMTEM signal to zero. When this occurs, the BTMTEM signal becomes ineffective in the generation of the TFC signal in the analog backup 36 as previously described in connection with FIG. 2.

Figure 11:
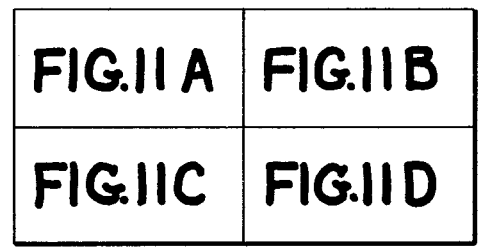
FIG. 11 is a legendary drawing showing the interrelationships between FIGS. 11a through 11d.
Figure 12:
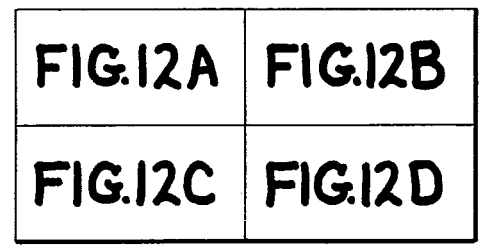
FIG. 12 is a legendary drawing showing the interrelationships between FIGS. 12a through 12d.

Reference is now made to FIGS. 11 and 12 which are legendary drawings showing the interrelationships of FIGS. 11a through 11d and 12a through 12d, respectively. FIGS. 11a through 11d comprise a third embodiment of the invention showing in detailed block diagram form a digital logic controller for calculating the value of the temperature fuel control signal TFC. FIGS. 12a through 12d collectively illustrate a timing diagram of the relationships between the various signals generated by the digital controller of FIGS. 11a-11d. In the ensuing description of the controller, the timing diagram of FIGS. 12a-12d will be referenced.

Reference is first made to FIG. 11a which shows a clock generator 250 providing a sequentially occurring clock signal CLK on a conductor 252 for application to various logic circuits and elements in the controller. The CLK signal is shown at the top of FIGS. 12a and 12b. In FIG. 11c there is shown a manual reset (MAN RESET) switch 254 having one terminal connected to a voltage source V. When the MAN RESET switch is placed in the closed position, a system reset signal is generated on a conductor 256. This latter signal is applied to the various registers, counters, flip-flops and elements in the controller to initialize the system at start-up. The MAN RESET switch also applies the system reset signal as one input to an OR gate 258, enabling that OR gate to apply a binary 1 trigger pulse to a delay one-shot multivibrator 260. The delay one-shot generates a preset output pulse on a conductor 262 to preset two counters designated # Good Reading Counters 1 and 2 circuits 264 and 266 in FIGS. 11c and 11b, respectively. Counters 264 and 266 are the equivalent to those counters previously described in connection with FIGS. 5 and 6 designated by blocks 108, 124 and 132. At the time of system initialization, each of these counters is preset to a count equal to the number of sensor input signals ATCX1 through AOTC (15 in the present embodiment).

Prior to proceeding with an operational description of the controller of FIGS. 11a–11d, it is considered first advantageous to briefly describe the operation of a two-bit delay counter 268, a scanner counter 270, a scanner 272 and an analog-to-digital converter 274. Each of these elements is illustrated in FIG. 11a. The two-bit delay counter 268 is a conventional binary counter having set (S), reset (R) and trigger (T) input terminals for generating three sequentially delayed output signals DLC0, DLC1 and DLC2. The timing relationships of these signals is shown in FIGS. 12a and 12b. The DLC2 signal from counter 268 is applied to the scanner counter 270 to an INC input terminal to cause that counter to be incremented by 1 each time the analog-to-digital converter 274 starts a conversion of one of the sensor input signals ATCX1 through AOTC on conductors 48. As can be seen, the scanner counter 270 provides a plurality of scanner count output signals SC00–SC14 on conductors 276 to the conventional scanner 272 to cause that element to sequentially scan or select the sensor input signals in accordance with each count in the scanner counter 270.

At the start of each analog-to-digital conversion, the DLC2 signal is applied to the A/D converter 274 as a reset/start A/D signal. The reset/start A/D signal initializes the A/D converter 274 to start its operation and simultaneously causes an A/D COMP signal on a conductor 278 to go to a binary 0 as shown in FIG. 12. When the A/D COMP signal goes to a binary 0, that signal is applied as a binary 1 through an inverter input terminal of an AND gate 280. AND gate 280 is enabled when the first CLK signal following the A/D COMP signal is applied to that gate to provide a reset signal to the R terminal of counter 268. This effects the generation of the DLC0 signal at the time shown in FIGS. 12a and 12b. At the completion of the analog-to-digital conversion, the A/D COMP signal goes to a binary 1 applying a set input signal to the S input terminal of the delay counter 268.

As shown in FIGS. 11a, 12a and 12b, the delay counter 268 is now enabled by the A/D COMP binary 1 signal to generate the DLC1 and DLC2 signals in response to the two CLK signals applied to the T terminal of counter 268. As previously described, each time the DLC2 signal is generated, the scanner counter 270 is incremented to cause the scanner to sequentially select the next sensor input signal and simultaneously reset and start the A/D converter 274. The functions just described are repeated for each A/D conversion which the controller performs on the various sensor input signals ATCX1 through AOTC.

Let it now be assumed that the system has been initialized and that the controller has just completed an analog-to-digital conversion on the ATCX1 signal. As illustrated in FIG. 12a, the scanner counter 270 is at an all binary 0 state, thus generating a binary 1 SC00 signal to cause the scanner 272 to select the ATCX1 signal as shown in FIG. 11a. The A/D converter 274 also is capable of generating an output signal OV+UV on a conductor 282. The A/D converter 274, which is conventional by design, will generate a binary 1 output signal on conductor 282 when it detects either an overflow or an underflow condition. The OV+UV signal on conductor 282 may be representative of such a detected overflow or underflow condition. In normal operation, if the sensor providing the selected ATCX1 through AOTC signal is not opened or shorted, the OV+UV signal will remain at a binary 0. As shown in FIG. 11a, the OV+UV signal is applied on conductor 282 to an inverter input terminal of an AND gate 284 in conjunction with the A/D COMP signal. Thus, it can be seen, if the A/D converter 274 does not detect an overflow or underflow condition, AND gate 284 will be enabled to provide a binary 1 set input signal to an S terminal of a Good F/F #1, 286. The timing for the setting and resetting of flip-flop 286 is illustrated in FIGS. 12a and 12b in dashed line form. The dashed lines indicate that flip-flop 286 will set if there is no overflow or underflow condition, otherwise it will remain reset. It is to be noted that flip-flop 286 is always reset by the DLC2 signal from the delay counter 268 each time an analog-to-digital conversion is started.

Let it now be assumed that the Good F/F #1, 286, is in a set state. Thus, that flip-flop generates a binary 1 output signal on a 1 terminal which is applied via a conductor 288 to an enable EN input terminal of a Switch #1, 290, and as one input to an AND gate 292. Switch 290 is also receiving the converted sensor data in digital form from the A/D converter on a plurality of conductors 294. With switch 290 now enabled, the sensor data is thus passed through switch 290 to the input of a conventional parallel type adder designated Adder #1, 296. Adder 296 is now enabled by an ADD signal on a conductor 298 from AND gate 292 which is enabled by the A/D COMP signal on conductor 278 from the A/D converter 274. The generation of the ADD signal on conductor 298 is shown in FIGS. 12a–12b in dashed line form indicating that that signal will be generated only when flip-flop 286 is set. If flip-flop 286 is not set, indicating an invalid condition of the sensor being monitored by the A/D converter, the adder 296 is not enabled to perform its add function.

Let it now be assumed that the adder 296 has been enabled to perform its add function. As shown in FIGS. 11a, the adder 296 provides output signals on a plurality of conductors 300 to a conventional accumulator register 302 designated ACC #1 and receives input signals via a plurality of conductors 304 from the accumulator 302. Thus, it can be seen that, each time adder 296 performs an add function, the contents of the accumulator 302 are added to the sensor data input signals from switch 290 and the sum of the addition is provided back to the accumulator 302.

Figure 11B:
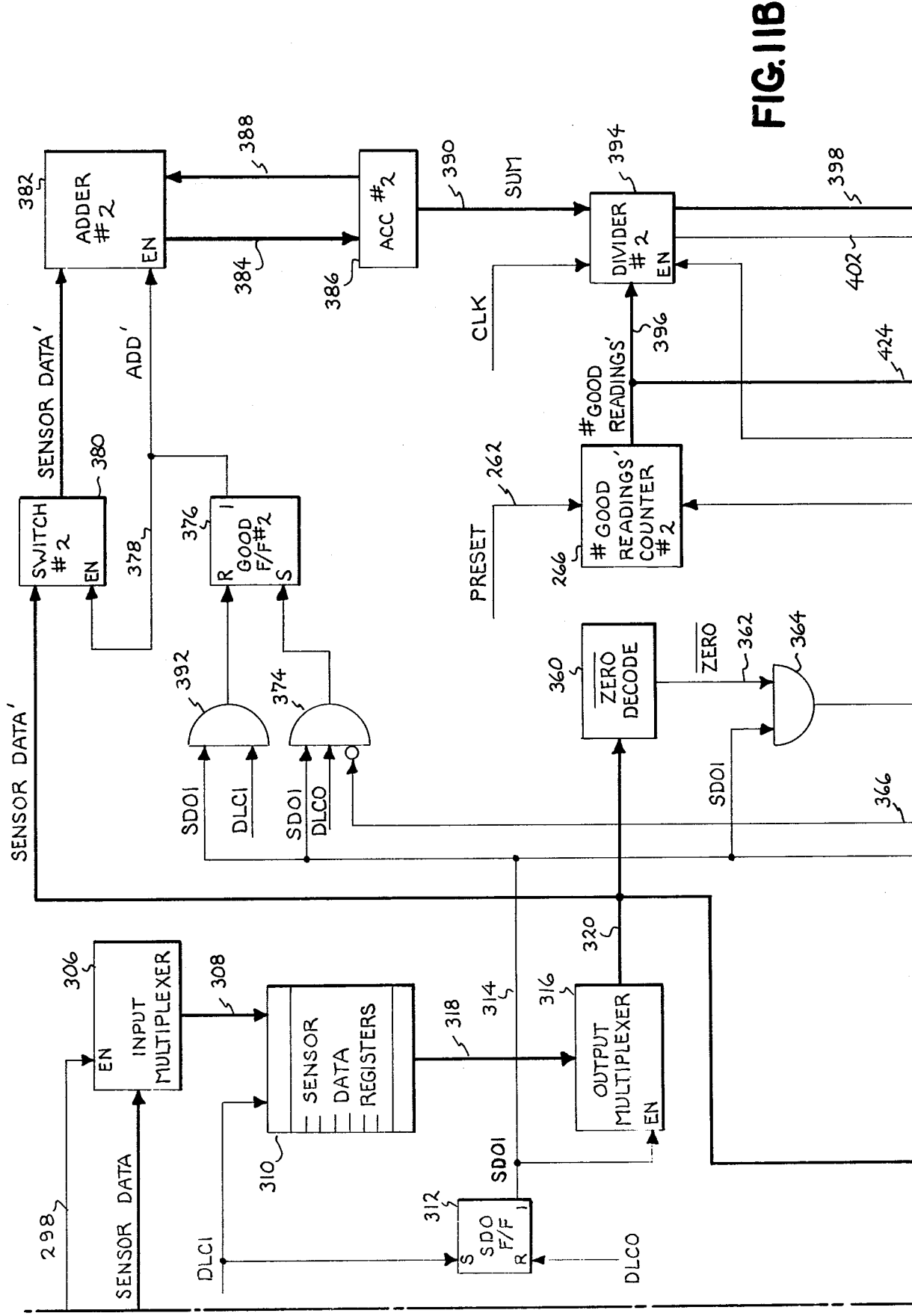
Figure 11C:
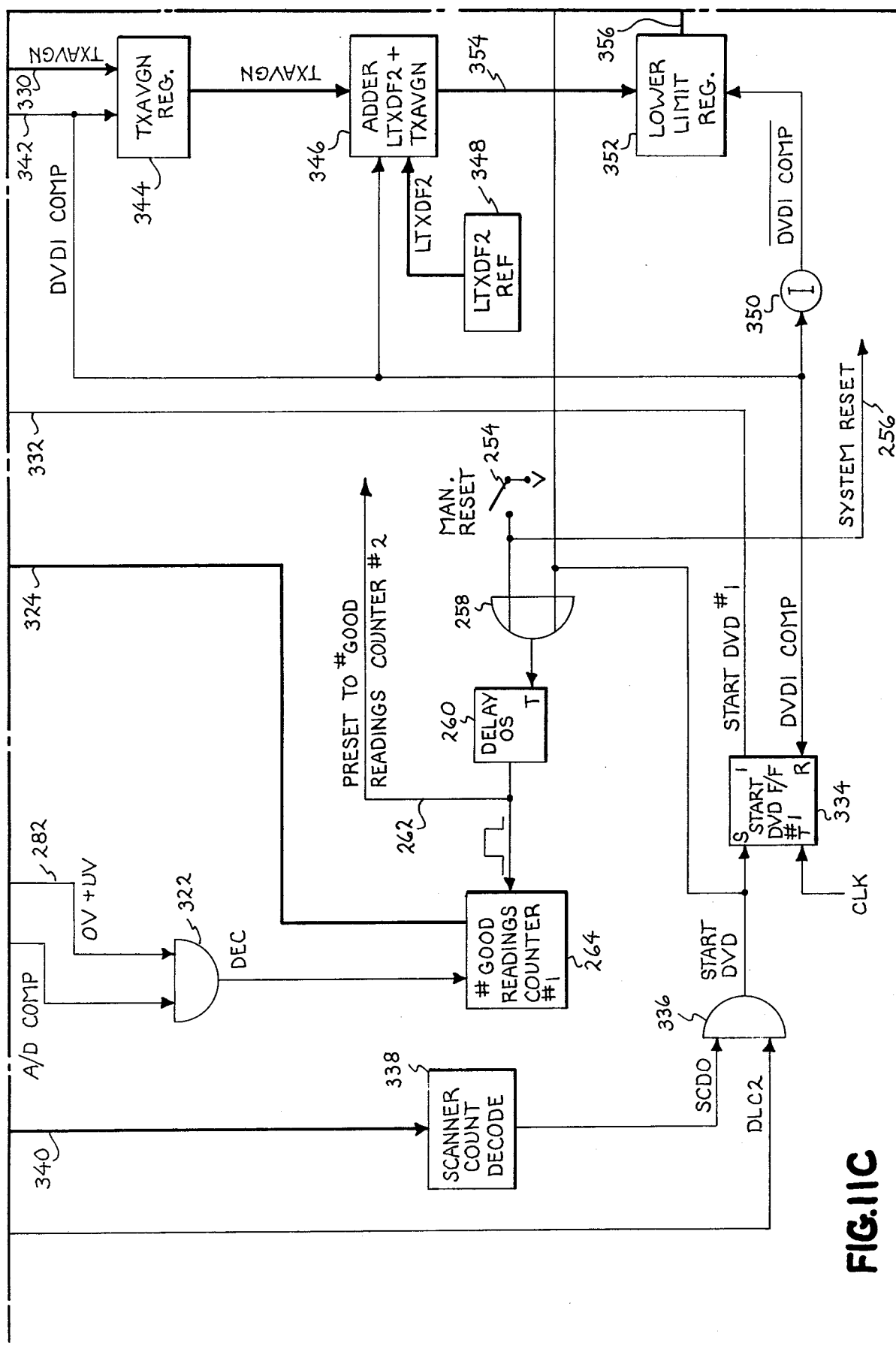
Figure 12B:
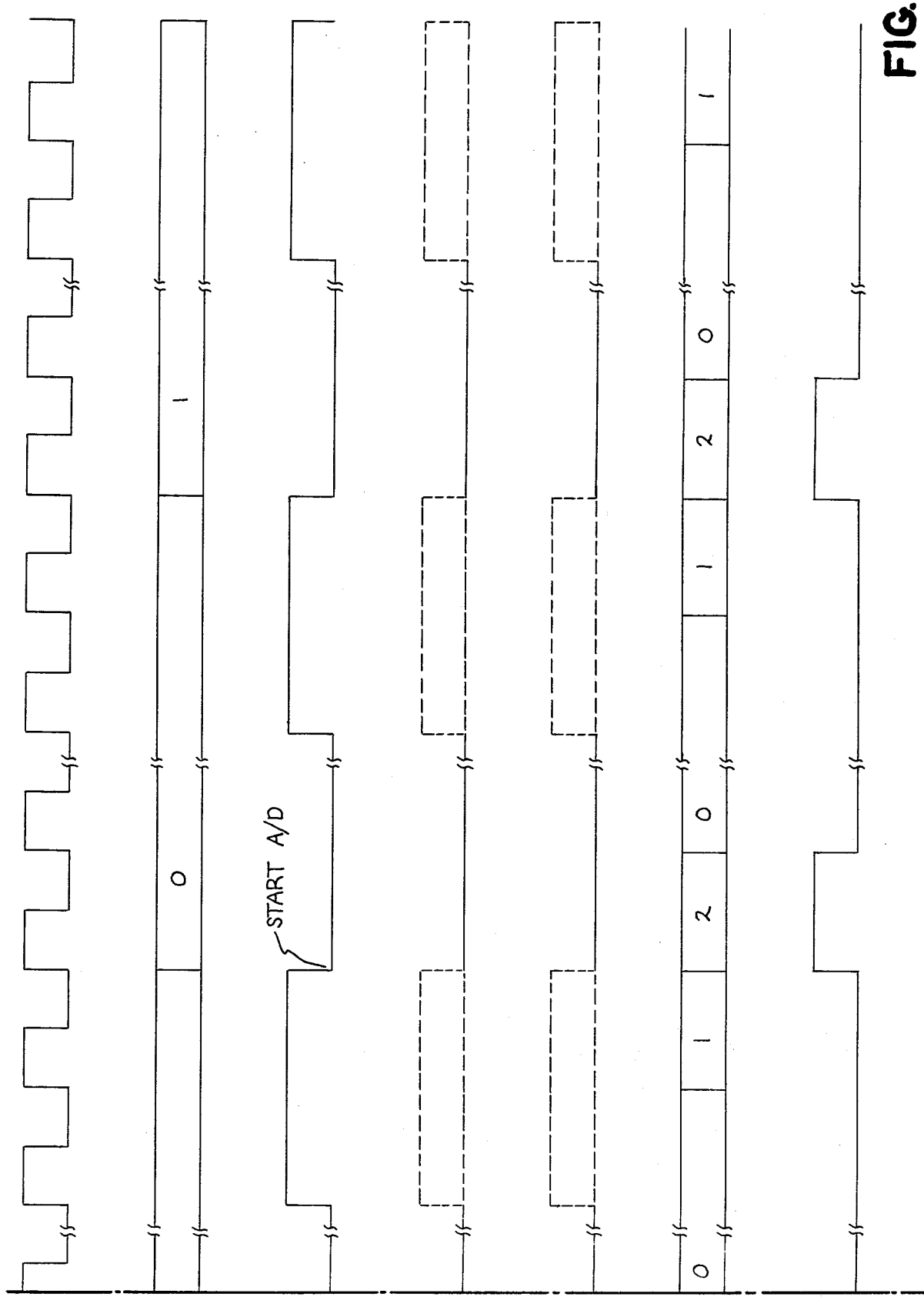

Reference is now made to FIGS. 11a, 11b and the timing diagram of FIGS. 12a and 12b. It will be noted that the ADD signal on conductor 298 is also provided to an enable EN input terminal of a conventional input multiplexer circuit 306. The multiplexer 306 also receives the sensor data from the output of switch 290. When the ADD signal is generated by gate 292, multiplexer 306 is enabled to pass the sensor data via a plurality of conductors 308 into the top register of a plurality of sensor data registers 310. Sensor data registers 310 preferably are comprised of a conventional pushdown type stack, whereby the information entering into the top register is sequentially shifted down into the next register upon activation of the sensor data registers by the DLC1 signal.

By referring to FIGS. 12a and 12b it can be seen that while the sum is being accumulated in accumulator 302, the sensor data is placed into the sensor data registers 310 by the DLC1 signal gating registers 310. Also at this time, it will be noted that the DLC1 signal is applied to a set S input terminal of a sensors data operation flip-flop SDO F/F 312. Flip-flop 312 if set at DLC1 time to generate a SDO1 binary 1 signal on a conductor 314 as shown in the timing diagram of FIGS. 12c and 12d. The SDO1 signal is applied to an enable EN input terminal of a conventional output multiplexer circuit 316. The last register stage of the sensor data registers 310 provides sensor data via a plurality of conductors 318 to the input of the output multiplexer 316. Thus, it can be seen that multiplexer 316 is enabled by the SDO1 signal to pass the sensor data from the final output stage of registers 310 on a plurality of conductors 320.

Reference is now made back to the sensor data registers 310 of FIG. 11b. Preferably the number of registers 310 is equal to the number of sensors or sensor input signals ATCX1 through AOTC (15 in the present embodiment). As such, it can be seen that it will take 15 A/D conversions before the sensor data registers 310 are each filled with digital data representative of the temperature values of their corresponding ATCX1 through AOTC signals. Further, it should be noted that, at the beginning of each new scan by scanner 272 the ATCX1 sensor signal is the first signal to be entered into the sensor data registers 310. Thus, after 15 A/D conversions, the ATCX1 signal contents will be in the final output register of registers 310.

It is also significant to note at this time, that any sensor input signal which is detected as either opened or shorted, indicating an invalid sensor condition, prevents generation of the ADD signal on conductor 298. As a result, the input multiplexer 306 is not enabled and binary 0's are thus passed into the top register of the sensor data registers 310 for that particular sensor. As a result, registers 310 always contain representations of the values of only those sensor readings ATCX1 through AOTC which are considered to be valid. All invalid conditions are held in registers corresponding to their sensor signals as binary 0's.

Figure 11D:
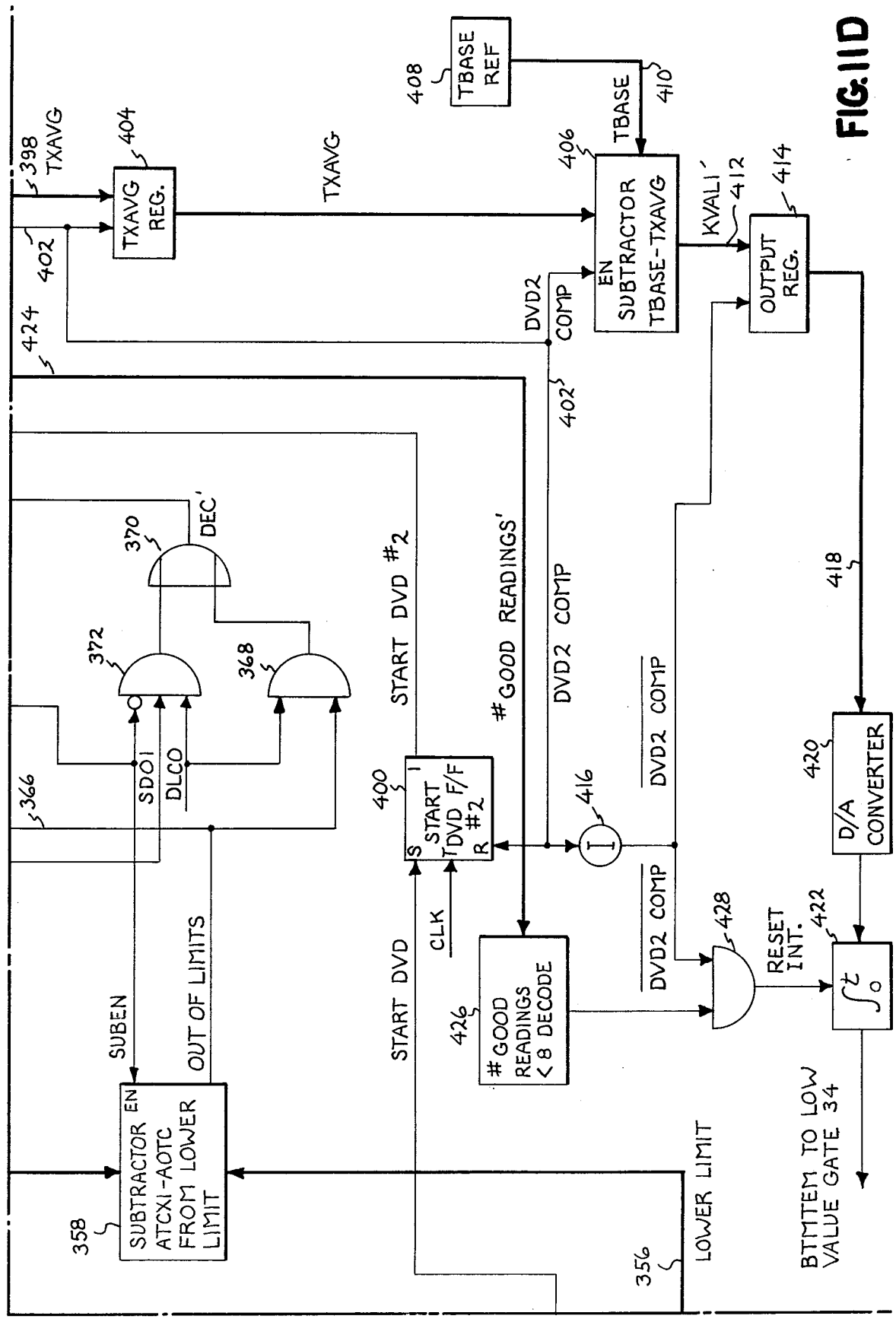

To understand the operation of the logic shown in FIGS. 11b and 11d, it is now considered advantageous to refer back to the A/D converter 274 of FIG. 11a. The A/D COMP and OV+UV output signals from converter 274 are applied via conductors 278 and 282 to an AND gate 322. The output of AND gate 322 is a decrement DEC signal which is applied to the # Good Readings counter #1, 264, to decrement that counter each time the A/D converter detects either an overflow or underflow condition resulting from an invalid sensor reading. Since counter 264 is always preset at the beginning of each scan, it always contains a count representative of the number of good or unrejected readings taken by the A/D converter 274. Signals representative of the number of good readings in counter 264 are applied via a plurality of conductors 324 to a conventional divider circuit designated Divider #1, 326. Divider 326 also receives signals representative of the accumulated sum in accumulator 302 via a plurality of conductors 328. When the divider 326 is activated to perform a divide function, it divides the number of good readings on conductors 324 into the accumulated sum from accumulator 302. The result of this division is the calculated average temperature shown as a TXAVGN signal from the output of divider 326 on a plurality of conductors 330.

Figure 12D:
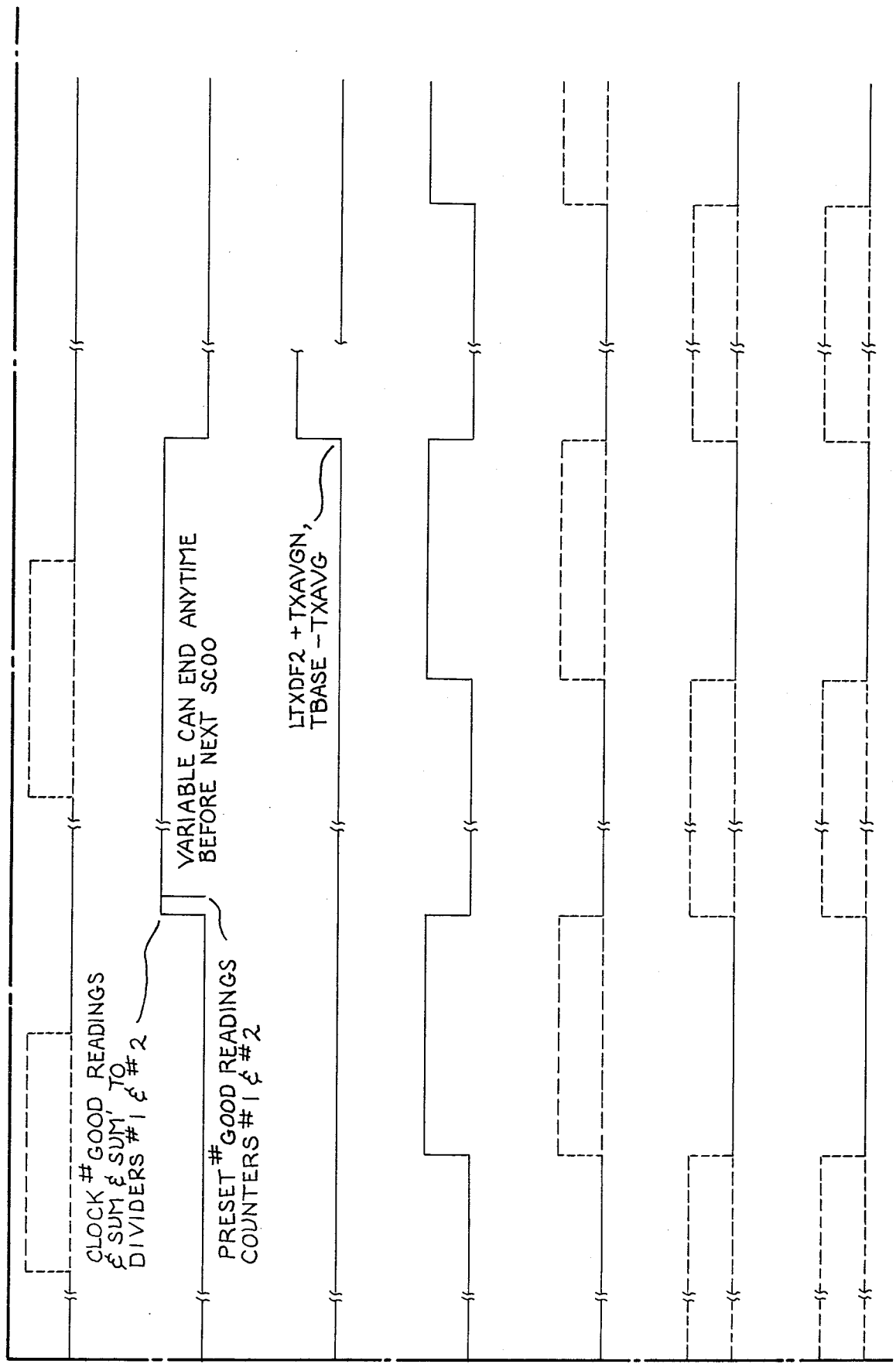

The divide operation is enabled by a start DVD #1 signal applied to an EN input terminal of divider 326 via a conductor 332 from a 1 output terminal of a START DVD F/F #1, 334. The flip-flop 334 is set by a binary 1 START DVD signal from the output of an AND gate 336. By referring to FIGS. 12c and 12d, it can be seen that AND gate 336 is enabled when the two-bit delay counter 268 generates the DLC2 signal and a scanner count decode 338 generates a binary 1 scanner count decode zero signal SCD0. The decode network 338 receives the SC00 through SC14 signals via a plurality of conductors 340 from the scanner counter 270. As shown in FIGS. 12b and 12d, whenever the scanner counter 270 achieves a count of zero, the output of the scanner count decode 338 generates the SCD0 signal to enable AND gate 336 at DLC2 time, thus generating the START DVD signal. The first CLK signal applied to a T terminal of flip-flop 334 following the generation of the START DVD signal, sets flip-flop 334 generating a binary 1 START DVD#1 signal on a conductor 332. When the START DVD#1 signal is applied to divider 326, the # of good readings signals on conductors 324, and the accumulated sum of conductors 328 are clocked into the divider 326 where they are stored in registers internal thereto and not shown. The CLK signal applied to divider 326 controls the timing of that circuit in performing the divide function.

The divider, upon the completion of the divide operation, generates a DVD1 COMP binary 1 signal on a conductor 342. The DVD1 COMP signal is applied to a reset R input terminal of flip-flop 334 resetting that flip-flop. The length of time for performing the divide can be variable, so long as the divide operation is completed before the next SC00 signal is generated. Also, the DVD1 COMP signal is applied to a TXAVGN register 344 which receives the calculated average temperature TXAVGN at the time the DVD1 COMP signal is generated. Additionally, the DVD1 COMP signal is applied to a conventional adder circuit 346 which, as shown in FIG. 12d, algebraically adds the calculated average temperature TXAVGN to a lower limit temperature deviation limit of value LTXDF2 from an LTXDF2 reference source 348. The DVD1 COMP signal is a binary 1 pulse having a duration of approximately one CLK period, which is sufficiently long to allow the adder 346 to perform the addition of the LTXDF2 and TXAVGN signals.

When the DVD1 COMP signal returns to a binary 0, that signal is inverted to a binary 1 to a $\overline{\text{DVD1 COMP}}$ signal through an inverter 350 of FIG. 11c. When the $\overline{\text{DVD1 COMP}}$ signal goes to a binary 1, the contents of the ADDER 346 are clocked into a lower limit register 352 via a plurality of conductors 354. The contents of the lower limit register represent the maximum lower limit of the calculated average temperature. This lower limit is provided as an output signal reference on a plurality of conductors 356 from Register 352. The lower limit value on conductors 356 is applied to a conventional subtracter 358. Subtracter 358 is also receiving the sensor data output from the multiplexer 316 via conductors 320 as sensor data' signals.

It is to be noted at this time that the divide operation just described is performed only once during each complete cycle of the scanner 272. Each time the scanner count decode 338 of FIG. 11c decodes a count of zero (SCD0=binary 1), signifying the beginning of a new scan, the START DVD signal is generated. The START DVD signal is also applied via OR gate 258 to the delay one-shot 260 which generates a delayed output pulse to preset the # Good Readings counter #1, 264, at the time noted in FIG. 12c. Thus, counter 264 is always preset to the proper value at the beginning of each new scan.

Additionally, the lower limit register 352 always contains the lower limit value resulting from each divide operation. As such, the contents of registers 352 can be changed only once during each scan of the sensor input signals ATCX1 through AOTC.

Reference is now made back to FIG. 11D to the subtracter 358. The purpose of the subtracter 358 is to subtract each of the ATCX1 through AOTC readings from the lower limit reference just described to detect for potential combustion problems in the turbine. The operation of the subtracter 358 can best be understood by first referring to a $\overline{zero}$ decode 360 (FIG. 11B) receiving the SENSOR DATA' signals on conductors 320 from the multiplexer 316. The decode 360 is conventional in design and continuously monitors the output of multiplexer 316 to see if any of the ATCX1 through AOTC readings are all binary 0's, indicating a rejected temperature sensor. Under normal conditions, that is when a sensor has not been rejected, the input signals on conductors 320 to the decode 360 will always be representative of some value other than zero. So long as the decode 360 is decoding a $\overline{zero}$ input on conductors 320, a binary 1 $\overline{zero}$ output signal on a conductor 362 will be present. The $\overline{zero}$ signal, in conjunction with the previously mentioned SDO1 signal from flip-flop 312, is applied to an AND gate 364. As shown in FIGS. 12c and 12d, AND gate 364 generates a binary 1 subtract enable signal SUBEN each time the SDO1 signal goes to a binary 1 and the $\overline{zero}$ decode output signal is a binary 1. When the SUBEN signal goes to a binary 1, that signal is applied as an enable input to an EN input terminal of subtracter 358 to effect the previously mentioned subtraction. If the subtraction of any one of the ATCX1 through AOTC signals from the lower limit results in an overflow condition in the subtracter, a binary 1 out of limits signal is generated on a conductor 366. The out of limits signal is combined in an AND gate 368 with the DLC0 signal to enable that AND gate during an out of limits condition to thus generate a binary 1 signal for application to an OR gate 370. OR gate 370 is enabled each time an out of limits condition occurs to apply a binary 1 decrement DEC' signal to a second # Good Readings Counter #2, 266, to decrement that counter by 1 for each out of limits condition detected by the subtracter 358.

Reference is now made back to the output of AND gate 364 of FIG. 11b. As previously described, under normal operating conditions the output of that AND gate is a binary 1 to generate the SUBEN signal. It should be noted that the SUBEN signal is inverted through an inverter input terminal applied to an AND gate 372, also receiving the SDO1 and DLC0 signals. Each time the $\overline{zero}$ decode 360 decodes a binary 0 value from multiplexer 316, AND gate 364 is disabled to provide a binary 0 signal on the SUBEN line. This signal is inverted to a binary 1 to thus enable AND gate 372 at the time indicated by the generation of the DEC' signal in FIGS. 12c and 12d. In other words, any time a zero is decoded by decode 360, indicating that the sensor corresponding to that reading being decoded at that time is a rejected sensor, counter 266 is decremented by 1. This decrementing, in this instance, is provided by the output of AND gate 372 enabling OR gate 370 to generate the DEC' binary 1 signal. It can now be seen that counter 266 always contains a count representative of the number of good readings determined by the rejection of the invalid sensors during the A/D conversion process and by those rejected sensors providing out of limits readings during the subtraction process by subtracter 358.

Reference is now made in FIG. 11b to an inverter input terminal of an AND gate 374 receiving the out of limits signal on conductor 366. AND gate 374 also receives the DLC0 and SDO1 signals. At the completion of a subtraction operation, if there is no out of limits condition, the binary 0 signal on conductor 366 is inverted to a binary 1 through the inverter of AND gate 374 to thus allow that gate to be enabled upon the occurrence of the DLC0 and SDO1 signals to set a Good F/F #2, 376, at the time shown in FIGS. 12a-12d. Setting flip-flop 376 provides a binary 1 output signal ADD' on a conductor 378 to an enable EN input terminal of a switch #2, 380, and to an enabled EN input terminal of an ADDER #2, 382. The switch 380 also receives the SENSOR DATA' signals via conductors 320 and passes that data into adder 382 in response to the ADD' signal. The operation of switch 380 and adder 382 is the same as previously described for switch 290 and adder 296. Adder 382 provides data via a plurality of conductors 384 to an accumulator ACC #2, 386, and receives data therefrom via a plurality of conductors 388. Accumulator 386 operates in the same fashion as previously described for accumulator 302 to provide SUM' data signals to a Divider #2, 394, on a plurality of conductors 390. The Good F/F #2, 376, is reset by the SDO aand DLC1 signals applied to an AND gate 392 generating a binary 1 signal to a reset R input terminal of flip-flop 376 to terminate the operation of ADDER 382 at the time shown in FIGS. 12c and 12d.

In FIG. 11b, the Divider #2, 394, functions in the same manner as previously described for divider 326 of FIG. 11a. Divider 394 receives a # Good Readings' signals via a plurality of conductors 396 from the # Good Readings Counter #2, 266. Divider 394 divides the # Good Readings' value into the SUM' value to generate the final calculated average output temperature signal TXAVG on a plurality of conductors 398. The divider 394 is put into operation by a START DVD #2 signal applied to an enable EN input terminal from a START DVD F/F #2, 400, of FIG. 11D. Flip-flop 400 is enabled to be set by the previously described START DVD signal from the output of AND gate 336 of FIG. 11c and sets when the CLK signal is applied to its trigger T input terminal. Flip-flop 400 is reset by a DVD2 COMP binary 1 signal from divider 394 via conductor 402 at the completion of the divide operation.

The DVD2 COMP signal is also applied to a TXAVG REG 404 and to an enable EN input terminal of a second subtracter 406. As shown in the timing diagram of FIG. 12d, the DVD2 COMP signal clocks the TXAVG signals into register 404 and into the subtracter 406 to enable the subtraction of TXAVG from the temperature base reference TBASE. The TBASE reference value is provided to subtracter 406 from a temperature base reference TBASE REF 408 via a plurality of conductors 410.

As shown in FIG. 11d, the output of subtracter 406 is the temperature trim signal KVAL1' which is applied to an output register 414 on conductors 412. The KVAL1' signals are clocked into the output register 414 with a binary 1 DVD2 COMP signal from an inverter 416 when the DVD2 COMP signal goes to a binary 0 at the end of the divide operation. The output of register 414 is provided via a plurality of conductors 418 to a conventional digital-to-analog (D/A) converter 420 which converts the calculated digital fuel control value to an analog value for application to a conventional integrator amplifier 422. The amplifier 422 output is the temperature trim signal BTMTEM. This signal, as shown in FIG. 1, bypasses the temperature analog backup means 36 and is applied as the temperature fuel control signal, TFC, to the low value gate 34.

The # Good Readings' signals from the output of counter 266 of FIG. 11b are applied via conductors 424 to a # Good Readings<8 decode logic 426. Decode 426 functions in the same manner as previously described for the Decode Logic 236 of FIG. 9b. Whenever the number of good readings in counter 266 is less than 8, the decode 426 generates a binary 1 output signal to an AND gate 428. AND gate 428 also receives the DVD2 COMP signal from inverter 416. As previously described in the previous embodiments, if the number of good readings is less than 8, it is deemed necessary to shut the turbine down. When the DVD2 COMP signal goes to a binary 1 and if the output of decode 426 is a binary 1, AND gate 428 is enabled to apply a binary 1 RESET INT signal to integrator 422, causing the TFC signal to be ramped to zero, thus turning off fuel flow to the turbine.

Figure 13:
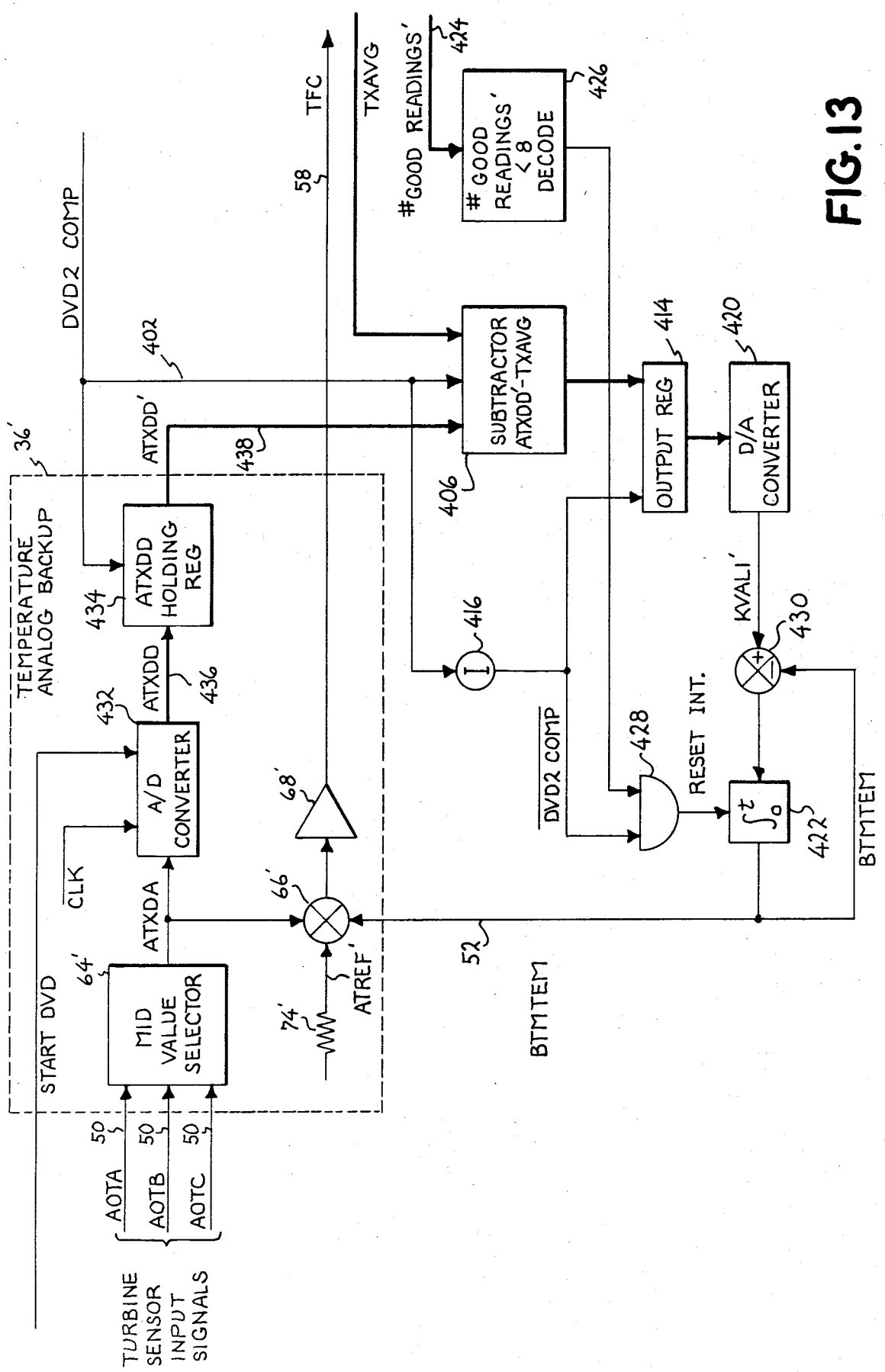
FIG. 13 is a block diagram schematic illustrating the implementation of the analog backup means into the digital controller of FIGS. 11a through 11d.

Reference is now made to FIG. 13 which illustrates in logic schematic form a variation on the embodiment in FIGS. 11a-11d. In FIG. 13 portions of the digital controller from FIG. 11d are duplicated for purposes of simplicity and understanding. Those duplicated components are the inverter 416, the subtracter 406, the # Good Readings<8 Decode 426, AND gate 428, output register 414, the integrator amplifier 422 and the D/A converter 420. The one component added to the controller in FIG. 13 is an algebraic summer 430, receiving at a positive (+) input terminal the calculated temperature trim signal designated KVAL1' from the D/A converter 420. A negative (−) input terminal of the summer 430 also receives the BTMTEM signal from the output of integrator amplifier 422. The integrator 422 and the summer 430 operate to generate the BTMTEM signal in the same manner as previously described in connection with FIG. 10.

Also shown in FIG. 13 is a modified form of the temperature analog backup means 36 as previously described in connection with FIGS. 1 and 2. The temperature analog backup means of FIG. 13 contains like numerals with prime designations corresponding to those components previously described in connection with FIGS. 1 and 2. For example, the mid-value selector 64 of FIG. 2 is shown as 64'. The analog backup means 36' of FIG. 13 is basically the same as that previously described in connection with FIG. 2, with the exception of the inclusion of an A/D converter 432 and an ATXDD holding register 434. In the embodiment of FIG. 13, the selector 64' continuously monitors the AOTA through AOTC turbine sensor signals as previously described to generate the analog mid-value signal shown as ATXDA for input to the A/D converter 432. The A/D converter 432 functions similar to that described in connection with the A/D converter 274 of FIG. 11a. Converter 432 receives the CLK clock signal from generator 250 and the START DVD signal from the output of AND gate 336 of FIG. 11c to reset and start the converter when the START DVD signal goes to a binary 1. At the termination of an A/D conversion, the output of the converter 432 is a digital value representative of the mid-value signal shown on a plurality of conductors 436 as ATXDD signals. The ATXDD signals are applied to the input of the ATXDD holding register 434. At the completion of the divide by the divider 394, the DVD2 COMP signal on conductor 402 goes to a binary 1 gating the ATXDD signals into register 434. Also at this time, the contents of the register 434 are gated as signals ATXDD' on a plurality of conductors 438 into subtracter 406 by the DVD2 COMP signal. In this embodiment of the controller (FIG. 13), the subtracter 406 takes the difference between the mid-value signal ATXDD' and the calculated average temperature TXAVG. In a manner as previously described, the contents of the subtracter 406 are gated into the output register 414 by the DVD2 COMP signal for input to the D/A converter 420. The D/A converter 420 provides the calculated value trim signal KVAL1 to the positive (+) input terminal of the summer 430. The purpose of feeding the BTMTEM signal from the output of amplifier 422 back into the negative (−) input terminal of summer 430 is done for the same purpose as previously described in connection with FIG. 10.

Reference is now made back to the temperature analog backup 36'. There it is shown that the ATXDA signal, in conjunction with the ATREF' and BTMTEM signal is applied to summer 66' to provide the temperature fuel control signal TFC through amplifier 68' as previously described in connection with FIG. 2. In normal operation, the output signal TFC on conductor 58 from amplifier 68' is representative of the algebraic sum of the ATXDA, ATREF' and BTMTEM signals. However, when the number of good readings is less than 8, as decoded by decode 426, AND gate 428 is enabled to generate the RESET INT signal to reset the integrator 422 causing the output signal BTMTEM to ramp down to zero. When this occurs, the analog backup means 36' takes over in the manner as previously described to now provide the TFC signal to the turbine through the low value gate 34. In this latter instance, the value of the TFC signal is representative of the algebraic sum of the ATXDA and ATREF' signals since the BTMTEM signal now has an ineffective value.

The timing for the embodiment of FIG. 13 is not shown in its entirety in FIGS. 12a-12d; however, by observation of the signals existing on that drawing for the generation of the START DVD and the DVD2 COMP signals, the operation of FIG. 13 is readily understandable.

Having described the several embodiments of the invention, it can now be seen how the invention can be implemented in a conventional programmable digital computer or controller such as that previously described in connection with FIGS. 1 through 8. In that embodiment, the programmable controller includes an executive program comprised of a thermocouple calculations subroutine, a temperature calculation subroutine and a temperature fuel control calculation subroutine. The thermocouple calculations subroutine determines the validity of the turbine sensor readings, rejecting those readings which are outside specified bounds or limits. The temperature calculation program computes the common or average temperature from the unrejected sensor readings to derive an actual average turbine temperature value. The fuel control calculation subroutine calculates the value of a temperature trim signal representative of the difference between a sensed or desired turbine operating temperature and the calculated average temperature. The temperature trim signal is utilized in controlling fuel to the turbine. An analog backup means may be optionally employed in the system for providing a fuel control signal to the gas turbine. The fuel control signal has a value representative of the values of the temperature trim signal, a mid-value signal approximately equal to the turbine average temperature and an analog reference signal proportional to a safe turbine operating temperature. When the analog temperature backup means is incorporated, the system has a fail-soft design which allows the turbine to operate at reduced operating temperature. The temperature trim signal is ramped to a zero value, as determined by the programmable controller, when a specified number of the temperature sensors provide invalid readings and/or a predetermined number of the readings are out of specified limits.

In the embodiment illustrated by FIGS. 9 and 10, an analog controller for performing the same functions as the previously described programmable controller is illustrated. In this embodiment, the temperature sensor signals from the gas turbine are continuously monitored, and those signals are compared against high and low limits to determine the operational validity of each of the temperature sensors. A conventional averager circuit averages the analog values or temperature readings of those temperature sensors determined to be of a valid condition to establish an average turbine operating temperature.

The value of the average operating temperature is algebraically combined with a lower limit temperature deviation limit to develop a new low value reference which is compared in a group of comparators with each of the sensor input signals from the turbine. If the value of any of the temperature sensor signals exceeds the new reference value, those sensors corresponding to those signals are rejected as invalid readings and an average is again calculated to establish the actual turbine operating temperature. The actual turbine operating temperature is then algebraically combined with a temperature base reference representative of a desired turbine operating temperature to develop a temperature fuel control or trim signal for use in controlling fuel flow to the gas turbine.

As previously described in connection with FIGS. 11, 12 and 13, a special purpose digital controller is disclosed for calculating the value of the temperature fuel control signal or the temperature trim signal. In this latter embodiment, each of the sensor input signals is scanned and an analog-to-digital conversion is performed on each of these sensor signals. The values of the temperature signals determined to be valid or within specified limits are accumulated to establish a sum value of those signals. A number representative of the number of good temperature sensors or readings, as determined by the controller, is divided into the sum of the accumulated value to establish a calculated average turbine temperature. This average value is algebraically combined with a lower temperature deviation limit to establish a lower limit for comparison or subtraction from each of the temperature sensor signals. Means in the controller stores each of the temperature signals for sequential comparison or subtraction from the lower limit. A record is kept in a counter of each temperature sensor determined to be valid. Further, for each of the temperature signals determined to be out of limits, the same counter is updated. This recording in the counter results in the number of good readings representative of the unrejected sensors as well as the number of sensor readings which are within limits. The number of good readings in the counter is then divided into the actual calculated turbine temperature derived from the sum of the temperature readings of the valid sensors. This actual calculated turbine temperature can optionally be subtracted from either a temperature base reference representative of a desired turbine operating temperature or from a mid-value signal approximately equal to the average turbine temperature to derive a calculated value for output as a temperature fuel control signal for direct use in controlling fuel flow to the turbine or for deriving a temperature trim signal. The temperature trim signal is combined with the mid-value signal and an analog reference signal proportional to a safe turbine operating temperature in the analog backup means to develop the temperature fuel control signal for use by the gas turbine. When the temperature trim signal is ramped to a value of zero, as determined by the number of good readings stored in the counter, the value of the fuel control signal from the analog backup means has a value proportional to the algebraic sum of the analog temperature reference and the mid-value signals.

While illustrative embodiments of the invention have been described herein, modifications and adaptations thereof may be made by those skilled in the art without departure from the spirit and true scope of the invention as defined by the appended claims.

---

APPENDIX A

```
                                                                              TCC01000 5939
                                                                              TCC01010 5940
                                                                              TCC01020 5941
                                                                              TCC01030 5942
         * * * * * * * * * * * * * * * * * * * * * * * * *                    TCC01040 5943
                                                                              TCC01050 5944
               THERMOCOUPLE  CALCULATIONS  CONTROL   TCC PROGRAM              TCC01060 5945
                                                                              TCC01070 5946
                                                                   *          TCC01080 5947
                                                     -                        TCC01090 5948
                                                                              TCC01100 5949
                                                                              TTCC01110 5950
         * * * * * * * * * * * * * * * * * * * * * * * * *                    TCC01120 5951
              OBJ 1                                                           TCC01130 5952
              INS 2                                                           TCC01140 5953
                                                                              TCC01150 5954
              EQB/EQL STATEMENTS                                              TCC01160 5955
                                                                              TCC01170 5956
  04UC       OTERHT_EUR THERMD,#C          BIT C OF ERRONEOUS READING MAP,THERMD  TCC01180 5957
  04C0       HTDERR EUR TCCFLG,#0          RTD ERRONEOUS READING FLAG         TCC01190 5958
                                           ARTD1 USES TCCFLG,#0               TCC01200 5959
                                           ARTD2 USES TCCFLG,#1               TCC01210 5960
  04C2       UFTERR EUB TCCFLG,#2          AMPL OFFSET ERROR BIT              TCC01220 5961
```

THERMOCOUPLE CALCULATIONS, CONTROL

```
           04C4         OTNEGR EQU TCCFLG,#4      OT READING IS NEG                             TCC01230 5962
           03F5         TCCRUN EQU RUNWD,#5       TCC RUN FLAG                                  TCC01240 5963
                        *DEDICATED STORAGE                                                       TCC01250 5964
           0250         ATCX1D EQU DSTOR5         LINEARIZED,COMPENSATED TEMPERATURES,          TCC01260 5965
                        *                         ATCX1 THRU ATCX12 ARE STORED IN DSTOR5        TCC01270 5966
                        *                         THRU DSTOR5+B                                 TCC01280 5967
           025C         AOTAD  EQU DSTOR5+#C      SCALED TEMPERATURES AOTA,B,CATX ARE           TCC01290 5968
                        *                         STORED IN DSTOR5+C THRU F                     TCC01300 5969
                        *TEMPORARY SCRATCH STORAGE                                               TCC01310 5970
           00C8         TMBK1S EQU SCRT1                                                         TCC01320 5971
           00C9         TMBK2S EQU SCRT1+1                                                       TCC01330 5972
           00D0         RTD1S  EQU SCRT2                                                         TCC01340 5973
           00D1         RTD2S  EQU SCRT2+1                                                       TCC01350 5974
           00D2         CNITC  EQU SCRT2+2                                                       TCC01360 5975
           00D3         ATCOFS EQU SCRT2+3                                                       TCC01370 5976
           00D4         TEM51  EQU SCRT2+4                                                       TCC01380 5977
           00D5         TEM52  EQU SCRT2+5                                                       TCC01390 5978
           00D6         TEM53  EQU SCRT2+6                                                       TCC01400 5979
           00D7         TEM54  EQU SCRT2+7                                                       TCC01410 5980
           00D8         TEM55  EQU SCRT3                                                         TCC01420 5981
           00D9         TEM56  EQU SCRT3+1                                                       TCC01430 5982
           00DA         TEM57  EQU SCRT3+2                                                       TCC01440 5983
           00DB         TEM58  EQU SCRT3+3                                                       TCC01450 5984
           00DC         TEM59  EQU SCRT3+4                                                       TCC01460 5985
           00DD         TEM510 EQU SCRT3+5                                                       TCC01470 5986
           00DE         TEM511 EQU SCRT3+6                                                       TCC01480 5987
           00DF         TEM512 EQU SCRT3+7                                                       TCC01490 5988
                        * *                                                                      TCC01500 5989
                        *  SYSTEM SYMBOLS                                                        TCC01510 5990
                        * *                                                                      TCC01520 5991
                        *TCERBT  THERWD,#0        REF BIT ,ERRONEOUS READING MAP,THERWD         TCC01530 5992
                        *TCCERR  TCCFLG,#3        TCC INPUT ERROR FLAG                           TCC01540 5993
                        *THERWD                   ERRONEOUS READING WORD                         TCC01550 5994
                        *ATCX1                    ANALOG INPUTS,TWELVE EXHAUST TEMP TC'S         TCC01560 5995
                        *AOTA                     ANALOG INPUTS,THREE OVERTEMP READINGS         TCC01570 5996
                        *AIX                      ANALOG INPUT,MID VALUE SELECTOR               TCC01580 5997
                        *ARTD1                    ANALOG INPUTS,TWO RTD INPUTS                  TCC01590 5998
                        *ATCOFT                   ANALOG INPUT,TEMP AMPL OFFSET                 TCC01600 5999
                        *TCCFLG                   TCC FLAG WORD                                  TCC01610 6000
                        * *                                                                      TCC01620 6001
                        *                                                                        TCC01630 6002
                        *  TCC PROGRAM STARTS HERE                                               TCC01640 6003
                        * *                                                                      TCC01650 6004
    1170 0000 0000             ORG TCCSRT,A                                                      TCC01660 6005
              0000      TCCA01 EQU *                                                             TCC01670 6006
    1170 0000 F800             CLR                                                               TCC01680 6007
    1171 0001 43F5             SST TCCRUN         CLEAR TCC RUN FLAG                             TCC01690 6008
    1172 0002 A8C0             LAP TEMHK1         TRANSFER CONSTANTS INTO FIRST 1K               TCC01700 6009
    1173 0003 80C8             SAN TMBK1S                                                        TCC01710 6010
    1174 0004 A8C3             LAP TEMBK2                                                        TCC01720 6011
    1175 0005 80C9             SAN TMBK2S                                                        TCC01730 6012
  W 1176 0006 7142             LAN ATCOFT         TEMPERATURE AMPLIFIER OFFSET                   TCC01740 6013 #
    1177 0007 A372             ANA TWO            CHECK ERROR BIT                                TCC01750 6014
    1178 0008 9371             SUB ONE                                                           TCC01760 6015
    1179 0009 F860             TGR                POS=ERROR                                      TCC01770 6016
  W 117A 000A 44C2             SST OFTERR         SET /CLEAR OFFSET ERROR FLAG                  TCC01780 6017
    117B 000B B80F             BRC *+4                                                           TCC01790 6018
  W 117C 000C 7370             LAN ZERO                                                          TCC01800 6019
    117D 000D 80D3             SAN ATCOFS         IF ERROR,USE ZERO OFFSET                       TCC01810 6020
    117E 000E C011             BRU *+3                                                           TCC01820 6021
  W 117F 000F 7142             LAN ATCOFT         GET OFFSET READING                             TCC01830 6022
    1180 0010 80D3             SAN ATCOFS         STORE FOR FUTURE                               TCC01840 6023
                        * *                                                                      TCC01850 6024
                        *  RTD CALC: RTD1S=(-ARTD1+ATCOFS)SCLRTD*TMOFT1-ATCOFS                  ; TCC01860 6025
                        * *                                                                      TCC01870 6026
  W 1181 0011 7370             LAN ZERO                                                          TCC01880 6027
    1182 0012 80D4             SAN TEM51                                                         TCC01890 6028
    1183 0013 A8BD             LAP SCLRTD         RTD SCALING FACTOR                             TCC01900 6029
    1184 0014 80D6             SAN TEM53                                                         TCC01910 6030
  W 1185 0015 7371             LAN ONE                                                           TCC01920 6031 #
    1186 0016 8005             SAN XD                                                            TCC01930 6032
              0017      TCCA10 EQU *                                                             TCC01940 6033
  W 1187 0017 7524             LAN ARTD1,X        RTD READING                                    TCC01950 6034
    1188 0018 A372             ANA TWO            CHECK ERROR BIT                                TCC01960 6035
    1189 0019 9371             SUB ONE                                                           TCC01970 6036
    118A 001A F860             TGR                POS=ERROR                                      TCC01980 6037
  W 118B 001B 4CC0             SST RTDERR,X       STORE IN RTD ERROR FLAG                        TCC01990 6038
    118C 001C 0820             BRC *+4            SYSTEM CORRECT                                 TCC02000 6039
              001D      TCCA12 EQU *                                                             TCC02010 6040
    118D 001D A8C1             LAP RTDAMB         TYPICAL AMB TEMP                               TCC02020 6041
    118E 001E 84D0             SAN RTD1S,X                                                       TCC02030 6042
    118F 001F C03A             BRU TCCA15         JUMP TO NEXT CALC                              TCC02040 6043
  W 1190 0020 7370             LAN ZERO                                                          TCC02050 6044
    1191 0021 9524             SUB ARTD1,X        NEG NUMBER,RTD RDG                             TCC02060 6045
    1192 0022 98D3             ADD ATCOFS         AMPL OFFSET                                    TCC02070 6046
    1193 0023 80D5             SAN TEM52          B11                                            TCC02080 6047
    1194 0024 CB52             ESC ,MPY                                                          TCC02090 6048 #
    1195 0025 00D4             PTN TEM51                                                         TCC02100 6049
    1196 0026 00D6             PTN TEM53                                                         TCC02110 6050
    1197 0027 00D7             PTN TEM54                                                         TCC02120 6051
    1198 0028 70D7             LAN TEM54          B12,TEMP COMPENSATION                          TCC02130 6052
    1199 0029 F808             TAM                CHECK FOR NEG                                  TCC02140 6053
    119A 002A D030             BRS *+6            NEG JUMP                                       TCC02150 6054
    119B 002B A382             ANA MSKL2          POS,CHECK THAT LEFT TWO BIT ARE ZERO           TCC02160 6055
    119C 002C 9370             SUB ZERO                                                          TCC02170 6056
    119D 002D F860             TGR                                                               TCC02180 6057
    119E 002E 001D             BRS TCCA12         SYSTEM WILL OVERFLOW ON B11                    TCC02190 6058
    119F 002F C034             BRU *+5            NORMAL PATH                                    TCC02200 6059
    11A0 0030 A382             ANA MSKL2          NEG,CHECK THAT LEFT TWO BIT ARE ONES           TCC02210 6060
```

THERMOCOUPLE CALCULATIONS, CONTROL

| Addr | Loc | Code | Label | Instruction | Operand | Comment | Ref |
|---|---|---|---|---|---|---|---|
| 11A1 | 0031 | B382 | | ERA | MSKL2 | | TCC02220 6061 |
| 11A2 | 0032 | F840 | | TEQ | | | TCC02230 6062 |
| 11A3 | 0033 | 8810 | | BRC | TCCA12 | SYSTEM WILL OVERFLOW ON B11 | TCC02240 6063 |
| 11A4 | 0034 | 70D7 | | LAN | TEM54 | B12,TEMP COMPENSATION | TCC02250 6064 |
| 11A5 | 0035 | E00F | | SKC | 15 | B11 | TCC02260 6065 |
| 11A6 | 0036 | 80D7 | | SAN | TEM54 | | TCC02270 6066 |
| 11A7 | 0037 | A8C2 | | LAP | THOFT1 | B11,RTD NULL TEMP | TCC02280 6067 |
| 11A8 | 0038 | 98D7 | | ADD | TEM54 | B11,FROM ABOVE MULTIPLICATION | TCC02290 6068 |
| 11A9 | 0039 | 90D3 | | SUB | ATCOFS | AMPL OFFSET | TCC02300 6069 |
| | 003A | | TCCA15 | EQU | * | | TCC02310 6070 |
| 11AA | 003A | 84D0 | | SAN | RTD1S,X | B11,RTD COMPENSATION FACTOR | TCC02320 6071 |
| 11AB | 003B | E805 | | DMR | XD | TEST FOR FINISH | TCC02330 6072 |
| 11AC | 003C | D017 | | BRS | TCCA10 | NO | TCC02340 6073 |
| | | | | | | | TCC02350 6074 |
| | | | | | | | TCC02360 6075 |
| | | | * TC | CALC | | | TCC02370 6076 |
| | | | | | | | TCC02380 6077 |
| | 003D | | TCCA20 | EQU | * | | TCC02390 6078 |
| 11AD | 803D | 737A | | LAN | ELEVEN | | TCC02400 6079 |
| 11AE | 003E | 8005 | | SAN | XD | INITIALIZE INDEX | TCC02410 6080 |
| 11AF | 803F | A8BE | | LAP | SCLTC1 | TEMP CORRECTION FACTOR (LESS 650 DEG) | TCC02420 6081 |
| 11B0 | 0040 | 80D5 | | SAN | TEM52 | | TCC02430 6082 |
| 11B1 | 0041 | A8BF | | LAP | SCLTC2 | TEMP CORRECTION FACTOR (OVER 650 DEG) | TCC02440 6083 |
| 11B2 | 0042 | 80DA | | SAN | TEM57 | | TCC02450 6084 |
| 11B3 | 0043 | 7370 | | LAN | ZERO | | TCC02460 6085 |
| 11B4 | 0044 | 80D9 | | SAN | TEM56 | | TCC02470 6086 |
| 11B5 | 0045 | 7374 | | LAN | FOUR | | TCC02480 6087 |
| 11B6 | 0046 | 80D2 | | SAN | CNTTC | TC COUNTER,TO DETERMINE WHICH RTD TO USE | TCC02490 6088 |
| | 0047 | | TCCB10 | EQU | * | | TCC02500 6089 |
| 11B7 | 0047 | 70D2 | | LAN | CNTTC | | TCC02510 6090 |
| 11B8 | 0048 | F808 | | TAM | | | TCC02520 6091 |
| 11B9 | 0049 | D04F | | BKS | **6 | USE RTD1S FOR COMPENSATION | TCC02530 6092 |
| 11BA | 004A | 9371 | | SUB | ONE | USE RTD2S FOR COMPENSATION | TCC02540 6093 |
| 11BB | 004B | 80D2 | | SAN | CNTTC | | TCC02550 6094 |
| 11BC | 004C | 70D1 | | LAN | RTD2S | | TCC02560 6095 |
| 11BD | 004D | 80DE | | SAN | TEM511 | B11,COMPENSATION | TCC02570 6096 |
| 11BE | 004E | C051 | | BRU | **3 | | TCC02580 6097 |
| 11BF | 004F | 70D0 | | LAN | RTD1S | | TCC02590 6098 |
| 11C0 | 0050 | 80DE | | SAN | TEM511 | B11,COMPENSATION | TCC02600 6099 |
| | 0051 | | TCCB15 | EQU | * | | TCC02610 6100 |
| 11C1 | 0051 | 7505 | | LAN | ATCX1,X | TC ANALOG INPUT (2047 CNTS =1500 DEG) | TCC02620 6101 |
| 11C2 | 0052 | A372 | | ANA | TWO | CHECK ERROR BIT | TCC02630 6102 |
| 11C3 | 0053 | 9371 | | SUB | ONE | | TCC02640 6103 |
| 11C4 | 0054 | F8A0 | | TGR | | | TCC02650 6104 |
| 11C5 | 0055 | 4CD0 | | SST | TCERBT,X | MAKE ERROR MAP | TCC02660 6105 |
| 11C6 | 0056 | 7505 | | LAN | ATCX1,X | UNCOMP TC | TCC02670 6106 |
| 11C7 | 0057 | A387 | | ANA | MSKL12 | BLANK OUT RIGHT FOUR BITS | TCC02680 6107 |
| 11C8 | 0058 | F808 | | TAM | | | TCC02690 6108 |
| 11C9 | 0059 | D063 | | BPS | **10 | | TCC02700 6109 |
| 11CA | 005A | 98DF | | ADD | TEM511 | COMP | TCC02710 6110 |
| 11CB | 005B | 988A | | ADD | CON16 | PREVENT OVERFLOW ON ROUND-UP. | TCC02720 6111 |
| 11CC | 005C | F808 | | TAM | | | TCC02730 6112 |
| 11CD | 005D | D060 | | BRS | **3 | | TCC02740 6113 |
| 11CE | 005E | 938A | | SUB | CON16 | TO GET BACK TO CORRECT VALUE | TCC02750 6114 |
| 11CF | 005F | C064 | | BRU | **5 | | TCC02760 6115 |
| 11D0 | 0060 | 7389 | | LAN | MSKR15 | | TCC02770 6116 |
| 11D1 | 0061 | A387 | | ANA | MSKL12 | | TCC02780 6117 |
| 11D2 | 0062 | C064 | | BRU | **2 | | TCC02790 6118 |
| 11D3 | 0063 | 98DF | | ADD | TEM511 | | TCC02800 6119 |
| 11D4 | 0064 | 80D6 | | SAN | TEM53 | | TCC02810 6120 |
| | | | *THE ACCUM NOW CONTAINS A COMPENSATED TC READING,REF TO ZERO | | | | TCC02820 6121 |
| | | | *DEG F,YIELDING 0 TO 2047 CNTS CORRESPONDING TO 0 TO 1500 DEG F. | | | | TCC02830 6122 |
| | | | *AND AMPLIFIER OFFSET ACCOUNTED FOR | | | | TCC02840 6123 |
| 11D5 | 0065 | 90C8 | | SUB | TMBK1S | TEMP BK = 650 DEG F | TCC02850 6124 |
| 11D6 | 0066 | F880 | | TGR | | POS TEST. | TCC02860 6125 |
| 11D7 | 0067 | D06F | | BRS | TCCB20 | NO. | TCC02870 6126 |
| 11D8 | 0068 | CB52 | | ESC | .MPY | MULT ROUTINE FOR TC LESS THAN 650 DEG | TCC02880 6127 |
| 11D9 | 0069 | 00D4 | | PIN | TEM51 | | TCC02890 6128 |
| 11DA | 806A | 00D6 | | PIN | TEM53 | | TCC02900 6129 |
| 11DB | 006B | 00D7 | | PIN | TEM54 | | TCC02910 6130 |
| 11DC | 006C | 70D6 | | LAN | TEM53 | | TCC02920 6131 |
| 11DD | 806D | 98D7 | | ADD | TEM54 | | TCC02930 6132 |
| 11DE | 006E | C07B | | BRU | TCCB25 | | TCC02940 6133 |
| | 006F | | TCCB20 | EQU | * | | TCC02950 6134 |
| 11DF | 006F | 90C9 | | SUB | TMBK2S | EQUAL TO 570 DEG F(TC = 650-570). | TCC02960 6135 |
| 11E0 | 0070 | F880 | | TGR | | | TCC02970 6136 |
| 11E1 | 0071 | 8874 | | BRC | **3 | | TCC02980 6137 |
| 11E2 | 0072 | 70D6 | | LAN | TEM53 | | TCC02990 6138 |
| 11E3 | 0073 | C07B | | BRU | TCCB25 | | TCC03000 6139 |
| 11E4 | 0074 | 80DB | | SAN | TEM58 | | TCC03010 6140 |
| 11E5 | 0075 | CB52 | | ESC | .MPY | MULT ROUTINE | TCC03020 6141 |
| 11E6 | 0076 | 00D9 | | PIN | TEM56 | | TCC03030 6142 |
| 11E7 | 0077 | 00D8 | | PIN | TEM58 | | TCC03040 6143 |
| 11E8 | 0078 | 00DC | | PIN | TEM59 | | TCC03050 6144 |
| 11E9 | 0079 | 70D6 | | LAN | TEM53 | B11,COMP,TC READING | TCC03060 6145 |
| 11EA | 007A | 90DC | | SUB | TEM59 | B11,NEG NUMBER,LINEARIZING CORRECTION | TCC03070 6146 |
| | 007B | | TCCB25 | EQU | * | | TCC03080 6147 |
| 11EB | 007B | 80DF | | SAN | TEM512 | B11,LINEARIZED,COMP TC READING | TCC03090 6148 |
| 11EC | 007C | A378 | | ANA | EIGHT | ROUND OFF ROUTINE | TCC03100 6149 |
| 11ED | 007D | 9371 | | SUB | ONE | | TCC03110 6150 |
| 11EE | 007E | F808 | | TAM | | | TCC03120 6151 |
| 11EF | 007F | D083 | | BRS | **4 | LESS THAN ONE HALF | TCC03130 6152 |
| 11F0 | 0080 | 70DF | | LAN | TEM512 | ONE HALF OR MORE | TCC03140 6153 |
| 11F1 | 0081 | 98BA | | ADD | CON16 | ROUND UP | TCC03150 6154 |
| 11F2 | 0082 | 80DF | | SAN | TEM512 | | TCC03160 6155 |
| 11F3 | 0083 | 70DF | | LAN | TEM512 | | TCC03170 6156 |
| 11F4 | 0084 | 8650 | | SAN | ATCX1D,X | B11,LINEARIZED,COMP,ROUNDED READING | TCC03180 6157 |
| | 0085 | | TCCC10 | EQU | * | | TCC03190 6158 |
| 11F5 | 0085 | E805 | | DMR | XD | FINISHED TEST | TCC03200 6159 |

THERMOCOUPLE CALCULATIONS, CONTROL

|   | Addr | Code | Label | Instruction | Operand | Comment | Ref | Line |
|---|------|------|-------|-------------|---------|---------|-----|------|
|   | 11F6 | 0086 D047 |  | BRS | TCCB10 | NO | TCC03210 | 6160 |
|   |      |      |  |  |  |  | TCC03220 | 6161 |
|   |      |      | * |  |  |  | TCC03230 | 6162 |
|   |      |      | * * | SCALING FOR AOTA,B,C,ATX |  |  | TCC03240 | 6163 |
|   |      |      |  |  |  |  | TCC03250 | 6164 |
|   |      | 0087 | TCCC20 | EQU | * |  | TCC03260 | 6165 |
|   | 11F7 | 0087 A8BC |  | LAP | SCLOTA | B1,AOTA SCALING CONSTANT | TCC03270 | 6166 |
|   | 11F8 | 0088 8005 |  | SAN | TEM52 |  | TCC03280 | 6167 |
| W | 11F9 | 0089 7373 |  | LAN | THREE |  | TCC03290 | 6168 |
|   | 11FA | 008A 8005 |  | SAN | XD |  | TCC03300 | 6169 |
|   |      | 008B | TCCC30 | EQU | * |  | TCC03310 | 6170 |
| W | 11FB | 008B 7511 |  | LAN | AOTA,X | OVERTEMP TC READING | TCC03320 | 6171 |
|   | 11FC | 008C F808 |  | TAM |  |  | TCC03330 | 6172 |
| W | 11FD | 008D 44C4 |  | SST | OTNEGB | SET IF OT IS NEG | TCC03340 | 6173 |
|   | 11FE | 008E A372 |  | ANA | TWO | CHECK ERROR BIT | TCC03350 | 6174 |
|   | 11FF | 008F 9371 |  | SUB | ONE |  | TCC03360 | 6175 |
|   | 1200 | 0090 F880 |  | TGR |  |  | TCC03370 | 6176 |
| W | 1201 | 0091 4C0C |  | SST | OTERB1,X | TEMP ERROR MAP | TCC03380 | 6177 |
| W | 1202 | 0092 7511 |  | LAN | AOTA,X |  | TCC03390 | 6178 |
|   | 1203 | 0093 A387 |  | ANA | MSKL12 | BLANK OUT RIGHT 4 BITS | TCC03400 | 6179 |
|   | 1204 | 0094 8006 |  | SAN | TEM53 |  | TCC03410 | 6180 |
|   | 1205 | 0095 CB52 |  | ESC | .MPY |  | TCC03420 | 6181 |
|   | 1206 | 0096 00U4 |  | PIN | TEM51 |  | TCC03430 | 6182 |
|   | 1207 | 0097 0006 |  | PIN | TEM53 |  | TCC03440 | 6183 |
|   | 1208 | 0098 00U7 |  | PIN | TEM54 |  | TCC03450 | 6184 |
|   | 1209 | 0099 7007 |  | LAN | TEM54 | B12 | TCC03460 | 6185 |
|   | 120A | 009A 9B8A |  | ADD | CON16 | PREVENT OVERFLOW ON ROUND-UP. | TCC03470 | 6186 |
|   | 120B | 009B A382 |  | ANA | MSKL2 | CHECK FOR OVERFLOW | TCC03480 | 6187 |
|   | 120C | 009C 9370 |  | SUB | ZERO |  | TCC03490 | 6188 |
|   | 120D | 009D F840 |  | TEQ |  |  | TCC03500 | 6189 |
|   | 120E | 009E D0A6 |  | BRS | *+8 | BRANCH IF READING IS CORRECT | TCC03510 | 6190 |
| W | 120F | 009F 34C4 |  | LAT | OTNEGB |  | TCC03520 | 6191 |
|   | 1210 | 00A0 D0A6 |  | BRS | *+6 | BRANCH IF READING IS CORRECT | TCC03530 | 6192 |
|   | 1211 | 00A1 F900 |  | SIR |  |  | TCC03540 | 6193 |
| W | 1212 | 00A2 4C0C |  | SST | OTERBT,X | SET FLAG IN ERROR MAP | TCC03550 | 6194 |
| W | 1213 | 00A3 7389 |  | LAN | MSKR15 |  | TCC03560 | 6195 |
|   | 1214 | 00A4 A387 |  | ANA | MSKL12 | SET UP SATURATION RDG | TCC03570 | 6196 |
|   | 1215 | 00A5 C0A8 |  | BRU | *+3 |  | TCC03580 | 6197 |
|   | 1216 | 00A6 7007 |  | LAN | TEM54 | B12 | TCC03590 | 6198 |
|   | 1217 | 00A7 E00F |  | SPC | 15 | B11 | TCC03600 | 6199 |
|   | 1218 | 00A8 800F |  | SAN | TEM512 | B11,OVERTEMP TC,SCALED | TCC03610 | 6200 |
|   | 1219 | 00A9 A378 |  | ANA | EIGHT | ROUND OFF ROUTINE | TCC03620 | 6201 |
|   | 121A | 00AA 9371 |  | SUB | ONE |  | TCC03630 | 6202 |
|   | 121B | 00AB F808 |  | TAM |  |  | TCC03640 | 6203 |
|   | 121C | 00AC D0B0 |  | BRS | *+4 | LESS THAN ONE HALF | TCC03650 | 6204 |
|   | 121D | 00AD 700F |  | LAN | TEM512 | ONE HALF OR MORE | TCC03660 | 6205 |
|   | 121E | 00AE 9B8A |  | ADD | CON16 | ROUND UP | TCC03670 | 6206 |
|   | 121F | 00AF 800F |  | SAN | TEM512 |  | TCC03680 | 6207 |
|   | 1220 | 00B0 700F |  | LAN | TEM512 |  | TCC03690 | 6208 |
| W | 1221 | 00B1 865C | * | SAN | AOTAD,X | B11,OVERTEMP TC,SCALED,ROUNDED OFF | TCC03700 | 6209 |
|   | 1222 | 00B2 E805 |  | DMR | XD | FINISHED TEST | TCC03710 | 6210 |
|   | 1223 | 00B3 D08B |  | BRS | TCCC30 | NO | TCC03720 | 6211 |
|   | 1224 | 00B4 7040 |  | LAN | TMEPWD | TC READING ERROR MAP | TCC03730 | 6212 |
|   | 1225 | 00B5 9370 |  | SUB | ZERO |  | TCC03740 | 6213 |
|   | 1226 | 00B6 F880 |  | TGR |  | POS=ONE OR MORE ERRONEOUS TC READING | TCC03750 | 6214 |
| W | 1227 | 00B7 14C0 |  | LOT | RTDERR | RTD1 ERRONEOUS READING FLAG | TCC03760 | 6215 |
| W | 1228 | 00B8 14C1 |  | LOT | RTDERR+1 | RTD2 ERRONEOUS READING FLAG | TCC03770 | 6216 |
| W | 1229 | 00B9 14C2 |  | LOT | OFTERR | AMPLIFIER OFFSET ERRONEOUS RDG FLAG | TCC03780 | 6217 |
| W | 122A | 00BA 44C3 |  | SST | TCCERR | STORE IN TCC INPUT ERROR FLAG | TCC03790 | 6218 |
|   |      | 00BB | TCCC40 | EQU | * |  | TCC03800 | 6219 |
|   | 122B | 00BB CB40 |  | JIS | MSPRTN | RETURN TO MASTER STATUS PROGRAM | TCC03810 | 6220 |
|   |      |      |  |  |  |  | TCC03820 | 6221 |
|   |      |      | * | TCC CONSTANTS |  |  | TCC03830 | 6222 |
|   |      |      | * |  |  |  | TCC03840 | 6223 |
|   | 122C | 00BC 6AAB | SCLOTA | SCN | D,1.6667B1 | SCALING FACTOR FOR AOTA,B,C,ATX | TCC03850 | 6224 |
|   | 122D | 00BD 0800 | SCLRTD | SCN | D,.125B1 | RTD SCALING FACTOR | TCC03860 | 6225 |
|   | 122E | 00BE 0265 | SCLTC1 | SCN | D,.01969B0 | TC LINEARIZING CONST BELOW 650 DEG | TCC03870 | 6226 |
|   | 122F | 00BF 032B | SCLTC2 | SCN | D,.02476B0 | TC LINEARIZING CONST ABOVE 650 DEG | TCC03880 | 6227 |
|   | 1230 | 00C0 3770 | TEMBK1 | SCN | D,.887.0B11 | TEMP BK PT (650 DEG) | TCC03890 | 6228 |
|   | 1231 | 00C1 06D3 | RTDAMB | SCN | D,109.2B11 | TYPICAL AMB TEMP (88 DEG) | TCC03900 | 6229 |
|   |      |      |  |  |  | IN CASE OF ERRONEOUS RTD READING | TCC03910 | 6230 |
|   | 1232 | 00C2 0631 | TMOFT1 | SCN | D,99.1B11 | RTD NULL TEMP (EQUIV. TO 77 DEGF) | TCC03920 | 6231 |
|   | 1233 | 00C3 3090 | TEMBK2 | SCN | D,777.86B11 | TEMP CALC CONST (570 DEG) | TCC03930 | 6232 |
|   |      | 004C | TCCEND | GEN | TCCSIZ-* | PATCH AREA | TCC03940 | 6233 |
| W | 1234 | 00C4 E800 |  | DMR | 0 | HALT | TCC03950 | 6234 |
|   | 1235 | 00C5 E800 |  |  |  |  |  | 0 |
|   | 1236 | 00C6 E800 |  |  |  |  |  | 0 |
|   | 1237 | 00C7 E800 |  |  |  |  |  | 0 |
|   | 1238 | 00C8 E800 |  |  |  |  |  | 0 |
|   | 1239 | 00C9 E800 |  |  |  |  |  | 0 |
|   | 123A | 00CA E800 |  |  |  |  |  | 0 |
|   | 123B | 00CB E800 |  |  |  |  |  | 0 |
|   | 123C | 00CC E800 |  |  |  |  |  | 0 |
|   | 123D | 00CD E800 |  |  |  |  |  | 0 |
|   | 123E | 00CE E800 |  |  |  |  |  | 0 |
|   | 123F | 00CF E800 |  |  |  |  |  | 0 |
|   | 1240 | 00D0 E800 |  |  |  |  |  | 0 |
|   | 1241 | 00D1 E800 |  |  |  |  |  | 0 |
|   | 1242 | 00D2 E800 |  |  |  |  |  | 0 |
|   | 1243 | 00D3 E800 |  |  |  |  |  | 0 |
|   | 1244 | 00D4 E800 |  |  |  |  |  | 0 |
|   | 1245 | 00D5 E800 |  |  |  |  |  | 0 |
|   | 1246 | 00D6 E800 |  |  |  |  |  | 0 |
|   | 1247 | 00D7 E800 |  |  |  |  |  | 0 |
|   | 1248 | 00D8 E800 |  |  |  |  |  | 0 |
|   | 1249 | 00D9 E800 |  |  |  |  |  | 0 |
|   | 124A | 00DA E800 |  |  |  |  |  | 0 |
|   | 124B | 00DB E800 |  |  |  |  |  | 0 |
|   | 124C | 00DC E800 |  |  |  |  |  | 0 |
|   | 124D | 00DD E800 |  |  |  |  |  | 0 |
|   | 124E | 00DE E800 |  |  |  |  |  | 0 |

```
                                                                                    TCA01000 6237
                                                                                    TCA01010 6238
              *                                                                     TCA01020 6239
              *                                                                     TCA01030 6240
              * * * * * * * * * * * * * * * * * * * * * * * *                       TCA01040 6241
                                                                          *         TCA01050 6242
              *       THERMOCOUPLE AVERAGING PROGRAM TCA                  *         TCA01060 6243
                                                                                    TCA01070 6244
              *                                                           *         TCA01080 6245
                                                                                    TCA01090 6246
                                                                                    TCA01100 6247
              *                                                           *         TCA01110 6248
              * * * * * * * * * * * * * * * * * * * * * * * *                       TCA01120 6249
                         OBJ 1                                                      TCA01130 6250
                         INS 2                                                      TCA01140 6251
                                                                                    TCA01150 6252
              *  EQB/EQL STATEMENTS                                                 TCA01160 6253
              * *                                                                   TCA01170 6254
   03F6      TCARFG   EQB  RUNWD,#6           TCA RUN FLAG BIT                      TCA01180 6255
   0420      HFLB1    EQB  HFLWRD,#0          HOT SPOT REF BIT                      TCA01190 6256
   0430      LFLB1    EQB  LFLWRD,#0          COLD SPOT REF BIT                     TCA01200 6257
   0480      TCMRJB   EQB  TCAMLR,#0          TC MANUAL REJECT REF BIT              TCA01210 6258
   0416      TCAFPT   EQB  TCAFLG,#6          FIRST TC POINT CHECKED                TCA01220 6259
   041A      TCAPSS   EQB  TCAFLG,#A          SECOND PASS FLAG,INT USE ONLY         TCA01230 6260
                                                                                    TCA01240 6261
              *                                                                     TCA01250 6262
   0260      TXSUM    EQL  DSTOR6             EXHAUST TEMP SUM                      TCA01260 6263
             *TXAVG         AVERAGE EXHAUST TEMP                                    TCA01270 6264
   0262      KVAL1    EQL  DSTOR6+2           CORRECTION #1(ATXD-TXAVG)             TCA01280 6265
             *TXSPD         EXHAUST TEMP SPREAD                                     TCA01290 6266
                                                                                    TCA01300 6267
              *                                                                     TCA01310 6268
   00D8      TXAVGN   EQL  SCRT3              NEW EXHAUST AVG                       TCA01320 6269
   00D9      GTCCT1   EQL  SCRT3+1            GOOD TC COUNTER #1                    TCA01330 6270
   00DA      GTCCT2   EQL  SCRT3+2            GOOD TC COUNTER #2                    TCA01340 6271
   00DB      TXMAX    EQL  SCRT3+3            MAX EXHAUST TEMP                      TCA01350 6272
   00DC      TXMIN    EQL  SCRT3+4            MIN EXHAUST TEMP                      TCA01360 6273
   00D0      TEM61    EQL  SCRT2                                                    TCA01370 6274
   00D1      TEM62    EQL  SCRT2+1                                                  TCA01380 6275
   00D2      TEM63    EQL  SCRT2+2                                                  TCA01390 6276
   00D3      TEM64    EQL  SCRT2+3                                                  TCA01400 6277
   00D4      TEM65    EQL  SCRT2+4                                                  TCA01410 6278
              * *                                                                   TCA01420 6279
              *    SYSTEM SYMBOLS                                                   TCA01430 6280
              * *                                                                   TCA01440 6281
             *ATCX1D        DSTOR5    COMP,LINEARIZED,TEMP RDGS                     TCA01450 6282
   025F      ATXD     EQL  DSTOR5+#F          TEMP MID VALUE                        TCA01460 6283
             *THERWD        TC READING ERROR MAP                                    TCA01470 6284
             *TCERB1   THERWD,#0  TC READING ERROR REF BIT                          TCA01480 6285
             *TCAMLR        TC MANUAL REJECT MAP                                    TCA01490 6286
             *LFLWRD        COLD SPOT MAP                                           TCA01500 6287
             *HFLWRD        HOT SPOT MAP                                            TCA01510 6288
             *TCASPD        EXCESSIVE TEMP SPREAD                                   TCA01520 6289
             *TCACS         COLD SPOT                                               TCA01530 6290
             *TCAHS         HOT SPOT                                                TCA01540 6291
             *TCATCN        EXCESSIVE TEMP'S OUT OF LIMITS                          TCA01550 6292
             *TCAAVG        EXCESSIVE CHANGE IN TX AVG                              TCA01560 6293
             *TCAART        TEMP SYSTEM ABORT                                       TCA01570 6294
             *TCAMRJ        TEMP MANUAL REJECT FLAG                                 TCA01580 6295
             *TCAMXB        MAX TEMP READING EXCEEDS LIMIT                          TCA01590 6296
              * * *                                                                 TCA01600 6297
                                                                                    TCA01610 6298
              *  TCA PROGRAM STARTS HERE                                            TCA01620 6299
              *                                                                     TCA01630 6300
              * * *                                                                 TCA01640 6301
    1280 0000 0000            ORG  TCASRT,A        ORIGINATION STATEMENT            TCA01650 6302
         0000      TCAA01  EQL  *                                                   TCA01660 6303
    1280 0000 F800           CLR                                                    TCA01670 6304
    1281 0001 43F6           SST  TCARFG          CLEAR TCA RUN FLAG                TCA01680 6305 *
    1282 0002 C040           BRU  TCAP01          JUMP TO PATCH AREA                TCA01690 6306
W   1283 0003 737E   TCAA05  LAN  CON14                                             TCA01700 6307
    1284 0004 8005           SAN  XI              SET INDEX                         TCA01710 6308
W   1285 0005 737F           LAN  CON15                                             TCA01720 6309
    1286 0006 80D9           SAN  GTCCT1          INIT GOOD TC COUNTER #1           TCA01730 6310
    1287 0007 80DA           SAN  GTCCT2          INIT GOOD TC COUNTER #2           TCA01740 6311
W   1288 0008 7370           LAN  ZERO                                              TCA01750 6312
    1289 0009 8260           SAN  TXSUM           INIT TX SUMMING STORAGE WORD      TCA01760 6313
    128A 000A 8042           SAN  HFLWRD          HOT FLAG WORD                     TCA01770 6314
    128B 000B 8043           SAN  LFLWRD          COLD FLAG WORD                    TCA01780 6315
    128C 000C F900           SIR                                                    TCA01790 6316
W   128D 000D 4416           SST  TCAFPT                                            TCA01800 6317
         000E      TCAA10  EQL  *                                                   TCA01810 6318
W   128E 000E 3CD0           LAT  TCERB1,X        TEST ERROR BIT                    TCA01820 6319
    128F 000F B812           BFC  *+3             POINT IS CORRECT                  TCA01830 6320
    1290 0010 E8D9           DMR  GTCCT1                                            TCA01840 6321 *
    1291 0011 C02F           BRU  TCAA15                                            TCA01850 6322
W   1292 0012 3CB0           LAT  TCMRJB,X        TEST FOR MANUAL REJECT            TCA01860 6323
    1293 0013 B817           BFC  *+4             TC NOT REJECTED                   TCA01870 6324
W   1294 0014 4418           SST  TCAMRJ          SET TC MANUAL REJ FLAG            TCA01880 6325
    1295 0015 E8D9           DMR  GTCCT1          DECREMENT GOOD TC COUNTER         TCA01890 6326
    1296 0016 C02F           BRU  TCAA15                                            TCA01900 6327
    1297 0017 7650           LAN  ATCX1D,X        COMP,LINEAR,TC READING            TCA01910 6328
    1298 0018 80D0           SAN  TEM61                                             TCA01920 6329
W   1299 0019 3416           LAT  TCAFPT          FIRST GOOD POINT                  TCA01930 6330
    129A 001A B81F           BFC  *+5             NO                                TCA01940 6331
    129B 001B 80DB           SAN  TXMAX                                             TCA01950 6332
    129C 001C 80DC           SAN  TXMIN                                             TCA01960 6333
    129D 001D F800           CLR                                                    TCA01970 6334
W   129E 001E 4416           SST  TCAFPT          CLEAR FIRST GOOD PT FLAG          TCA01980 6335
    129F 001F 90DC           SUB  TXMIN                                             TCA01990 6336 *
    12A0 0020 F880           TLR                                                    TCA02000 6337
    12A1 0021 D024           BRS  *+3             POS=NO CHANGE IN DATA             TCA02010 6338
    12A2 0022 78D0           LAN  TEM61                                             TCA02020 6339
    12A3 0023 80DC           SAN  TXMIN           NEW MIN TX                        TCA02030 6340
```

THERMOCOUPLE AVERAGING

```
12A4 0024 700B          LAN  TXMAX                                          TCA02040 6341
12A5 0025 90D0          SUB  TEM61                                          TCA02050 6342
12A6 0026 F880          TGR                                                 TCA02060 6343
12A7 0027 D02A          BRS  *+3            POS=NO CHANGE IN DATA           TCA02070 6344
12A8 0028 70D0          LAN  TEM61                                          TCA02080 6345
12A9 0029 80DB          SAN  TXMAX          NEW MAX TX                      TCA02090 6346
12AA 002A 70D0          LAN  TEM61                                          TCA02100 6347
12AB 002B F808          TAM                                                 TCA02110 6348
12AC 002C F004          SRR  4              B15 NUMBER                      TCA02120 6349
12AD 002D 9A60          ADD  TXSUM                                          TCA02130 6350
12AE 002E 8260          SAN  TXSUM                                          TCA02140 6351
     002F         TCAA15 EQU *                                              TCA02150 6352
12AF 002F E8D5          DMR  XD             DECREMENT INDEX                 TCA02160 6353
12B0 0030 D00E          BRS  TCAA10         FINISHED TEST,NO=RETURN TO TCAA10 TCA02170 6354
12B1 0031 A8D5          LAP  LTXMAX         MAX TEMP LIMIT                  TCA02180 6355
12B2 0032 90D8          SUB  TXMAX          MAX TEMP READING                TCA02190 6356
12B3 0033 F808          TAM                                                 TCA02200 6357
12B4 0034 4419      W   SST  TCAMXB         SET FLAG IF MAX TEMP EXCESSIVE  TCA02210 6358
                                                                            TCA02220 6359
                    *  DETERMINE NEW TX  AVG ,TXAVGN                        TCA02230 6360
                                                                            TCA02240 6361
     0035           TCAA20 EQU *                                            TCA02250 6362
12B5 0035 7370      W   LAN  ZERO                                           TCA02260 6363
12B6 0036 80D1          SAN  TEM62                                          TCA02270 6364
12B7 0037 7260          LAN  TXSUM          B15                             TCA02280 6365
12B8 0038 80D0          SAN  TEM61                                          TCA02290 6366
12B9 0039 70D9          LAN  GTCCT1         B15                             TCA02300 6367
12BA 003A E0D5          SRC  5              B4                              TCA02310 6368
12BB 003B 80D2          SAN  TEM63                                          TCA02320 6369
12BC 003C C853          ESC  .DVD                                           TCA02330 6370
12BD 003D 00D0          PIN  TEM61                                          TCA02340 6371
12BE 003E 00D2          PIN  TEM63                                          TCA02350 6372
12BF 003F 00D3          PIN  TEM64                                          TCA02360 6373
12C0 0040 70D4          LAN  TEM65                                          TCA02370 6374
12C1 0041 80D8          SAN  TXAVGN         B11                             TCA02380 6375
                                                                            TCA02390 6376
                    *  CHECK FOR EXCESSIVE SPREAD BETWEEN TXMIN AND TXMAX.  TCA02400 6377
                                                                            TCA02410 6378
     0042           TCAA30 EQU *                                            TCA02420 6379
12C2 0042 A8B1          LAP  LTXSPD         TEMP SPREAD LIMIT               TCA02430 6380
12C3 0043 80D0          SAN  TEM61                                          TCA02440 6381
12C4 0044 70D8          LAN  TXMAX          TX MAX RDG                      TCA02450 6382
12C5 0045 90DC          SUB  TXMIN          TX MIN RDG                      TCA02460 6383
12C6 0046 C054          BRU  TCAP07         JUMP TO PATCH AREA              TCA02470 6384
12C7 0047 90D0     TCAA31 SUB TEM61         TEMP SPREAD LIMIT               TCA02480 6385
12C8 0048 F880          TGR                 POS=EXCESSIVE SPREAD            TCA02490 6386
12C9 0049 D04F          BRS  *+6            EXCESSIVE SPREAD                TCA02500 6387
12CA 004A 4410      W   SST  TCASPD         CLEAR EXCESSIVE SPREAD FG       TCA02510 6388
12CB 004B 4413      W   SST  TCATCH         CLEAR EXCESSIVE TC'S OUT OF LIMIT FG TCA02520 6389
12CC 004C 4412      W   SST  TCAHS          CLEAR HOT SPOT FG               TCA02530 6390
12CD 004D 4411      W   SST  TCACS          CLEAR COLD SPOT FG              TCA02540 6391
12CE 004E C04C          BRU  TCAP04         JUMP TO PATCH AREA              TCA02550 6392
12CF 004F 4410      W  TCAA32 SST TCASPD    SET EXCESSIVE SPREAD FLAG       TCA02560 6393
                                                                            TCA02570 6394
                    *  SET-UP OUT OF LIMITS MAPS,HFWRD,LFWRD,ACCUMULATE     TCA02580 6395
                    *  TXSUM,COUNT GOOD TC READINGS                         TCA02590 6396
     0050           TCAB10 EQU *                                            TCA02600 6397
12D0 0050 7370      W   LAN  ZERO                                           TCA02610 6398
12D1 0051 8260          SAN  TXSUM                                          TCA02620 6399
12D2 0052 737E      W   LAN  CON14                                          TCA02630 6400
12D3 0053 8005          SAN  XD             SET UP INDEX                    TCA02640 6401
12D4 0054 737F      W   LAN  CON15                                          TCA02650 6402
12D5 0055 C04E          BRU  TCAP05         JUMP TO PATCH AREA              TCA02660 6403
12D6 0056 A8B2      TCAB15 LAP LTXDF1       ALLOWABLE TEMP DIFF             TCA02670 6404
12D7 0057 98D8          ADD  TXAVGN                                         TCA02680 6405
12D8 0058 80D0          SAN  TEM61          UPPER LIMIT                     TCA02690 6406
12D9 0059 A8B3          LAP  LTXDF2                                         TCA02700 6407
12DA 005A 80D1          SAN  TEM62                                          TCA02710 6408
12DB 005B 70D8          LAN  TXAVGN                                         TCA02720 6409
12DC 005C 90D1          SUB  TEM62                                          TCA02730 6410
12DD 005D 80D1          SAN  TEM62          LOWER LIMIT                     TCA02740 6411
                    *  ENTERING LOOP TO CHECK TC                            TCA02750 6412
                    *  READINGS AGAINST LOWER,UPPER LIMITS                  TCA02760 6413
     005E           TCAB20 EQU *                                            TCA02770 6414
12DE 005E F800          CLR                                                 TCA02780 6415
12DF 005F 3CD0      W   LAT  TCERRT,X       TC READING ERROR FLAG BIT       TCA02790 6416
12E0 0060 8864          BRC  *+4            READING CORRECT                 TCA02800 6417
12E1 0061 E8D9          DMR  GTCCT1         DECREMENT COUNTER#1             TCA02810 6418
12E2 0062 E8DA          DMR  GTCCT2         DECREMENT COUNTER#2             TCA02820 6419
12E3 0063 C07D          BRU  TCAB30                                         TCA02830 6420
12E4 0064 3C80      W   LAT  TCMRJB,X       TC MANUAL REJECT FLAG           TCA02840 6421
12E5 0065 8869          BRC  *+4                                            TCA02850 6422
12E6 0066 E8D9          DMR  GTCCT1         DECREMENT COUNTER#1             TCA02860 6423
12E7 0067 E8DA          DMR  GTCCT2         DECREMENT COUNTER#2             TCA02870 6424
12E8 0068 C07D          BRU  TCAB30                                         TCA02880 6425
12E9 0069 7650          LAN  ATCX1D,X       TC READING                      TCA02890 6426
12EA 006A 80D2          SAN  TEM63                                          TCA02900 6427
12EB 006B C051          BRU  TCAP06         JUMP TO PATCH AREA              TCA02910 6428
12EC 006C F880      TCAB22 TGR                                              TCA02920 6429
12ED 006D 4C30      W   SST  LFLBT,X                                        TCA02930 6430
12EE 006E 8872          BRC  *+4            READING IS WITHIN LOWER LIMIT   TCA02940 6431
12EF 006F E8D9          DMR  GTCCT1         DECREMENT COUNTER #1            TCA02950 6432
12F0 0070 E8DA          DMR  GTCCT2         DECREMENT COUNTER #2            TCA02960 6433
12F1 0071 C07D          BRU  TCAB30                                         TCA02970 6434
12F2 0072 70D2          LAN  TEM63          TC READING                      TCA02980 6435
12F3 0073 90D0          SUB  TEM61          UPPER LIMIT                     TCA02990 6436
12F4 0074 F880          TGR                 POS=OUT OF LIMIT                TCA03000 6437
12F5 0075 4C20      W   SST  HFLBT,X                                        TCA03010 6438
12F6 0076 B878          BRC  *+2                                            TCA03020 6439
```

THERMOCOUPLE AVERAGING

| | | | | | | |
|---|---|---|---|---|---|---|
| 12F7 | 0077 | E8D9 | | DMR GTCCT1 | DECREMENT COUNTER | TCA03030 6440 |
| | | | *ACCUMMULATE SUM | | | TCA03040 6441 |
| | 0078 | | TCAB25 EQU * | | | TCA03050 6442 |
| 12F8 | 0078 | 70D2 | | LAN TEM63 | B11 | TCA03060 6443 |
| 12F9 | 0079 | F808 | | TAM | | TCA03070 6444 # |
| 12FA | 007A | F004 | | SRR 4 | B15 | TCA03080 6445 |
| 12FB | 007B | 9A60 | | ADD TXSUM | | TCA03090 6446 |
| 12FC | 007C | 8260 | | SAN TXSUM | | TCA03100 6447 |
| | 007D | | TCAB30 EQU * | | | TCA03110 6448 |
| 12FD | 007D | E805 | | DMR XD | | TCA03120 6449 |
| 12FE | 007E | D05E | | BRS TCAB20 | CHECK FOR FINISH | TCA03130 6450 |
| | | | | | | TCA03140 6451 |
| | | | * CHECK FOR HOT/COLD SPOTS | | | TCA03150 6452 |
| | | | | | | TCA03160 6453 |
| | 007F | | TCAC10 EQU * | | | TCA03170 6454 |
| 12FF | 007F | C08A | | BRU TCAC40 | | TCA03180 6455 |
| 1300 | 0080 | 9801 | TCAC11 ADD BP | | ADD PROCEDURE BASE | TCA03190 6456 |
| 1301 | 0081 | 80D4 | | SAN TEM65 | | TCA03200 6457 |
| 1302 | 0082 | 7043 | | LAN LFLWRD | COLD TC MAP | TCA03210 6458 |
| 1303 | 0083 | 80D0 | | SAN TEM61 | | TCA03220 6459 |
| 1304 | 0084 | C8D4 | | JIS TEM65 | JUMP TO ADDRESS CONTAINED IN TEM65 | TCA03230 6460 |
| W 1305 | 0085 | 4411 | | SST TCACS | STORE IN COLD SPOT FLAG | TCA03240 6461 |
| | 0086 | | TCAC20 EQU * | | | TCA03250 6462 |
| 1306 | 0086 | 7042 | | LAN HFLWRD | HOT SPOT MAP | TCA03260 6463 |
| 1307 | 0087 | 80D0 | | SAN TEM61 | | TCA03270 6464 |
| 1308 | 0088 | C8D4 | | JIS TEM65 | JUMP TO ADDRESS CONTAINED IN TEM65 | TCA03280 6465 # |
| 1309 | 0089 | C048 | | BRU TCAP03 | | TCA03290 6466 |
| | | | | | | TCA03300 6467 |
| | | | * CALC NEW TXAVG | | | TCA03310 6468 |
| | | | | | | TCA03320 6469 |
| | 008A | | TCAC40 EQU * | | | TCA03330 6470 |
| W 130A | 008A | 7370 | | LAN ZERO | | TCA03340 6471 |
| 130B | 008B | 80D1 | | SAN TEM62 | | TCA03350 6472 |
| 130C | 008C | 7260 | | LAN TXSUM | B15 | TCA03360 6473 |
| 130D | 008D | 80D0 | | SAN TEM61 | | TCA03370 6474 |
| 130E | 008E | 70DA | | LAN GTCCT2 | B15,GOOD TC COUNTER | TCA03380 6475 |
| 130F | 008F | E005 | | SRC 5 | B4 | TCA03390 6476 |
| 1310 | 0090 | 80D2 | | SAN TEM63 | | TCA03400 6477 |
| 1311 | 0091 | CB53 | | ESC .DVD | | TCA03410 6478 |
| 1312 | 0092 | 00D0 | | PIN TEM61 | | TCA03420 6479 |
| 1313 | 0093 | 00D2 | | PTN TEM63 | | TCA03430 6480 |
| 1314 | 0094 | 00D3 | | PIN TEM64 | | TCA03440 6481 |
| 1315 | 0095 | 70D4 | | LAN TEM65 | B11,NEW AVG | TCA03450 6482 |
| 1316 | 0096 | 80D8 | | SAN TXAVGN | | TCA03460 6483 |
| | | | | | | TCA03470 6484 # |
| | | | *CHECK FOR MIN # OF TC WITHIN LIMITS | | | TCA03480 6485 |
| | | | | | | TCA03490 6486 |
| | 0097 | | TCAC50 EQU * | | | TCA03500 6487 |
| 1317 | 0097 | C044 | | BRU TCAP02 | JUMP TO PATCH AREA | TCA03510 6488 |
| 1318 | 0098 | 90D9 | TCAC51 SUB GTCCT1 | | TC'S WITHIN LIMITS | TCA03520 6489 |
| 1319 | 0099 | F880 | | TGR | POS=TROUBLE | TCA03530 6490 |
| W 131A | 009A | 4413 | | SST TCATCN | EXCESSIVE # OF TC'S OUT OF LIMITS | TCA03540 6491 |
| | | | | | | TCA03550 6492 |
| | | | *CHECK FOR EXCESSIVE CHANGE IN AVG TX | | | TCA03560 6493 |
| | 009B | | TCAC55 EQU * | | | TCA03570 6494 |
| 131B | 009B | A8B4 | | LAP LTXAVG | LIMIT,OF CHANGE IN AVG TX | TCA03580 6495 |
| 131C | 009C | 80D0 | | SAN TEM61 | | TCA03590 6496 |
| 131D | 009D | 70D8 | | LAN TXAVGN | NEW AVG | TCA03600 6497 |
| 131E | 009E | 9166 | | SUB TXAVG | OLD AVG,PREVIOUS PASS | TCA03610 6498 |
| 131F | 009F | F808 | | TAM | | TCA03620 6499 |
| 1320 | 00A0 | B8A5 | | BRC *+5 | IF POSITIVE | TCA03630 6500 |
| 1321 | 00A1 | 98D0 | | ADD TEM61 | DIFF LIMIT | TCA03640 6501 |
| 1322 | 00A2 | F8U8 | | TAM | NEG=EXCESSIVE DIFF | TCA03650 6502 |
| W 1323 | 00A3 | 4414 | | SST TCAAVG | EXCESSIVE TXAVG DIFF FLAG | TCA03660 6503 |
| 1324 | 00A4 | C0AB | | BRU TCAC60 | | TCA03670 6504 |
| 1325 | 00A5 | 90D0 | | SUB TEM61 | | TCA03680 6505 |
| 1326 | 00A6 | F880 | | TGR | POS=EXCESSIVE DIFF | TCA03690 6506 # |
| W 1327 | 00A7 | 4414 | | SST TCAAVG | EXCESSIVE DIFF FLAG | TCA03700 6507 |
| | | | | | | TCA03710 6508 |
| | | | * STORE NEW AVG,CALC CORRECTION,KVAL, AND CHECK FOR OVERFLOW | | | TCA03720 6509 |
| | | | | | | TCA03730 6510 |
| | 00A8 | | TCAC60 EQU * | | | TCA03740 6511 |
| 1328 | 00A8 | 70D8 | | LAN TXAVGN | B11 | TCA03750 6512 |
| W 1329 | 00A9 | 8166 | | SAN TXAVG | | TCA03760 6513 |
| W 132A | 00AA | 725F | | LAN ATXD | | TCA03770 6514 |
| 132B | 00AB | 9166 | | SUB TXAVG | | TCA03780 6515 |
| 132C | 00AC | 8262 | | SAN KVAL1 | CORRECTION FACTOR #1 (ATXD-TXAVG) | TCA03790 6516 |
| 132D | 00AD | FA00 | | TOV | TEST OVERFLOW | TCA03800 6517 |
| W 132E | 00AE | 4415 | | SST TCAABT | | TCA03810 6518 |
| | 00AF | | TCAC70 EQU * | | | TCA03820 6519 |
| 132F | 00AF | C840 | | JIS MSPRTN | RETURN TO MASTER STATUS | TCA03830 6520 |
| | | | | | | TCA03840 6521 |
| | | | * TCA CONSTANTS | | | TCA03850 6522 |
| | | | | | | TCA03860 6523 |
| 1330 | 00B0 | 0009 | MINTCR CON 9 | | MIN NUMBER OF TC'S ALLOWED TO BE REJECT | TCA03870 6524 |
| 1331 | 00B1 | 05E8 | LTXSPD SCN D,95.53B11 | | LIMIT,EXHAUST TEMP SPREAD=70 DEG F | TCA03880 6525 |
| 1332 | 00B2 | 0443 | LTXDF1 SCN D,68.23B11 | | LIMIT,TC DEV FROM AVG,UPPER=50 DEG F | TCA03890 6526 |
| 1333 | 00B3 | 0443 | LTXDF2 SCN D,68.23B11 | | LIMIT,TC DEV FROM AVG,LOWER=50 DEG F | TCA03900 6527 |
| 1334 | 00B4 | 0221 | LTXAVG SCN D,34.12B11 | | LIMIT,CHANGE IN TEMP AVG =25 DEG F | TCA03910 6528 |
| 1335 | 00B5 | 6660 | LTXMAX SCN D,1638B11 | | LIMIT,MAX TEMP READING =1200 DEG F | TCA03920 6529 # |
| 1336 | 00B6 | 00B7 | TCASBP CON TCASUB | | ADDRESS OF LOCAL SUBROUTINE | TCA03930 6530 |
| | | | | | | TCA03940 6531 |
| | | | * COLD/HOT SPOT SEARCHING SUB-ROUTINE | | | TCA03950 6532 |
| | | | | | | TCA03960 6533 |
| | 00B7 | | TCASUB EQU * | | | TCA03970 6534 |
| 1337 | 0000 | 0000 | | ORG TCASR1+TCASUB,A | | TCA03980 6535 |
| W 1337 | 0000 | 737C | | LAN THELVE | | TCA03990 6536 |
| 1338 | 0001 | 80D5 | | SAN XD | SET UP INDEX | TCA04000 6537 |
| | | | *SHUFFLE BITS TO GIVE CORRECT SEQ AROUND THE EXH PLENUM | | | TCA04010 6538 |

THERMOCOUPLE AVERAGING

```
1339 0002 70b0            LAN TEM61                                               TCA04020 6539
133A 0003 A373            ANA THREE                                               TCA04030 6540
133B 0004 80D1            SAN TEM62        TC FLAGS  2,1                          TCA04040 6541
133C 0005 70D0            LAN TEM61                                               TCA04050 6542
133D 0006 E00C            SRC 12                                                  TCA04060 6543
133E 0007 A377            ANA SEVEN                                               TCA04070 6544
133F 0008 80D2            SAN TEM63                                               TCA04080 6545
1340 0009 A371            ANA ONE                                                 TCA04090 6546
1341 000A E00E            SRC 14                                                  TCA04100 6547
1342 000B 80D1            ERA TEM62                                               TCA04110 6548
1343 000C 80D1            SAN TEM62        TC FLAGS  OTA,2,1                      TCA04120 6549
1344 000D 70D0            LAN TEM61                                               TCA04130 6550
1345 000E E002            SRC 2                                                   TCA04140 6551
1346 000F A37F            ANA CON15                                               TCA04150 6552
1347 0010 E00D            SRC 13                                                  TCA04160 6553
1348 0011 80D1            ERA TEM62                                               TCA04170 6554
1349 0012 80D1            SAN TEM62        FLAG 6,5,4,3,OTA,2,1                   TCA04180 6555
134A 0013 70D2            LAN TEM63                                               TCA04190 6556
134B 0014 A372            ANA TWO                                                 TCA04200 6557
134C 0015 E00A            SRC 10                                                  TCA04210 6558
134D 0016 80D1            ERA TEM62                                               TCA04220 6559
134E 0017 80D1            SAN TEM62        FLAGS OTB,6,5,4,3,OTA,2,1              TCA04230 6560
134F 0018 70D0            LAN TEM61                                               TCA04240 6561
1350 0019 E006            SRC 6                                                   TCA04250 6562
1351 001A A37F            ANA CON15                                               TCA04260 6563
1352 001B E008            SRC 8                                                   TCA04270 6564
1353 001C 80D1            ERA TEM62                                               TCA04280 6565
1354 001D 80D1            SAN TEM62        FLAGS 10,9,8,7,OTB,6,5,4,3,OTA,2,1     TCA04290 6566
1355 001E 70D2            LAN TEM63                                               TCA04300 6567
1356 001F A374            ANA FOUR                                                TCA04310 6568
1357 0020 E006            SRC 6                                                   TCA04320 6569
1358 0021 80D1            ERA TEM62                                               TCA04330 6570
1359 0022 80D1            SAN TEM62        FLAGS OTC,10,9,8,7,OTB,6,5,4,3,OTA,2,1 TCA04340 6571
135A 0023 70D0            LAN TEM61                                               TCA04350 6572
135B 0024 E00A            SRC 10                                                  TCA04360 6573
135C 0025 A373            ANA THREE                                               TCA04370 6574
135D 0026 E003            SRC 3                                                   TCA04380 6575
135E 0027 80D1            ERA TEM62                                               TCA04390 6576
135F 0028 80D0            SAN TEM61        FLAGS 12,11,OTC,10,9,8,7, ETC          TCA04400 6577
                          *CHECK FOR COLD/HOT SPOT PATTERN                        TCA04410 6578
     0029         TCAD10 EQL *                                                    TCA04420 6579
1360 0029 737C            LAN TWELVE                                              TCA04430 6580
1361 002A 8005            SAN XD           SET UP INDEX                           TCA04440 6581
1362 002B 70D0            LAN TEM61                                               TCA04450 6582
1363 002C A377    TCAD20 ANA SEVEN                                                TCA04460 6583
1364 002D B377            ERA SEVEN                                               TCA04470 6584
1365 002E F840            TEQ              ZERO=3 ADJACENT TC'S OUT OF LIMITS     TCA04480 6585
1366 002F D03E            BRS TCAD30       YES                                    TCA04490 6586
1367 0030 70D0            LAN TEM61                                               TCA04500 6587
1368 0031 E001            SRC 1                                                   TCA04510 6588
1369 0032 80D0            SAN TEM61                                               TCA04520 6589
136A 0033 E805            DMR XD                                                  TCA04530 6590
136B 0034 D02C            BRS TCAD20       CHECK FOR FINISH                       TCA04540 6591
136C 0035 A37B            ANA ELEVEN                                              TCA04550 6592
136D 0036 B37B            ERA ELEVEN                                              TCA04560 6593
136E 0037 F840            TEQ              ZERO=3 ADJACENT TC'S OUT OF LIMITS     TCA04570 6594
136F 0038 D03E            BRS TCAD30       YES                                    TCA04580 6595
1370 0039 70D0            LAN TEM61                                               TCA04590 6596
1371 003A E001            SRC 1                                                   TCA04600 6597
1372 003B A37D            ANA CON13                                               TCA04610 6598
1373 003C B37D            ERA CON13                                               TCA04620 6599
1374 003D F840            TEQ              ZERO=3 ADJACENT TC'S OUT OF LIMITS     TCA04630 6600
1375 003E D806    TCAD30 JIR R6            RETURN TO MAIN PROGRAM                 TCA04640 6601
                        * TCA PATCH AREA                                          TCA04650 6602
                        *                                                         TCA04660 6603
1376 003F E800            DMR P            HALT                                   TCA04670 6604
1377 0040 4418   TCAP01 SST TCAMRJ         TC MANUAL REJECT FLAG                  TCA04680 6605
1378 0041 441A            SST TCAPSS       SECOND PASS FLAG                       TCA04690 6606
1379 0042 C003            BRU TCAA05                                              TCA04700 6607
137A 0043 E800            DMR P                                                   TCA04710 6608
137B 0044 341A   TCAP02 LAT TCAPSS         SECOND PASS FLAG                       TCA04720 6609
137C 0045 D049            BRS **4                                                 TCA04730 6610
137D 0046 F900            SIR                                                     TCA04740 6611
137E 0047 441A            SST TCAPSS       SET SECOND PASS FLAG                   TCA04750 6612
137F 0048 C050            BRU TCAB10                                              TCA04760 6613
1380 0049 ABB6            LAP TCASBP       LOAD RELATIVE PTR TO SUBROUTINE        TCA04770 6614
1381 004A C080            BRU TCAC11                                              TCA04780 6615
1382 004B 4412   TCAP03 SST TCAHS          STORE IN HOT SPOT MAP                  TCA04790 6616
1383 004C A8BD   TCAP04 LAP MINTCR         LOAD MIN # TC'S REQ'D                  TCA04800 6617
1384 004D C098            BRU TCAC51                                              TCA04810 6618
1385 004E 80D9   TCAP05 SAN GTCCT1         INIT GOOD TC COUNTER #1                TCA04820 6619
1386 004F 80DA            SAN GTCCT2       INIT GOOD TC COUNTER #2                TCA04830 6620
1387 0050 C056            BRU TCAB15                                              TCA04840 6621
1388 0051 70D1   TCAP06 LAN TEM62          LOWER LIMIT                            TCA04850 6622
1389 0052 90D2            SUB TEM63        TC RDG                                 TCA04860 6623
138A 0053 C06C            BRU TCAB22       JUMP BACK                              TCA04870 6624
138B 0054 E808   TCAP07 TAM                NEG=OVERFLOW                           TCA04880 6625
138C 0055 D859            BRC **4          POS=NORMAL                             TCA04890 6626
138D 0056 7389            LAN MSKR15       USE LARGEST #                          TCA04900 6627
138E 0057 8167            SAN TXSPD        TX SPREAD                              TCA04910 6628
138F 0058 C04F            BRU TCAA32                                              TCA04920 6629
1390 0059 8167            SAN TXSPD        TX SPREAD                              TCA04930 6630
1391 005A C047            BRU TCAA31                                              TCA04940 6631
     0112         TCAEND EQL **TCASUB                                             TCA04950 6632
     003E                GEN TCASIZ-TCAEND                                        TCA04960 6633
1392 005B E800            DMR P                                                   TCA04970 6634
1393 005C E800                                                                             0
1394 005D E800                                                                             0
1395 005E E800                                                                             0
1396 005F E800                                                                             0
```

THERMOCOUPLE AVERAGING

```
1397 0060 E800                                                          0
1398 0061 E800                                                          0
1399 0062 E800                                                          0
139A 0063 E800                                                          0
139B 0064 E800                                                          0 #
139C 0065 E800                                                          0
139D 0066 E800     .                                                    0
139E 0067 E800                                                          0
139F 0068 E800                                                          0
13A0 0069 E800                                                          0
13A1 006A E800                                                          0
13A2 006B E800                                                          0
```

```
                                                                                  PPR01000 6636
                                                                                  PPR01010 6637
                     *                                                            PPR01020 6638
                     *                                                            PPR01030 6639
                     * * * * * * * * * * * * * * * * * * * * * * * * * * * * * *  PPR01040 6640
                     *                                                         *  PPR01050 6641
                     *     TEMPERATURE  TRIMMING  PROGRAM , PPR                *  PPR01060 6642
                     *                                                         *  PPR01070 6643
                     *                                                            PPR01080 6644
                     *                                                            PPR01090 6645
                     * * * * * * * * * * * * * * * * * * * * * * * * * * * * * *  PPR01100 6646
                           OBJ 1                                                  PPR01110 6647
                           INS 2                                                  PPR01120 6648
                     * * *                                                        PPR01130 6649
                     *                                                            PPR01140 6650
                     *    EQU/EUL STATEMENTS -                                    PPR01150 6651
        03F7          PPRRFL  EQU  RUNWD,#7           PPR RUN FLAG                PPR01160 6652
        0475          PPRTMP  EQU  PPRFLG,#5          TEMP TRIM POLARITY FLAG     PPR01170 6653
        0477          PPROV   EQU  PPRFLG,#7          PPR TRIM SATURATION (FOUR BITS) PPR01180 6654
                     *                PPRFLG,#7 INDICATES TRIM SATURATION,TEMP CONTROL  PPR01190 6655
                     *                PPRFLG,#8 INDICATES TRIM SATURATION,INLET GUIDE VANES PPR01200 6656
                     *                PPRFLG,#9 INDICATES TRIM SATURATION,OT,CHANNEL A PPR01210 6657
                     *                PPRFLG,#A INDICATES TRIM SATURATION,OT,CHANNEL B PPR01220 6658
        047D          WPPR    EQU  PPRFLG,#D          WARM UP FLAG,CLEARED WHEN W.U. COMPLETE PPR01230 6659
        03C0          PPRFL1  EQU  OPTWD0,#0          TEMP BIAS OPTION,1=VCE TYPE BIAS PPR01240 6660
                     *    LOCAL EOL'S - SCRATCH AND DEDICATED STORAGE              PPR01250 6661
                     *                                                             PPR01260 6662
        00D8          TEM71   EQU  SCRT3                                           PPR01270 6663
        00D9          TEM72   EQU  SCRT3+1                                         PPR01280 6664
        00DA          TEM73   EQU  SCRT3+2                                         PPR01290 6665
        00DB          TEM74   EQU  SCRT3+3                                         PPR01300 6666
        00DC          TEM75   EQU  SCRT3+4                                         PPR01310 6667
        00D4          TALARM  EQU  SCRT2+4            CALC ALARM PT                PPR01320 6668
        00D5          TTRIP   EQU  SCRT2+5            CALC TEMP TRIP               PPR01330 6669
        00C8          TEM76   EQU  SCRT1                                           PPR01340 6670
        00C9          TEM77   EQU  SCRT1+1                                         PPR01350 6671
        00CC          TREFS   EQU  SCRT1+4            SCALED ATREF  (TEMP REF)     PPR01360 6672
        00CD          OTRFAS  EQU  SCRT1+5            SCALED AOTRFA (OT REF )      PPR01370 6673
        00CE          OTRFBS  EQU  SCRT1+6            SCALED AOTRFB (OT REF )      PPR01380 6674
        00CA          TEM78   EQU  SCRT1+2                                         PPR01390 6675
        00CB          TEM79   EQU  SCRT1+3                                         PPR01400 6676
        0270          IPPR    EQU  DSTOR7             DLC PASS COUNTER             PPR01410 6677
        0271          DELSU   EQU  DSTOR7+1           START UP RAMP                PPR01420 6678
        0272          DELR2   EQU  DSTOR7+2           PK,PK RES CONTROL RAMP       PPR01430 6679
        0273          DELC    EQU  DSTOR7+3           AMBIENT BIAS                 PPR01440 6680
        0274          DELR4   EQU  DSTOR7+4           PK RES TRIP RAMP             PPR01450 6681
        0275          VCEPCD  EQU  DSTOR7+5           VCE OR EQUIV PCD             PPR01460 6682
        0276          TEMDST  EQU  DSTOR7+6           INTERMED STORAGE FOR BTMTEM  PPR01470 6683
        0277          IGVDST  EQU  DSTOR7+7           INTERMED STORAGE FOR BTMIGV  PPR01480 6684
        0278          OTADST  EQU  DSTOR7+8           INTERMED STORAGE FOR BTMOTA  PPR01490 6685
        0279          OTBDST  EQU  DSTOR7+9           INTERMED STORAGE FOR BTMOTB  PPR01500 6686
        027A          DELR1   EQU  DSTOR7+#A          DELTA CONTROL REF (TBASE-ATREF) PPR01510 6687
        027B          DELR3A  EQU  DSTOR7+#B          DELTA  OT  REF,CHAN A(OTBASE-AOTRFA) PPR01520 6688
        027C          DELR3B  EQU  DSTOR7+#C          DELTA  OT  REF,CHAN B(OTBASE-AOTRFB) PPR01530 6689
        027D          KVALR1  EQU  DSTOR7+#D          TEMP CORRECTION RAMP#1,MID VALUE ERROR PPR01540 6690
        027E          KVALR2  EQU  DSTOR7+#E          TEMP CORRECTION RAMP #2,INTEGRATING PPR01550 6691
                     *TEMSP   TEMP SET POINT                                       PPR01560 6692
                     * *                                                           PPR01570 6693
                     *                                                             PPR01580 6694
                     *    SYSTEM  SYMBOLS                                          PPR01590 6695
                     *                                                             PPR01600 6696
                     * *                                                           PPR01610 6697
                     *PPRFLG    PPR FLAG WORD                                      PPR01620 6698
                     *D3EDA     PPRFLG,#0  AMBIENT BIAS PROBLEM                    PPR01630 6699
                     *D3EDB     PPRFLG,#1  EXCESSIVE TEMP DIFF(AOTA,B,C,ATX)       PPR01640 6700
                     *D3EDC     PPRFLG,#2  TEMP CORRECTION EXCEEDS LIMIT,LTEMKV    PPR01650 6701
                     *D3EDD     PPRFLG,#3  TEMP CORRECTION EXCEEDS LIMIT,LTEMTP    PPR01660 6702
                     *PP26EA    PPRFLG,#4  TEMP ALARM FLAG                         PPR01670 6703
                     *PPRABT    PPRFLG,#6  PPR PROGRAM OVERFLOW (ABORT)            PPR01680 6704
                     *PPRDR2    PPRFLG,#B  PK,PK RES,BIAS EQUALS ZERO              PPR01690 6705
                     *PPRTEM    PPRFLG,#C  TEMP TRIM EQUALS ZERO                   PPR01700 6706
                     *PPRINH    PPRFLG,#E,CORRECTION RAMP#2 INHIBIT FLAG           PPR01710 6707
                     *PPRLKV    PPRFLG,#F,CORRECTION RAMP#2 IN SATURATION FLAG     PPR01720 6708
                     *                                                             PPR01730 6709
                     *         .MPY                                                PPR01740 6710
                     *         .DLA                                                PPR01750 6711
                     *         ZERO                                                PPR01760 6712
                     *         ONE                                                 PPR01770 6713
                     *L261C    TEMP CONT MODE                                      PPR01780 6714
                     *         CON15                                               PPR01790 6715
                     *         D1MABT  TEMP SYSTEM ABORT FROM SEQUENCING           PPR01800 6716
                     *D26ET     OVERTEMP SHUTDOWN                                  PPR01810 6717
                     *D2WX      WARM UP COMPLETE                                   PPR01820 6718
                     *DPK       PEAK                                               PPR01830 6719
```

TEMPERATURE TRIMMING PROGRAM, PPR

```
                   *DPR      PEAK RES                                          PPR01840 6720
                   *AVCE               VCE INPUT ---0 TO 12 VDC                PPR01850 6721
                   *APCD               PCD INPUT ---0 TO 5 VDC                 PPR01860 6722
                   *ATREF              INPUT,TEMP REF                          PPR01870 6723
                   *         AOTREA    INPUT,OT REF,CHAN A                     PPR01880 6724
                   *         AOTREB    INPUT,OT REF,CHAN B                     PPR01890 6725
                   *         RTMTEM    OUTPUT,TEMP CONTROL BIAS                PPR01900 6726
                   *         RTMIGV    OUTPUT,IGV BIAS                         PPR01910 6727
                   *         BTMOTA    OUTPUT,OT TRIP BIAS,CHAN A              PPR01920 6728
                   *         BTMOTB    OUTPUT,OT TRIP BIAS, CHAN B             PPR01930 6729
                   *         TXAVG     TEMP AVERAGE FROM TCA                   PPR01940 6730
                   *         KVAL1     TEMP CORRECTION FACTOR #1,FROM TCA      PPR01950 6731
                   *         RUNWD     RUN WORD                                PPR01960 6732
                   *         OPTWD0,20 OPTION WORD                             PPR01970 6733
                   *         MSKL12              CONST FFF0                    PPR01980 6734
                   *         PPR CONSTANT POOL   ALL CONSTANTS                 PPR01990 6735
                   *L526X    GEN BKR                                           PPR02000 6736
                   *AUTAN    SCALED OVERTEMP                                   PPR02010 6737
                   * * * *                                                     PPR02020 6738
                   *                                                           PPR02030 6739
                   *         PROGRAM , PPR                                     PPR02040 6740
                   *                                                           PPR02050 6741
                   * * * *                                                     PPR02060 6742
     13D0 0000 0000          ORG PPRSRT,A                                      PPR02070 6743
          0000     PPRA01 EQU *                                                PPR02080 6744
     13D0 0000 F800          CLR                                               PPR02090 6745
W    13D1 0001 4476          SST PPRABT         CLEAR ABORT FLAG               PPR02100 6746
     13D2 0002 4317          SST PPRRFL         PROGRAM RUN FLAG SET TO ZERO   PPR02110 6747
     13D3 0003 7276          LAN TEMDST         TEMP TRIM                      PPR02120 6748
     13D4 0004 F808          TAM                                               PPR02130 6749
     13D5 0005 D017          BRS PPRA15         BYPASS ABORT IF TEMP LESS THAN ANALOG REF PPR02140 6750
W    13D6 0006 3701          LAT DTMABT         TEST FOR TEMP SYSTEM ABORT     PPR02150 6751
     13D7 0007 B817          BRC PPRA15         NORMAL ROUTINE                 PPR02160 6752
          0008     PPRA05 EQU *                                                PPR02170 6753
                   *                                                           PPR02180 6754
                   * ABORT RAMPING STARTS HERE                                 PPR02190 6755
W    13D8 0008 7371          LAN ONE            USE THREE IF TEMP PROTECTION TRIM IS NEEDED PPR02200 6756
     13D9 0009 8005          SAN XD                                            PPR02210 6757
          000A     PPRA07 EQU *                                                PPR02220 6758
     13DA 000A 7676          LAN TEMDST,X       LOAD INTERMED STORAGE FOR TRIM PPR02230 6759
     13DB 000B 93D3          SUB CONABT         DECREMENT TRIM                 PPR02240 6760
     13DC 000C F808          TAM                                               PPR02250 6761
     13DD 000D D010          BRS PPRA09         IF NEG,GO TO ZERO              PPR02260 6762
     13DE 000E 8676          SAN TEMDST,X       OTHERWISE USE NEW VALUE        PPR02270 6763
     13DF 000F C012          BRU PPRA12                                        PPR02280 6764
          0010     PPRA09 EQU *                                                PPR02290 6765
W    13E0 0010 7370          LAN ZERO                                          PPR02300 6766
     13E1 0011 8676          SAN TEMDST,X                                      PPR02310 6767
          0012   * PPRA12 EQU *                                                PPR02320 6768
     13E2 0012 E805          DMR XD             FINISHED TEST                  PPR02330 6769
     13E3 0013 D00A          BRS PPRA07         NO                             PPR02340 6770
W    13E4 0014 7370          LAN ZERO                                          PPR02350 6771
     13E5 0015 8272          SAN DELR2          SET PK,PK RES RAMP TO ZERO     PPR02360 6772
     13E6 0016 C140          BRU PPRF50                                        PPR02370 6773
          0017     PPRA15 EQU *                                                PPR02380 6774
                   *                                                           PPR02390 6775
                   * COMPRESSOR DISCHARGE BIASING SECTION                      PPR02400 6776
                   *                                                           PPR02410 6777
     13E7 0017 33C0          LAT PPRFL1         COMPRESSOR DISCHARGE BASED ON VCE PPR02420 6778
     13E8 0018 B81B          BRC *+3            NO                             PPR02430 6779
W    13E9 0019 7101          LAN AVCE           YES,LOAD VCE                   PPR02440 6780
     13EA 001A C02F          BRU PPRA20                                        PPR02450 6781
W    13EB 001B 7370          LAN ZERO           PCD CONVERSION TO EQUIV VCE BEGINS HERE PPR02460 6782
     13EC 001C 80D8          SAN TEM71                                         PPR02470 6783
W    13ED 001D 7104          LAN APCD           LOAD PCD                       PPR02480 6784
     13EE 001E 80D9          SAN TEM72          B11                            PPR02490 6785
W    13EF 001F 73C3          LAN PCDGC          LOAD PCD CONVERSION FACTOR     PPR02500 6786
     13F0 0020 80DA          SAN TEM73          B2                             PPR02510 6787
     13F1 0021 C852          ESC .MPY                                          PPR02520 6788
     13F2 0022 00D8          PIN TEM71                                         PPR02530 6789
     13F3 0023 00DA          PIN TEM73                                         PPR02540 6790
     13F4 0024 00DB          PIN TEM74                                         PPR02550 6791
     13F5 0025 70D9          LAN TEM74          B13                            PPR02560 6792
     13F6 0026 A363          ANA MSKL3          CHECK FOR OVERFLOW             PPR02570 6793
     13F7 0027 9370          SUB ZERO                                          PPR02580 6794
     13F8 0028 F840          TEQ                                               PPR02590 6795
     13F9 0029 D02D          BRS *+4            SYSTEM CORRECT                 PPR02600 6796
     13FA 002A F900          SIR                                               PPR02610 6797
W    13FB 002B 4470          SST D3EDA          AMB BIAS TROUBLE               PPR02620 6798
     13FC 002C C140          BRU PPRF50                                        PPR02630 6799
     13FD 002D 70D8          LAN TEM74          B13                            PPR02640 6800
     13FE 002E E00E          SRC 14             B11                            PPR02650 6801
          002F     PPRA20 EQU *                                                PPR02660 6802
     13FF 002F 8275          SAN VCEPCD         STORE FOR VCE/PCD MIN LEVEL CHECK PPR02670 6803
     1400 0030 93C4          SUB VCEBK          B11                            PPR02680 6804
     1401 0031 D035          BRS *+4            POSITIVE                       PPR02690 6805
W    1402 0032 7370          LAN ZERO                                          PPR02700 6806
     1403 0033 8273          SAN DELC                                          PPR02710 6807
     1404 0034 C040          BRU PPRB10                                        PPR02720 6808
          0035     PPRA30 EQU *                  BEGINNING OF BIAS (DELC) CALC  PPR02730 6809
     1405 0035 80D9          SAN TEM72          B11  (VCE-VCEBK)               PPR02740 6810
W    1406 0036 7370          LAN ZERO                                          PPR02750 6811
     1407 0037 80D8          SAN TEM71                                         PPR02760 6812
W    1408 0038 73C5          LAN VCEGNS         B0,(DEG/(VDC VCE * 120)        PPR02770 6813
     1409 0039 80DA        * SAN TEM73                                         PPR02780 6814
     140A 003A C852          ESC .MPY                                          PPR02790 6815
     140B 003B 00D8          PIN TEM71                                         PPR02800 6816
     140C 003C 00DA          PIN TEM73                                         PPR02810 6817
     140D 003D 00DB          PIN TEM74                                         PPR02820 6818
     140E 003E 70D9          LAN TEM74          B11                            PPR02830 6819
```

TEMPERATURE TRIMMING PROGRAM,PPR

```
      140F 003F 8273             SAN DELC          B11                              PPR02840 6820
           0040           PPRB10 EQL *                                              PPR02850 6821 #
                                *                                                   PPR02860 6822
                                * CHECK FOR REMAINDER OF PROGRAM BYPASS             PPR02870 6823
                                *                                                   PPR02880 6824
      1410 0040 7270             LAN IPPR          BYPASS COUNTER                   PPR02890 6825
      1411 0041 9371             SUB ONE                                            PPR02900 6826
      1412 0042 8270             SAN IPPR                                           PPR02910 6827
      1413 0043 F808             TAM                                                PPR02920 6828
      1414 0044 B8FB             BRC PPRB20                                         PPR02930 6829
                                                                                    PPR02940 6830
                                *FROM HERE TO PPRB20 IS ONLY EXECUTED EVERY FIFTH PASS PPR02950 6831
    W 1415 0045 7374             LAN FOUR                                           PPR02960 6832
      1416 0046 8270             SAN IPPR          RESET BYPASS COUNTER             PPR02970 6833
           0047           PPRB20 EQL *                                              PPR02980 6834
                                                                                    PPR02990 6835
                                * SET UP DELTA REFERENCES                           PPR03000 6836
                                *                                                   PPR03010 6837
    W 1417 0047 7370             LAN ZERO          IF REF AOTREA,AOTREB ARE NEEDED,REVISE ZERPPR03020 6838
      1418 0048 8005             SAN XD                                             PPR03030 6839
    W 1419 0049 7370             LAN ZERO                                           PPR03040 6840
      141A 004A B0D8             SAN TEM71                                         PPR03050 6841
    W 141B 004B 7304             LAN SCLREF        B1,TEMP REF SCALING CONST        PPR03060 6842
      141C 004C 80D9             SAN TEM72                                          PPR03070 6843
           004D           PPRB25 EQL *                                              PPR03080 6844
    W 141D 004D 7517             LAN ATREF,X       NEGATIVE NUMBER                  PPR03090 6845
      141E 004E A387             ANA MSKL12        DELETE STATUS BITS               PPR03100 6846
      141F 004F 80DA             SAN TEM73         B11                              PPR03110 6847 #
      1420 0050 CB52             ESC .PPY                                           PPR03120 6848
      1421 0051 00D8             PIN TEM71                                          PPR03130 6849
      1422 0052 00DA             PIN TEM73                                          PPR03140 6850
      1423 0053 00DB             PIN TEM74                                          PPR03150 6851
    W 1424 0054 7370             LAN ZERO                                           PPR03160 6852
      1425 0055 90DB             SUB TEM74         POS NUMBER,B12                   PPR03170 6853
      1426 0056 E00F             SRC 15            B11                              PPR03180 6854
      1427 0057 84CC             SAN TREFS,X       SCALED REF                       PPR03190 6855
      1428 0058 F808             TAM                                                PPR03200 6856
    W 1429 0059 1476             LDT PPRABT                                         PPR03210 6857
    W 142A 005A 4476             SST PPRABT        SET ABORT FLAG IF OT CAUSES OVERFLOW PPR03220 6858
      142B 005B E805             DKR XD                                             PPR03230 6859
      142C 005C D04D             BKS PPRB25                                         PPR03240 6860
    W 142D 005D 73C6             LAN TBASE                                          PPR03250 6861
      142E 005E 90CC             SUB TREFS         SCALED TEMP REF                  PPR03260 6862 #
    W 142F 005F 827A             SAN DELR1                                          PPR03270 6863
    W 1430 0060 73CD             LAN OTBASE                                         PPR03280 6864
      1431 0061 90CD             SUB OTRFAS        SCALED OT REF ,CHANNEL A         PPR03290 6865
    W 1432 0062 827B             SAN DELR3A                                         PPR03300 6866
    W 1433 0063 73CD             LAN OTBASE                                         PPR03310 6867
      1434 0064 90CE             SUB OTRFBS        SCALED OT REF ,CHANNEL B         PPR03320 6868
    W 1435 0065 827C             SAN DELR3B                                         PPR03330 6869
           0066           PPRB30 EQL *                                              PPR03340 6870
                                *                                                   PPR03350 6871
                                * START UP SUPPRESSION SECTION                      PPR03360 6872
                                *                                                   PPR03370 6873
      1436 0066 F800             CLR                                                PPR03380 6874
    W 1437 0067 3783             LAT D?WX          WARM UP COMPLETE                 PPR03390 6875
      1438 0068 D071             BKS PPRC10        YES                              PPR03400 6876
      1439 0069 F900             STR                                                PPR03410 6877
    W 143A 006A 4470             SST WPPR          WARM UP FLAG                     PPR03420 6878
    W 143B 006B 7370             LAN ZERO                                           PPR03430 6879
    W 143C 006C 827E             SAN KVALR2        SET CORRECTION RAMP#2 TO ZERO    PPR03440 6880
    W 143D 006D 73C7             LAN SUCLMP        START UP CLAMP                   PPR03450 6881 #
      143E 006E 93C6             SUB TBASE         TEMP BASE REF                    PPR03460 6882
      143F 006F 8271             SAN DELSU         TEMP START UP SUPPRESSION        PPR03470 6883
      1440 0070 C0AB             BRU PPRU20                                         PPR03480 6884
           0071           PPRC10 EQL *                                              PPR03490 6885
      1441 0071 F800             CLR                                                PPR03500 6886
    W 1442 0072 3470             LAT WPPR          FIRST PASS AFTER WU COMPLETE     PPR03510 6887
      1443 0073 B87A             BRC PPRC20        NO                               PPR03520 6888
    W 1444 0074 7166             LAN TXAVG         TX AVG                           PPR03530 6889
    W 1445 0075 93C6             SUB TBASE         TEMP BASE                        PPR03540 6890
      1446 0076 8271             SAN DELSU         START UP SUPPRESSION             PPR03550 6891
      1447 0077 F800             CLR                                                PPR03560 6892
    W 1448 0078 4470             SST WPPR          CLEAR WU FLAG                    PPR03570 6893
      1449 0079 C083             BRU PPRC40                                         PPR03580 6894
           007A           PPRC20 EQL *                                              PPR03590 6895
      144A 007A 7271             LAN DELSU         START UP SUPPRESSION             PPR03600 6896
      144B 007B F808             TAM               NEG TEST                         PPR03610 6897
      144C 007C D08D             BKS PPRC35        YES                              PPR03620 6898 #
           007D           PPRC30 EQL *                                              PPR03630 6899
    W 144D 007D 7370             LAN ZERO                                           PPR03640 6900
      144E 007E 8271             SAN DELSU         START UP SUPPRESSION             PPR03650 6901
      144F 007F C083             BRU PPRC40                                         PPR03660 6902
           0080           PPRC35 EQL *                                              PPR03670 6903
      1450 0080 7271             LAN DELSU         START UP SUPPRESSION             PPR03680 6904
      1451 0081 9BC8             ADD CONSU         INCREMENTING CONST,START UP      PPR03690 6905
      1452 0082 8271             SAN DELSU         START UP SUPPRESSION             PPR03700 6906
           0083           PPRC40 EQL *                                              PPR03710 6907
                                                                                    PPR03720 6908
                                * PEAK,PEAK RESERVE, CONTROL BIASING CALC           PPR03730 6909
                                *                                                   PPR03740 6910
      1453 0083 F800             CLR                                                PPR03750 6911
    W 1454 0084 3795             LAT DPK           PEAK TEST                        PPR03760 6912
      1455 0085 D087             BKS **2           YES                              PPR03770 6913
      1456 0086 C0AB             BRU PPRU20        NO                               PPR03780 6914
    W 1457 0087 3796             LAT DPR           PEAK RESERVE TEST                PPR03790 6915
      1458 0088 B897             BRC PPRD10        NO                               PPR03800 6916
    W 1459 0089 73CB             LAN TPKRES        YES                              PPR03810 6917
      145A 008A 93C6             SUB TBASE                                          PPR03820 6918
```

TEMPERATURE TRIMMING PROGRAM.PPR

```
  145B 008B 9272           SUB DELR2              B11                                       PPR03830 6919 #
  145C 008C 9371           SUB ONE               B15,LEAST SIGNIFICANT BIT                  PPR03840 6920
  145D 008D F808           TAM                   NEG TEST                                   PPR03850 6921
  145E 008E 0093           BRS *+5               YES                                        PPR03860 6922
  145F 008F 7272           LAN DELR2             NO                                         PPR03870 6923
  1460 0090 98C9           ADD CONPPC            INCREMENT CONST                            PPR03880 6924
  1461 0091 8272           SAN DELR2             PK,PK RES CONTROL RAMP                     PPR03890 6925
  1462 0092 C0B5           BRU PPRD40                                                       PPR03900 6926
W 1463 0093 73CB           LAN TPKRES            PK RES TEMP CONT REF                       PPR03910 6927
  1464 0094 93C6           SUB TBASE             BASE TEMP CONT REF                         PPR03920 6928
  1465 0095 8272           SAN DELR2             PK,PK RES CONT RAMP                        PPR03930 6929
  1466 0096 C0B5           BRU PPRD40                                                       PPR03940 6930
       0097      PPRD10 EQU *                    PEAK BIAS CALC                             PPR03950 6931
W 1467 0097 738A           LAN CON16                                                        PPR03960 6932
  1468 0098 80C8           SAN TEM76             DEADBAND = ONE COUNT                       PPR03970 6933
W 1469 0099 73CA           LAN TPEAK                                                        PPR03980 6934
  146A 009A 93C6           SUB TBASE                                                        PPR03990 6935 #
  146B 009B 9272           SUB DELR2                                                        PPR04000 6936
  146C 009C 90C8           SUB TEM76                                                        PPR04010 6937
  146D 009D F808           TAM                   NEG TEST                                   PPR04020 6938
  146E 009E 88A7           BRC PPRD15            NO ,DELR2 TOO SMALL                        PPR04030 6939
  146F 009F 98C8           ADD TEM76                                                        PPR04040 6940
  1470 00A0 98C8           ADD TEM76                                                        PPR04050 6941
  1471 00A1 F808           TAM                   NEG TEST                                   PPR04060 6942
  1472 00A2 00AF           BRS PPRD30            YES,DELR2 TOO LARGE                        PPR04070 6943
W 1473 00A3 73CA           LAN TPEAK                                                        PPR04080 6944
  1474 00A4 93C6           SUB TBASE                                                        PPR04090 6945
  1475 00A5 8272           SAN DELR2             PK,PK RES CONT RAMP                        PPR04100 6946
  1476 00A6 C0B5           BRU PPRD40                                                       PPR04110 6947
       00A7      PPRD15 EQU *                                                               PPR04120 6948
  1477 00A7 7272           LAN DELR2                                                        PPR04130 6949
  1478 00A8 98C9           ADD CONPPC            INCREMENT UP                               PPR04140 6950
  1479 00A9 8272           SAN DELR2                                                        PPR04150 6951 #
  147A 00AA C0B5           BRU PPRD40                                                       PPR04160 6952
       00AB      PPRD20 EQU *                                                               PPR04170 6953
  147B 00AB 7272           LAN DELR2             B11                                        PPR04180 6954
  147C 00AC 9371           SUB ONE               B15                                        PPR04190 6955
  147D 00AD F808           TAM                   NEG TEST                                   PPR04200 6956
  147E 00AE 00B3           BRS PPRD35            YES                                        PPR04210 6957
       00AF      PPRD30 EQU *                                                               PPR04220 6958
  147F 00AF 7272           LAN DELR2                                                        PPR04230 6959
  1480 00B0 93C9           SUB CONPPC                                                       PPR04240 6960
  1481 00B1 8272           SAN DELR2             PK,PK RES CONT RAMP                        PPR04250 6961
  1482 00B2 C0B5           BRU PPRD40                                                       PPR04260 6962
W 1483 00B3 7370   PPRD35  LAN ZERO                                                         PPR04270 6963
  1484 00B4 8272           SAN DELR2                                                        PPR04280 6964
       00B5      PPRD40 EQU *                                                               PPR04290 6965
                                                                                            PPR04300 6966
                  *  PEAK RESERVE PROTECTION BIASING                                        PPR04310 6967
                                                                                            PPR04320 6968
  1485 00B5 F800           CLR                                                              PPR04330 6969
H 1486 00B6 3796           LAT DPR               PK RES TEST                                PPR04340 6970
  1487 00B7 88BC           BRC *+5               NO                                         PPR04350 6971
H 1488 00B8 73CE           LAN OTPKRS            YES                                        PPR04360 6972 #
  1489 00B9 93CD           SUB OTBASE                                                       PPR04370 6973
  148A 00BA 8274           SAN DELR4             PK RES PROT RAMP                           PPR04380 6974
  148B 00BB C0C3           BRU PPRE10                                                       PPR04390 6975
  148C 00BC 7274           LAN DELR4                                                        PPR04400 6976
  148D 00BD 93CF           SUB CONPPP            DECREMENTING CONST                         PPR04410 6977
  148E 00BE 8274           SAN DELR4             PK RES PROT RAMP                           PPR04420 6978
  148F 00BF F800           TAM                                                              PPR04430 6979
  1490 00C0 88C3           BRC *+3                                                          PPR04440 6980
W 1491 00C1 7370           LAN ZERO                                                         PPR04450 6981
  1492 00C2 8274           SAN DELR4             PK RES PROT RAMP                           PPR04460 6982
       00C3      PPRE10 EQU *                                                               PPR04470 6983
                                                                                            PPR04480 6984
                  * CORRECTION RAMP #1 CALC.TO CORRECT MID VALUE ERROR,KVALR1               PPR04490 6985
                                                                                            PPR04500 6986
  1493 00C3 7262           LAN KVAL1             CORRECTION #1 (FROM TCA)                   PPR04510 6987
W 1494 00C4 927D           SUB KVALR1            COMPARE TO RAMP#1                          PPR04520 6988
  1495 00C5 93C2           SUB KVALD1            COMPARE DIFF TO DEADBAND#1                 PPR04530 6989
  1496 00C6 F808           TAM                   NEG TEST                                   PPR04540 6990
  1497 00C7 88CD           BRC PPRE11            NO,KVALR1 IS TOO SMALL                     PPR04550 6991 #
  1498 00C8 98C2           ADD KVALD1                                                       PPR04560 6992
  1499 00C9 98C2           ADD KVALD1            ADD TWICE DEADBAND                         PPR04570 6993
  149A 00CA F808           TAM                   NEG TEST                                   PPR04580 6994
  149B 00CB 00D1           BRS PPRE12            YES,KVALR1 IS TOO LARGE                    PPR04590 6995
  149C 00CC C0D4           BRU PPRE15                                                       PPR04600 6996
W 149D 00CD 727D   PPRE11  LAN KVALR1                                                       PPR04610 6997
  149E 00CE 98CC           ADD CONKV1            ADD INCREMENTING FACTOR #1                 PPR04620 6998
W 149F 00CF 827D           SAN KVALR1                                                       PPR04630 6999
  14A0 00D0 C0D4           BRU PPRE15                                                       PPR04640 7000
W 14A1 00D1 727D   PPRE12  LAN KVALR1                                                       PPR04650 7001
  14A2 00D2 93CC           SUB CONKV1                                                       PPR04660 7002
W 14A3 00D3 827D           SAN KVALR1            CORRECTION RAMP #1                         PPR04670 7003
       00D4      PPRE15 EQU *                                                               PPR04680 7004
                                                                                            PPR04690 7005
                  * CORRECTION RAMP #2 CALC,SLOW INTEGRAL ACTION,KVALR2                     PPR04700 7006
                                                                                            PPR04710 7007
W 14A4 00D4 73C6           LAN TBASE             BASE TEMP REF                              PPR04720 7008
  14A5 00D5 9A71           ADD DELSU             START UP SUPPRESSION, NEG #                PPR04730 7009
  14A6 00D6 9A72           ADD DELR2             PK,PK RES RAMP                             PPR04740 7010 #
  14A7 00D7 9273           SUB DELC              AMB BIAS,RESULTING IN TEMPERATURE CONT REF PPR04750 7011
W 14A8 00D8 8165           SAN TEMSP             TEMP SET POINT                             PPR04760 7012
  14A9 00D9 F800           CLR                                                              PPR04770 7013
W 14AA 00DA 347E           LAT PPRINH            BYPASS IF INHIBIT FLAG SET                 PPR04780 7014
  14AB 00DB 01EC           LUF L26TC             BYPASS IF NOT ON TEMP CONT                 PPR04790 7015
  14AC 00DC 00EB           BRS PPRE20            JUMP                                       PPR04800 7016
  14AD 00DD 9166           SUB TXAVG             TEMP AVG (FROM TCA PROGRAM)                PPR04810 7017
```

TEMPERATURE TRIMMING PROGRAM-PPR

| | | | | | |
|---|---|---|---|---|---|
| 14AE | 00DE 80D8 | | SAN TEM71 | STORE TEMP ERROR | PPR04820 7018 |
| 14AF | 00DF F808 | | TAM | | PPR04830 7019 |
| 14B0 | 00E0 D0EE | | BRS PPRE16 | IF NEG,ACTUAL TEMP TOO HIGH | PPR04840 7020 |
| 14B1 | 00E1 93E8 | | SUB KVALD2 | TEST DEADBAND (ERROR IS POS) | PPR04850 7021 |
| 14B2 | 00E2 F808 | | TAM | | PPR04860 7022 |
| 14B3 | 00E3 D0FB | | BRS PPRE20 | IF NEG,CONTROL IS WITHIN DEADBAND | PPR04870 7023 |
| W 14B4 | 00E4 727E | | LAN KVALR2 | CORRECTION RAMP | PPR04880 7024 |
| 14B5 | 00E5 9BE9 | | ADD CONKV2 | INCREMENT RAMP UPWARD | PPR04890 7025 # |
| W 14B6 | 00E6 827E | | SAN KVALR2 | STORE AS NEW CORRECTION RAMP#2 | PPR04900 7026 |
| 14B7 | 00E7 93EA | | SUB LKVAL2 | CHECK AGAINST CORRECTION LIMIT | PPR04910 7027 |
| 14B8 | 00E8 F860 | | TGR | | PPR04920 7028 |
| W 14B9 | 00E9 447F | | SST PPRLKV | CORRECTION RAMP#2 SAT FLAG | PPR04930 7029 |
| 14BA | 00EA 68EB | | BKC PPRE20 | IF NEG,CORRECTION DOES NOT EXCEED LIMIT | PPR04940 7030 |
| | | | | | PPR04950 7031 |
| W 14BB | 00EB 73EA | | LAN LKVAL2 | | PPR04960 7032 |
| W 14BC | 00EC 827E | | SAN KVALR2 | SET CORRECTION TO MAX ALLOWABLE | PPR04970 7033 |
| 14BD | 00ED C0FB | | BRU PPRE20 | | PPR04980 7034 |
| | 00EE | PPRE16 | EQL * | NEG ERROR CHECK | PPR04990 7035 |
| 14BE | 00EF 9BE8 | | ADD KVALD2 | TEST DEADBAND | PPR05000 7036 |
| 14BF | 00FF F808 | | TAM | | PPR05010 7037 |
| 14C0 | 00F0 88FB | | BRC PPRE20 | IF POS,CONTROL IS WITHIN DEADBAND,SO JUMP | PPR05020 7038 |
| W 14C1 | 00F1 727E | | LAN KVALR2 | CORRECTION RAMP | PPR05030 7039 |
| 14C2 | 00F2 93E9 | | SUB CONKV2 | DECREMENT RAMP NEGATIVELY | PPR05040 7040 |
| W 14C3 | 00F3 827E | | SAN KVALR2 | STORE NEW RAMP | PPR05050 7041 # |
| 14C4 | 00F4 9BEA | | ADD LKVAL2 | ADD LIMIT | PPR05060 7042 |
| 14C5 | 00F5 F808 | | TAM | | PPR05070 7043 |
| W 14C6 | 00F6 447F | | SST PPRLKV | CORRECTION RAMP#2 SAT FLAG | PPR05080 7044 |
| 14C7 | 00F7 88FB | | BKC PPRE20 | IF POS,THE CORRECTION RAMP IS WITHIN LIMIT | PPR05090 7045 |
| W 14C8 | 00F8 7370 | | LAN ZERO | | PPR05100 7046 |
| 14C9 | 00F9 93EA | | SUB LKVAL2 | | PPR05110 7047 |
| W 14CA | 00FA 827E | | SAN KVALR2 | SET CORRECTION RAMP TO MAX ALLOWABLE | PPR05120 7048 |
| | 00FB | PPRE20 | EQL * | | PPR05130 7049 |
| | | | * TRIM CALCULATIONS | | PPR05140 7050 |
| | | | * | | PPR05150 7051 |
| W 14CB | 00FB 727D | | LAN KVALR1 | CORRECTION RAMP #1 | PPR05160 7052 |
| W 14CC | 00FC 9A7E | | ADD KVALR2 | CORRECTION RAMP#2 (INTEGRAL CORRECTION) | PPR05170 7053 |
| 14CD | 00FD 9273 | | SUB DELC | AMB BIAS | PPR05180 7054 |
| W 14CE | 00FE 9A74 | | ADD DELR1 | DELTA REF | PPR05190 7055 |
| 14CF | 00FF 8277 | | SAN IGVDST | IGV TRIM TEMPERATORY STORAGE | PPR05200 7056 |
| 14D0 | 0100 9A72 | | ADD DELR2 | PK.PK RES RAMP | PPR05210 7057 |
| 14D1 | 0101 9A71 | | ADD DELSU | START UP SUPPRESSION (NEG NO) | PPR05220 7058 |
| 14D2 | 0102 8276 | | SAN TEMDST | TEMPERATURE CONTROL TRIM,TEMP STORAGE | PPR05230 7059 |
| W 14D3 | 0103 727B | | LAN DELR3A | OT DELTA REF,CHAN A | PPR05240 7060 # |
| 14D4 | 0104 9A74 | | ADD DELR4 | OT PK RES RAMP | PPR05250 7061 |
| 14D5 | 0105 9273 | | SUB DELC | AMB BIAS | PPR05260 7062 |
| 14D6 | 0106 827B | | SAN OTADST | OT TRIM TEMP STORAGE,CHAN A | PPR05270 7063 |
| W 14D7 | 0107 727C | | LAN DELR3B | OT DELTA REF,CHAN B | PPR05280 7064 |
| 14D8 | 0108 9A74 | | ADD DELR4 | OT PK RES RAMP | PPR05290 7065 |
| 14D9 | 0109 9273 | | SUB DELC | AMB BIAS | PPR05300 7066 |
| 14DA | 010A 8279 | | SAN OTBDST | OT TRIM TEMP STORAGE,CHAN B | PPR05310 7067 |
| W 14DB | 010B 7300 | | LAN TALMB | BASE TEMP ALARM | PPR05320 7068 |
| 14DC | 010C 9273 | | SUB DELC | | PPR05330 7069 |
| 14DD | 010D 9A74 | | ADD DELR4 | | PPR05340 7070 |
| 14DE | 010E 80D4 | | SAN TALARM | B11,TEMP ALARM POINT | PPR05350 7071 |
| W 14DF | 010F 7301 | | LAN TTRIPB | BASE TEMP TRIP | PPR05360 7072 |
| 14E0 | 0110 9A74 | | ADD DELR4 | | PPR05370 7073 |
| 14E1 | 0111 9273 | | SUB DELC | | PPR05380 7074 |
| 14E2 | 0112 80D5 | | SAN TTRIP | CALC TRIP TEMP,B11 | PPR05390 7075 # |
| | 0113 | PPRE30 | EQL * | | PPR05400 7076 |
| | | | * | | PPR05410 7077 |
| | | | * SET UP OF PROTECTION AND ALARM FLAGS | | PPR05420 7078 |
| | | | * | | PPR05430 7079 |
| | | | | | PPR05440 7080 |
| 14E3 | 0113 70D4 | | LAN TALARM | | PPR05450 7081 |
| 14E4 | 0114 9166 | | SUB TXAVG | AVERAGE TEMPERATURE | PPR05460 7082 |
| 14E5 | 0115 F808 | | TAM | NEG TEST,SET R | PPR05470 7083 |
| W 14E6 | 0116 4474 | | SST PP26EA | TEMP ALARM FLAG | PPR05480 7084 |
| | 0117 | PPRE40 | EQL * | | PPR05490 7085 |
| 14E7 | 0117 70D5 | | LAN TTRIP | | PPR05500 7086 |
| 14E8 | 0118 9166 | | SUB TXAVG | | PPR05510 7087 |
| 14E9 | 0119 F808 | | TAM | NEG TEST,SET R | PPR05520 7088 |
| W 14EA | 011A 47A7 | | SST D26ET | | PPR05530 7089 |
| | 011A | PPRF10 | EQL * | EXHAUST TEMP DIFF AND AMB BIAS CHECK | PPR05540 7090 |
| 14EB | 011B F800 | | CLR | | PPR05550 7091 |
| 14EC | 011C 31F0 | | LAT L52GX | IS GEN BKR CLOSED | PPR05560 7092 |
| 14ED | 011D 8924 | | BKC PPRF20 | | PPR05570 7093 |
| 14EE | 011E 73C1 | | LAN VCEREQ | YES,LOAD REQ'D VCE | PPR05580 7094 |
| 14EF | 011F 9275 | | SUB VCEPCD | ACTUAL VCE OR VCE EQUIV | PPR05590 7095 |
| 14F0 | 0120 F860 | | TGR | | PPR05600 7096 # |
| 14F1 | 0121 8924 | | BRC *+3 | | PPR05610 7097 |
| W 14F2 | 0122 4470 | | SST D3EDA | | PPR05620 7098 |
| 14F3 | 0123 C140 | | BRU PPRF50 | | PPR05630 7099 |
| | 0124 | PPRF20 | EQL * | | PPR05640 7100 |
| 14F4 | 0124 F800 | | CLR | | PPR05650 7101 |
| W 14F5 | 0125 4470 | | SST D3EDA | AMB BIAS PROBLEM | PPR05660 7102 |
| W 14F6 | 0126 7372 | | LAN TWO | | PPR05670 7103 |
| 14F7 | 0127 8005 | | SAN XD | INDEX SET UP | PPR05680 7104 |
| | 0128 | PPRF25 | EQL * | | PPR05690 7105 |
| W 14F8 | 0128 7166 | | LAN TXAVG | | PPR05700 7106 |
| W 14F9 | 0129 965C | | SUB AOTAD,X | | PPR05710 7107 |
| 14FA | 012A F808 | | TAM | NEG TEST | PPR05720 7108 |
| 14FB | 012B 892E | | BRC *+3 | NO | PPR05730 7109 |
| 14FC | 012C E380 | | ERA ONES | CONVERT TO POSITIVE # | PPR05740 7110 |
| 14FD | 012D 9B71 | | ADD ONE | | PPR05750 7111 |
| 14FE | 012E 93C0 | | SUB LTEMPF | COMPARE AGAINST LIMIT | PPR05760 7112 |
| 14FF | 012F F860 | | TGR | POS =TROUBLE | PPR05770 7113 # |
| W 1500 | 0130 4471 | | SST D3EDB | STORE IN DIFF ALARM BIT | PPR05780 7114 |
| 1501 | 0131 E805 | | DMR XD | FINISHED | PPR05790 7115 |
| 1502 | 0132 0128 | | BKS PPRF25 | NO | PPR05800 7116 == |
| | 0133 | PPRF30 | EQL * | | |

TEMPERATURE TRIMMING PROGRAM,PPR

```
     1503 0133 7262           LAN KVAL1         CORRECTION #1(FROM TCA)             PPR05810 7117
     1504 0134 F808           TAM                                                    PPR05820 7118
     1505 0135 8938           BRC *+3                                                PPR05830 7119
     1506 0136 B380           ERA ONES                                               PPR05840 7120
     1507 0137 9871           ADD ONE                                                PPR05850 7121
     1508 0138 8008           SAN TEM71                                              PPR05860 7122
     1509 0139 93BE           SUB LTEMKV                                             PPR05870 7123
     150A 013A F880           TGR                POS=ALARM                           PPR05880 7124
  W  150B 013B 4472           SST D3EDC                                              PPR05890 7125
     150C 013C 70D8           LAN TEM71          CHECK KVAL EXCEEDS TRIP LIMIT       PPR05900 7126
     150D 013D 93BF           SUB LTEMTP                                             PPR05910 7127
     150E 013E F880           TGR                POS = TROUBLE                       PPR05920 7128
  W  150F 013F 4473           SST D3EDD          STORE STATUS FLAG,EXCESSIVE CORRECTION PPR05930 7129
          0140         PPRF50 EQL *                                                  PPR05940 7130
                              *                                                      PPR05950 7131
                              * SCALING & OUTPUT FORMATING OF TEMP TRIM SIGNALS      PPR05960 7132
                              *                                                      PPR05970 7133
  W  1510 0140 7370           LAN ZERO                                               PPR05980 7134
     1511 0141 8008           SAN TEM71                                              PPR05990 7135
  W  1512 0142 7371           LAN ONE            IF OVERTEMP TRIMS ARE NEEDED,REV ONE TO TH PPR06000 7136
     1513 0143 8005           SAN XD             SET INDEX                           PPR06010 7137
  W  1514 0144 7302           LAN SCLTEM         H3,SCALING FACTOR                   PPR06020 7138
     1515 0145 8009           SAN TEM72                                              PPR06030 7139
     1516 0146 7676    PPRF52 LAN TEMDSI,X                                           PPR06040 7140
     1517 0147 F808           TAM                                                    PPR06050 7141
  W  1518 0148 4475           SST PPRTMP         IF NEG, SET FLAG                    PPR06060 7142
     1519 0149 800A           SAN TEM73                                              PPR06070 7143
     151A 014A CB52           ESC .MPY                                               PPR06080 7144
     151B 014B 00D8           PTN TEM71                                              PPR06090 7145
     151C 014C 00DA           PTN TEM73                                              PPR06100 7146
     151D 014D 00DB           PTN TEM74                                              PPR06110 7147
     151E 014E 70DB           LAN TEM74          B14                                 PPR06120 7148
     151F 014F A3B4           ANA MSKL4                                              PPR06130 7149
     1520 0150 F800           CLR                                                    PPR06140 7150
  W  1521 0151 3475           LAT PPRTMP                                             PPR06150 7151
     1522 0152 D15B           BRS PPRF54         FOR NEG NUMBERS                     PPR06160 7152
     1523 0153 9370           SUB ZERO                                               PPR06170 7153
     1524 0154 F840           TEQ                                                    PPR06180 7154
     1525 0155 D163           BRS PPRF56         SYSTEM OKAY                         PPR06190 7155
  H  1526 0156 7387           LAN MSKL12         SYSTEM SATURATED                    PPR06200 7156
     1527 0157 B381           ERA MSKL1                                              PPR06210 7157
     1528 0158 F900           SIR                                                    PPR06220 7158
  W  1529 0159 4C77           SST PPROV,X                                            PPR06230 7159
     152A 015A C16A           BRU PPRF57                                             PPR06240 7160
          015B         PPRF54 EQL *              NEG NUMBER ROUTINE                  PPR06250 7161
     152B 015B B384           ERA MSKL4                                              PPR06260 7162
     152C 015C F840           TEQ                                                    PPR06270 7163
     152D 015D D163           BRS PPRF56         SYSTEM OKAY                         PPR06280 7164
  W  152E 015E 7381           LAN MSKL1          SET UP FOR NEG SAT                  PPR06290 7165
     152F 015F B38A           ERA CON16                                              PPR06300 7166
     1530 0160 F900           SIR                                                    PPR06310 7167
  W  1531 0161 4C77           SST PPROV,X                                            PPR06320 7168
     1532 0162 C16A           BRU PPRF57                                             PPR06330 7169
          0163         PPRF56 EQL *                                                  PPR06340 7170
     1533 0163 F800           CLR                                                    PPR06350 7171
  W  1534 0164 4C77           SST PPROV,X                                            PPR06360 7172
     1535 0165 70DB           LAN TEM74          B14                                 PPR06370 7173
     1536 0166 F802           TAO                                                    PPR06380 7174
     1537 0167 8969           BRC *+2                                                PPR06390 7175
     1538 0168 9871           ADD ONE                                                PPR06400 7176
     1539 0169 E00D           SKC 13             B11                                 PPR06410 7177
          016A         PPRF57 EQL *                                                  PPR06420 7178
  W  153A 016A 8568           SAN THTEM,X        FOR DISPLAY                         PPR06430 7179
     153B 016B 8387           ERA MSKL12         INVERT OUTPUT                       PPR06440 7180
     153C 016C 9BBA           ADD CON16                                              PPR06450 7181
     153D 016D A387           ANA MSKL12         BLANKS RIGHT FOUR BITS              PPR06460 7182
     153E 016E 8773           ERA THREE,X        SETS MULTIPLEX OUTPUT ADDRESS       PPR06470 7183
     153F 016F B583           SAN BTMTEM,X                                           PPR06480 7184
     1540 0170 E805           DMR XD             FINISHED                            PPR06490 7185
     1541 0171 D146           BPS PPRF52         NO                                  PPR06500 7186
          0172         PPRF60 EQL *                                                  PPR06510 7187
     1542 0172 7272           LAN DELR2          PK,PK RES CONTROL BIAS              PPR06520 7188
     1543 0173 9370           SUB ZERO                                               PPR06530 7189
     1544 0174 F840           TEQ                                                    PPR06540 7190
  W  1545 0175 447B           SST PPRDR2                                             PPR06550 7191
     1546 0176 7276           LAN TEMDSI                                             PPR06560 7192
     1547 0177 9370           SUB ZERO                                               PPR06570 7193
     1548 0178 F840           TEQ                                                    PPR06580 7194
  W  1549 0179 447C           SST PPRTEM                                             PPR06590 7195
     154A 017A FA00           TOV                                                    PPR06600 7196
  W  154B 017B 1476           LUT PPRABT                                             PPR06610 7197
  W  154C 017C 4476           SST PPRABT         STORE PPR ABORT FLAG                PPR06620 7198
     154D 017D CB40           JIS MSPRTN         RETURN TO MASTER STATUS PROGRAM     PPR06630 7199
          0082         PPREND GEN PPRSIZ-*                                           PPR06640 7200
  W  154E 017E E800           DMR 0              HALT                                PPR06650 7201
     154F 017F E800                                                                                    0
     1550 0180 E800                                                                                    0
     1551 0181 E800                                                                                    0
     1552 0182 E800                                                                                    0
     1553 0183 E800                                                                                    0
     1554 0184 E800                                                                                    0
     1555 0185 E800                                                                                    0
     1556 0186 E800                                                                                    0
     1557 0187 E800                                                                                    0
     1558 0188 E800                                                                                    0
     1559 0189 E800                                                                                    0
     155A 018A E800                                                                                    0
     155B 018B E800                                                                                    0
     155C 018C E800                                                                                    0
```

TEMPERATURE TRIMMING PROGRAM.PPR

```
155D  018D  E800                                              0
155E  018E  E800                                              0
155F  018F  E800                                              0
1560  0190  E800                                              0
1561  0191  F800                                              0
1562  0192  E800                                              0
1563  0193  E800                                              0
1564  0194  E800                                              0
1565  0195  E800                                              0
1566  0196  E800                                              0
1567  0197  E800                                              0
1568  0198  E800                                              0
1569  0199  E800                                              0
156A  019A  E800                                              0
156B  019B  E800                                              0
156C  019C  E800                                              0
156D  019D  E800                                              0
156E  019E  E800                                              0
```

What is claimed is:

1. A system for controlling fuel flow to a gas turbine in accordance with turbine temperature represented by the values of temperature readings provided by temperature sensors in the turbine, said system comprising:
   (a) a programmable controller for providing a temperature trim signal including,
      (1) a storage means for retaining a program of instructions and holding data related to the calculation of said temperature trim signal,
         (i) certain ones of said instructions directing said controller to determine if the value of each temperature reading is within prescribed limits and to reject those readings which are out of limits,
         (ii) certain other ones of said instructions directing said controller to calculate the value of said temperature trim signal for output by said controller only when a specified number of unrejected temperature readings are within said prescribed limits, said temperature trim signal, when present, having a value proportional to the difference between a mid-value signal applied to said controller and a calculated value proportional to the average of unrejected temperature readings, and
      (2) means in communication with said storage means for executing said instructions and processing said data;
   (b) a signal source for generating a reference signal proportional to a safe turbine operating temperature; and,
   (c) analog control means for providing a fuel control signal including,
      (1) means coupled to specified ones of said temperature sensors for providing said mid-value signal to said controller, said mid-value signal having a magnitude intermediate the individual values of the temperature readings provided by said specified ones, and
      (2) combining means for providing said fuel control signal, said combining means responsive to said temperature trim signal, said mid-value signal and said reference signal to provide said fuel control signal when said temperature trim signal is present at the output of said controller, and further responsive to said mid-value signal and said reference signal to provide said fuel control signal in the absence of said temperature trim signal;
   (d) means for transferring the temperature readings to said controller from said temperature sensors; and
   (e) means for delivering said fuel control signal from said analog means to said gas turbine for controlling fuel flow thereto.

2. The system in accordance with claim 1 wherein the number of unrejected readings and the sum of the unrejected readings are stored as numerical values in respectively specified locations in said storage means and wherein said program of instructions includes means for directing said controller to access said locations to calculate the value proportional to the average of the unrejected temperature readings.

3. The system in accordance with claim 1 wherein said combining means comprises a summation means responsive to the signals applied thereto for providing said fuel control signal and wherein the magnitude of said fuel control signal is proportional to the algebraic sum of the signals applied thereto.

4. The system in accordance with claim 1 wherein said means for providing said mid-value signal comprises a selector circuit whereby said mid-value signal has a first value intermediate the individual values of the temperature readings of said specified ones when a minimum number of the temperature readings of said specified ones are within prescribed limits and having a second value when less than said minimum number of temperature readings of said specified ones are out of said limits.

5. The system in accordance with claim 1 wherein said temperature trim signal has a value of zero representing its absence when a predetermined number of temperature readings are rejected and has a value, in its presence, proportional to turbine operating temperature derived from the average of the unrejected temperature readings.

6. The system in accordance with claim 4 wherein said analog control means further includes means for providing a trip signal to said turbine to shut off fuel flow thereto in response to said mid-value signal achieving said second value.

7. In a control system, a method of controlling fuel flow to a gas turbine in accordance with turbine temperature represented by the values of temperature readings provided by temperature sensors in the turbine comprising the steps of:
   (a) providing a mid-value signal having a magnitude intermediate the values of the temperature readings provided by specified ones of said temperature sensors;

(b) generating a reference signal proportional to a safe turbine operating temperature;

(c) providing a computer having storage means retaining a program of instructions and holding data related to the calculation of a temperature trim signal for output by said computer, (1) certain ones of said instructions directing said computer to determine if the value of each temperature reading is within prescribed limits and to reject those temperature readings which are out of limits, (2) certain other ones of said instructions directing said computer to calculate the value of said temperature trim signal only when a specified number of unrejected temperature readings are within said prescribed limits, said temperature trim signal, when present, having a value proportional to the difference between said mid-value signal and a calculated value proportional to the average of the unrejected temperature readings;

(d) combining said temperature trim signal, said mid-value signal and said reference signal to generate a fuel control signal, said fuel control signal having a value proportional to the algebraic sum of the temperature trim, mid-value and reference signals when said temperature trim signal is present and further having a value proportional to the algebraic sum of the mid-value and reference signals in the absence of said temperature trim signal; and, (e) delivering said fuel control signal to said gas turbine to control fuel flow thereto.

8. A system for controlling fuel flow to a gas turbine in accordance with turbine temperature represented by the values of temperature signals generated by sensors in the turbine, said control system comprising:

(a) a controller in communication with the turbine for receiving the temperature signals and generating a temperature trim signal, said controller including, (1) first means responsive to the temperature signals to selectively determine the reliability of each of the sensors to allow at the output thereof only those temperature signals having a magnitude within specified limits.

(2) first averaging means for generating a first output signal having a value proportional to the average values of the temperature signals at the output of said first means, (3) means for generating a first reference signal having a value proportional to a maximum permissible deviation of the magnitude of any temperature signal from a prescribed value, (4) means for algebraically combining said first output signal and said first reference signal to develop a second reference signal proportional to said prescribed value, (5) second means responsive to said second reference signal and to all temperature signals to reject each sensor whose temperature signal deviates from the value of said second reference by a prescribed amount and to allow at the output of said second means the temperature signals of all unrejected sensors, (6) second averaging means for generating a second output signal having a value proportional to the average of the values of the temperature signals at the output of said second means, (7) means for generating a third reference signal having a value proportional to a desired turbine operating temperature, (8) means responsive to said second output signal, said third reference signal and those temperature signals at the output of said second means for generating said temperature trim signal only when a specified number of reliable sensor temperature signals are passed by said second means, said temperature trim signal, when present, having a value proportional to the difference in magnitude between said second output signal and said third reference signal;

(b) a signal source for generating a fourth reference signal proportional to a safe turbine operating temperature;

(c) backup means for generating a fuel control signal including, (1) means coupled to specified ones of the sensors for generating a mid-value signal having a magnitude substantially intermediate the individual values of the temperature signals generated by said specified one, and (2) combining means responsive, when said temperature trim signal is present at the output of said controller, to said temperature trim signal, said mid-value signal and said fourth reference signal to provide said fuel control signal, and further responsive to said mid-value signal and said fourth reference signal, in the absence of said temperature trim signal, to provide said fuel control signal; and, (d) means for delivering said fuel control signal to said turbine to control fuel flow thereto.

9. A control system for controlling fuel flow to a gas turbine in accordance with turbine temperature represented by the values of temperature signals generated by sensors in the turbine, said control system comprising:

(a) a signal source for generating a first reference signal proportional to a safe turbine operating temperature;

(b) analog control means for providing a fuel control signal to said gas turbine including, (1) means coupled to specified ones of said sensors for generating a mid-value signal having a magnitude intermediate the individual values of the temperature signals generated by said specified ones, and (2) combining means, said combining means responsive to a temperature trim signal, said mid-value signal and said first reference signal to provide the fuel control signal to said gas turbine when said temperature trim signal is present and further responsive to said mid-value signal and said reference signal, in the absence of said temperature trim signal, to provide the fuel control signal to said gas turbine;

(c) means for providing a second reference signal proportional to a desired turbine operating temperature; and, (d) a programmable controller responsive to the first reference signal, the mid-value signal, the second reference signal and the temperature signals, said controller including a storage means for retaining a program of instructions and holding data related to the calculation of said temperature trim signal for output by said controller,
(1) certain ones of said instructions directing said controller to determine the reliability of each sensor by rejecting each sensor whose temperature signal is outside specified limits, and
(2) certain other ones of said instructions directing said controller to calculate the value of the temperature trim signal for output to said combining means only when a specified number of sensors are determined to be reliable, said temperature trim signal, when present, having a calculated value derived from the sum of the difference in magnitude between the first reference signal and said second reference signal and the difference in magnitude between the mid-value signal and a calculated value which is a function of the turbine operating temperature derived from the values of the temperature signals of the sensors determined to be reliable.

10. In a control system, a method of controlling the operating temperature of a gas turbine in accordance with turbine temperature represented by the values of temperature signals generated by sensors in the turbine, comprising the steps of:
(a) generating a first reference signal proportional to a safe turbine operating temperature;
(b) providing a second reference proportional to a desired turbine operating temperature;
(c) generating a mid-value signal having a value intermediate the individual values of specified ones of the sensor generated temperature signals;
(d) storing in a computer a program of instructions and data related to the calculation of a temperature trim signal for output by said computer,
(1) certain ones of said instructions directing said computer to determine the reliability of each sensor by rejecting each sensor whose temperature signal is outside specified limits, and
(2) certain other ones of said instructions directing said computer to calculate the value of the temperature trim signal for output by said computer only when a specified number of sensors are determined to be reliable, said temperature trim signal, when present, having a calculated value derived from the sum of the difference in magnitude between the first reference signal and said second reference and the difference in magnitude between the mid-value signal and a calculated value which is a function of the turbine operating temperature derived from the values of the temperature signals of the sensors determined to be reliable; and
(e) combining said temperature trim signal, said mid-value signal, and said first reference signal to provide a fuel control signal, said fuel control signal having a value representative of the algebraic sum of the temperature trim signal, the mid-value signal and the first reference signal when said temperature trim signal is present and further having a value representative of the algebraic sum of the mid-value signal and the first reference signal in the absence of said temperature trim signal.

* * * * *

UNITED STATES PATENT AND TRADEMARK OFFICE
CERTIFICATE OF CORRECTION

PATENT NO. : 4,455,820

DATED : June 26, 1984

INVENTOR(S) : Leo P. Buckley, Jr., Burnette P. Chausse, Arthur C. Chen, John N. Russell, Thomas Y. Wong It is certified that error appears in the above-identified patent and that said Letters Patent are hereby corrected as shown below:

Column 2, lines 26 and 27, delete "fail-safe and fail design" and substitute --fail-soft and fail-safe design--.

Column 2, line 56, delete "feel" and substitute --fuel--.

Column 14, line 9, delete "now".

Column 28, line 21, delete "KVAL1" and substitute --KVAL1'--.

Column 58, line 44, delete "out of" and substitute --within--.

Signed and Sealed this

Twelfth Day of November 1985

[SEAL]

Attest:

Attesting Officer

DONALD J. QUIGG

Commissioner of Patents and Trademarks